(12) United States Patent
Kawata et al.

(10) Patent No.: US 8,993,120 B2
(45) Date of Patent: Mar. 31, 2015

(54) HIGH-STRENGTH HOT-DIP GALVANIZED STEEL SHEET HAVING EXCELLENT DELAYED FRACTURE RESISTANCE AND MANUFACTURING METHOD THEREOF

(71) Applicant: Nippon Steel & Sumitomo Metal Corporation, Tokyo (JP)

(72) Inventors: Hiroyuki Kawata, Tokyo (JP); Naoki Maruyama, Tokyo (JP); Akinobu Murasato, Tokyo (JP); Akinobu Minami, Tokyo (JP); Takeshi Yasui, Tokyo (JP); Takuya Kuwayama, Tokyo (JP); Hiroyuki Ban, Tokyo (JP); Kaoru Hiramatsu, Tokyo (JP)

(73) Assignee: Nippon Steel & Sumitomo Metal Corporation, Tokyo (JP)

( * ) Notice: Subject to any disclaimer, the term of this patent is extended or adjusted under 35 U.S.C. 154(b) by 0 days.

(21) Appl. No.: 14/348,335

(22) PCT Filed: Sep. 28, 2012

(86) PCT No.: PCT/JP2012/075108
§ 371 (c)(1),
(2) Date: Mar. 28, 2014

(87) PCT Pub. No.: WO2013/047760
PCT Pub. Date: Apr. 4, 2013

(65) Prior Publication Data
US 2014/0234659 A1    Aug. 21, 2014

(30) Foreign Application Priority Data

Sep. 30, 2011  (JP) .................................. 2011-218776

(51) Int. Cl.
| | |
|---|---|
| B32B 15/00 | (2006.01) |
| B32B 15/04 | (2006.01) |
| B32B 15/18 | (2006.01) |
| C23C 2/02 | (2006.01) |
| C21D 9/46 | (2006.01) |
| B21B 1/26 | (2006.01) |
| B21B 3/00 | (2006.01) |

(Continued)

(52) U.S. Cl.
CPC ... C23C 2/02 (2013.01); B21B 1/26 (2013.01); B21B 3/00 (2013.01); C23C 2/06 (2013.01); C23C 2/28 (2013.01); C21D 9/46 (2013.01); C22C 18/04 (2013.01); C22C 38/00 (2013.01); C22C 38/06 (2013.01); C22C 38/58 (2013.01); B32B 15/013 (2013.01); C22C 38/001 (2013.01); C22C 38/002 (2013.01); C22C 38/02 (2013.01); C22C 38/04 (2013.01); C23C 2/26 (2013.01); C23C 2/40 (2013.01)

USPC .......... 428/659; 428/633; 428/684; 428/336; 148/504; 148/579; 148/625; 148/648; 148/660; 148/661

(58) Field of Classification Search
CPC .............. C23C 2/12; C23C 2/40; C23C 2/26; C23C 2/02; C23C 2/06; C23C 2/28; C23C 30/00; C23C 30/005; B32B 15/01; B32B 15/012; B32B 15/013; B32B 15/04; B32B 15/043; B32B 15/18; C22C 18/04; C22C 18/00; C22C 38/00; C22C 38/001; C22C 38/002; C22C 38/005; C22C 38/02; C22C 38/04; C22C 38/06; C22C 38/08; C22C 38/12; C22C 38/14; C22C 38/16; C22C 38/18; C22C 38/20; C22C 38/22; C22C 38/24; C22C 38/26; C22C 38/28; C22C 38/32; C22C 38/34; C22C 38/38; C22C 38/40; C22C 38/42; C22C 38/44; C22C 38/46; C22C 38/48; C22C 38/50; C22C 38/52; C22C 38/54; C22C 38/58
USPC ......... 428/659, 628, 629, 632, 633, 639, 683, 428/684, 213, 215, 220, 332, 336, 335
See application file for complete search history.

(56) References Cited

U.S. PATENT DOCUMENTS

| | | | |
|---|---|---|---|
| 2010/0132849 A1* | 6/2010 | Takagi et al. | ................. 148/533 |
| 2010/0304183 A1 | 12/2010 | Honda et al. | |
| 2012/0009434 A1 | 1/2012 | Hata et al. | |

FOREIGN PATENT DOCUMENTS

| | | | |
|---|---|---|---|
| JP | 09-143570 | * | 6/1997 |
| JP | 3247907 B2 | | 1/2002 |

(Continued)

OTHER PUBLICATIONS

Machine Translation, Morita et al., JP 09-143570, Jun. 1997.*

(Continued)

*Primary Examiner* — Michael E La Villa
(74) *Attorney, Agent, or Firm* — Birch, Stewart, Kolasch & Birch, LLP

(57) ABSTRACT

A hot-dip galvanizing layer or an alloyed hot dip galvanizing layer is formed on the surface of a base steel sheet in which in volume fraction, 40 to 90% of a ferrite phase and 5% or less of a retained austenite phase are contained, and a ratio of non-recrystallized ferrite to the entire ferrite phase is 50% or less in volume fraction, and further a grain diameter ratio being a value of, of crystal grains in the ferrite phase, an average grain diameter in the rolling direction divided by an average grain diameter in the sheet width direction is 0.75 to 1.33, a length ratio being a value of, of hard structures dispersed in island shapes, an average length in the rolling direction divided by an average length in the sheet width direction is 0.75 to 1.33, and an average aspect ratio of inclusions is 5.0 or less.

11 Claims, No Drawings

(51) Int. Cl.
*C23C 2/06* (2006.01)
*C23C 2/28* (2006.01)
*C22C 18/04* (2006.01)
*C22C 38/00* (2006.01)
*C22C 38/06* (2006.01)
*C22C 38/58* (2006.01)
*B32B 15/01* (2006.01)
*C22C 38/02* (2006.01)
*C22C 38/04* (2006.01)
*C23C 2/26* (2006.01)
*C23C 2/40* (2006.01)

(56) References Cited

FOREIGN PATENT DOCUMENTS

| JP | 2005-256020 A | 9/2005 |
| JP | 2006-233333 A | 9/2006 |
| JP | 2007-211279 A | 8/2007 |
| JP | 4317384 B2 | 8/2009 |
| JP | 2010-156016 A | 7/2010 |
| JP | 2010-168651 A | 8/2010 |
| JP | 2011-111671 A | 6/2011 |
| JP | 2011-111675 A | 6/2011 |
| JP | 2011-117041 A | 6/2011 |
| JP | 4712882 B2 | 6/2011 |
| JP | 2011-153349 A | 8/2011 |

OTHER PUBLICATIONS

International Preliminary Report on Patentability (Forms PCT/IB/338, PCT/IB/373 and PCT/IB/237) mailed Apr. 10, 2014.
Hayashi et al., Evaluation of Hydrogen Embrittlement Susceptibility for sheet steel, Materia, The Japan Institute of Metals and Materials Periodical, Mar. 20, 2005, pp. 254-256.
International Search Report, issued in PCT/JP2012//075108, dated, Dec. 25, 2012.
The Iron and Steel Institute of Japan Production Technical Committee Surface-treated Steel Sheet Committee Edition, Manual:Hot-dip galvanized steel sheet, The Iron and Steel Institute of Japan, Jan. 1991, pp. 53-55.
Written Opinion of the International Searching Authority, issued in PCT/JP2012/075108, dated, Dec. 25, 2012.

* cited by examiner

HIGH-STRENGTH HOT-DIP GALVANIZED STEEL SHEET HAVING EXCELLENT DELAYED FRACTURE RESISTANCE AND MANUFACTURING METHOD THEREOF

TECHNICAL FIELD

The present invention relates to a hot-dip galvanized steel sheet using a high-strength steel sheet having a maximum tensile strength of about 900 MPa or more as a base material and having a hot-dip galvanizing layer formed on the surface of the high-strength steel sheet, and particularly relates to a high-strength hot-dip galvanized steel sheet having excellent delayed fracture resistance and at the same time, having excellent anisotropy of the delayed fracture resistance, and a manufacturing method thereof.

BACKGROUND ART

In recent years, a demand for achieving high strength of steel sheets used for automobiles or construction machines and various parts and structures of other construction·civil engineering structures, and so on has been increasing. Against such a background a high-strength steel sheet having a maximum tensile strength of 900 MPa or more has been used mainly for reinforcing materials of bumpers, impact beams, and so on of automobiles.Further, the steel sheets used for them are normally required to have excellent corrosion resistance because they are often used outside.

As such steel sheets to be used in a field necessary for corrosion resistance, a hot-dip galvanized steel sheet obtained by performing hot-dip galvanizing on the surface of a base steel sheet has been widely used. Further, recently, there has also been widely used an alloyed hot-dip galvanized steel sheet obtained by performing, after the hot-dip galvanizing, an alloying treatment in which a plating layer is heated to a temperature equal to or higher than the melting point of Zn to diffuse Fe into the plating layer from the inside of the base steel sheet, to thereby turn the plating layer into a layer mainly composed of a Zn—Fe alloy.

By the way, when a high-strength steel sheet is applied to an automobile or the like, it is necessary to solve a problem of occurrence of delayed fracture.

The delayed fracture is a phenomenon that when working or assembling a member, cracking or a fracture does not occur, but while the member is in use under a situation where high stress acts, a fracture such as cracking occurs suddenly in an embrittling manner with hardly causing plastic deformation in external appearance. The delayed fracture has been known to be closely related to hydrogen to enter a steel sheet from the outside environment of the steel sheet. That is, the delayed fracture has been generally thought to be an embrittlement phenomenon ascribable to hydrogen to enter from the outside environment to be diffused in steel.

As a factor greatly affecting the delayed fracture, steel sheet strength has been known. This is because as the steel sheet is higher in strength, it has a higher possibility to be used in an environment where high stress acts. That is, when a low-strength material is used for a member on which high stress acts, the material is immediately plastically deformed to be fractured, so that the delayed fracture does not occur normally. On the other hand, plastic deformation and fracture do not easily occur in a high-strength material, so that a high-strength material is often used in an environment where high stress acts. Further, in a steel product to be used after being subjected to forming work such as an automobile part, residual stress occurs by the work. This residual stress increases as steel sheet strength becomes higher. Therefore, in addition to the stress by external loading, large residual stress is added to the steel sheet, and thus the delayed fracture becomes likely to occur. As a result, as the material is higher in strength, there is increased concern about occurrence of the delayed fracture.

On the other hand, a thin steel sheet, for example, a thin steel sheet having a sheet thickness of about 3.0 mm or less has been known to have anisotropy in delayed fracture resistance. That is, there is sometimes caused a difference in the delayed fracture resistance depending on a working direction (generally, a rolling direction in final cold rolling, or a rolling width direction perpendicular to it) in a manufacturing process of the steel sheet. This tendency becomes significant in a thin sheet in particular. Thus, when a high-strength thin steel sheet is used for a member on which high stress acts, taking measures for securing safety has been performed. That is, measures such that a design is made so as not to cause delayed fracture also in the direction in which the delayed fracture resistance is the poorest or the direction in which the steel sheet is applied to a member is considered so that working in the direction in which the delayed fracture resistance is poor may become slight have been taken. However, such measures cause a problem that significant restriction is placed when using the steel sheet.

Thus, as a property of the thin steel sheet itself, the development of a thin steel sheet in which not only is delayed fracture resistance improved simply, but also anisotropy of the delayed fracture resistance is reduced is strongly desired, By the way, regarding conventional techniques related to the anisotropy of a thin steel sheet, the following techniques exist. First, as a means of reducing anisotropy of ductility to improve properties of a steel sheet, a technique illustrated in Patent Literature 1 exists. Further, as a means of reducing anisotropics of bendability and toughness to improve properties of a steel sheet, a technique illustrated in Patent Literature 2 exists. However, in both Patent Literatures 1 and 2, the delayed fracture resistance is not described, and the means for eliminating anisotropy of delayed fracture resistance is also not disclosed.

Further, in Patent Literature 3, there has been described a steel sheet having excellent delayed fracture resistance and having small anisotropics of tensile strength and ductility. However, the anisotropy of delayed fracture resistance is not described, and the means for reducing anisotropy of delayed fracture resistance is also not disclosed.

Further, as a method of improving delayed fracture resistance of a steel sheet, in Patent Literature 4 and Patent Literature 5, there has been described a steel sheet in which the main phase of the steel sheet is turned into hard, structures such as bainite, bainitic ferrite, martensite, and tempered martensite to thereby improve delayed fracture resistance. Further, in Patent Literature 6, there has been described a steel sheet in which the main phase of the steel sheet is turned into tempered marten site and then in the tempered martensite, fine carbide is dispersed to thereby improve delayed fracture resistance.

However, in all the steel sheets by these techniques of Patent Literatures 4 to 6, the structure that is hard and poor in ductility is set as the main phase, so that the ductility is poor also in the entire steel sheet, resulting in that it is unsuitable for use in which a steel sheet is subjected to heavy forming work to be used.

In Patent literature 7, there has been described that in a surface layer within 10 μm from the surface of a steel sheet, oxides are dispersed and the oxides trap hydrogen to thereby improve delayed fracture resistance of the steel sheet. Further, in Patent literature 8, there has been described a steel sheet on which the main phase of the steel sheet is turned into ferrite, marten site being a hard structure is dispersed in the steel sheet, and by fine precipitates such as Ti, Nb, and V, a block size of the martensite is made fine to thereby improve delayed fracture resistance. Further, in Patent Literature 9, there has been described a steel sheet in which in addition to making the above-described block size fine, a decarburized layer having a thickness of 0.5 μm or more is formed in a surface layer of the steel sheet to thereby improve delayed fracture resistance.

In Patent Literatures 7 to 9, there has been described that the delayed fracture resistance is improved in addition to strength and ductility, but no attention has been completely paid to the anisotropy of delayed fracture resistance.

CITATION LIST

Patent Literature

Patent Literature 1: Japanese Laid-open Patent Publication No. 2005-256020
Patent Literature 2: Japanese Laid-open Patent Publication No, 2010-156016
Patent Literature 3: Japanese Laid-open Patent Publication No. 2010-168651
Patent Literature 4: Japanese Patent No. 3247907
Patent Literature 5: Japanese Patent No. 4317384
Patent Literature 6: Japanese Patent No. 4712882
Patent Literature 7: Japanese Laid-open Patent Publication No. 2007-211279
Patent Literature 8: Japanese Laid-open Patent Publication No. 2011-111671
Patent Literature 9: Japanese Laid-open Patent Publication No. 2011-111675

Non Patent Literature

Non Patent Literature 1: HAYASHI, Kunio, four others "Evaluation of Hydrogen Embrittlement Susceptibility for sheet steel" *Materia* (The Japan Institute of Metals and Materials Periodical), Mar. 20, 2005, 44(3), p. 254-256
Non-Patent Literature 2: The Iron and Steel Institute of Japan Production Technical Committee Surface-treated Steel Sheet Committee Edition, "Manual: hot-dip galvanized steel sheet," The Iron and Steel Institute of Japan, January, 1991, p. 53-55

SUMMARY OF INVENTION

Technical Problem

As described previously, when for example, a steel sheet having a high strength of about 900 MPa or more, particularly, a thin steel sheet having a thickness of about 3.0 mm or less is used as a member on which a high load acts, anisotropy of delayed fracture resistance becomes a problem. However, conventionally, the fact is that a reduction in anisotropy of a mechanical property such as ductility other than the delayed fracture resistance, or measures to improve the delayed fracture resistance itself were considered, but a reduction in the anisotropy of the delayed fracture resistance was not considered particularly. Therefore, as described previously, in applying to a member having a large load, when occurrence of delayed fracture was tried to be prevented securely and stably for safety, there was no choice but to generate restriction in terms of design or work. Then, such a problem has been inevitably caused also in a hot dip galvanized steel sheet obtained by forming a hot-dip galvanizing layer on the surface of a high-strength steel sheet for corrosion resistance improvement, and further in an alloyed hot-dip galvanized steel sheet in which the plating layer is alloyed.

The present invention has been made in the context of the above circumstances, and has an object to provide a hot-dip galvanized steel sheet in which while achieving securing of ductility and strength, improvement of delayed fracture resistance is achieved, and at the same time, anisotropy of the delayed fracture resistance, particularly anisotropy (in-plane anisotropy) of the delayed fracture resistance in a surface parallel to a sheet surface (rolled surface) is reduced, and additionally, to provide a manufacturing method thereof.

Solution to Problem

The present inventors repeated various experiments and examinations in order to find a method of improving delayed fracture resistance and reducing in-plane anisotropy of the delayed fracture resistance without impairing ductility and strength of a base steel sheet. As a result, they newly learned that not only is a chemical composition of a base steel sheet adjusted appropriately, but also a steel structure is adjusted appropriately, and at the same time, specific phases and structures, and shapes of inclusions are adjusted appropriately, and further a surface layer of a base material is turned into a decarburized layer in which oxides are dispersed appropriately, thereby making it possible to solve the above-described problems, and found manufacturing process conditions required for it, and completed the present invention.

Thus, the gist of the present invention is as follows.

(1) A high strength hot-dip galvanized steel sheet having excellent delayed fracture resistance, includes:
  a base steel sheet made of steel containing:
    in mass %,
    C: 0.075 to 0.400%;
    Si: 0.01 to 2.00%;
    Mn: 0.80 to 3.50%;
    P: 0.0001 to 0.100%;
    S: 0.0001 to 0.0100%;
    Al: 0.001 to 2.00%;
    O: 0.0001 to 0.0100%;
    N: 0.0001 to 0.0100%; and
    a balance being composed of Fe and inevitable impurities; and
  a hot-dip galvanizing layer formed on the surface of the base steel sheet, in which
  in a range of ⅛ thickness to ⅜ thickness with the position of ¼ thickness of the sheet thickness of the base steel sheet from the surface of the base steel sheet being the center, a structure of the base steel sheet is turned into a structure in which 40 to 90% in volume fraction of a ferrite phase is contained, a retained austenite phase is 5% or less in volume fraction, and further a ratio of non-recrystallized ferrite to the entire ferrite phase is 50% or less in volume fraction,
  a grain diameter ratio of crystal, grains in the ferrite phase in said base steel sheet is 0.75 to 1.33, wherein said grain diameter ratio is defined as the ratio of an average grain diameter in the rolling direction divided by an average grain diameter in the sheet width direction of said phase, and a length ratio of hard structures dispersed in island shapes in the ferrite phase is 0.75 to 1.33, wherein said length ratio is defined as an average length in the rolling direction divided by an average length in the sheet width direction of said structures, and further an average aspect ratio of inclusions contained in the base steel sheet is 1.0 to 5.0, and a surface layer of the base steel sheet is turned into a decarburized layer having a thickness of 0.01 to 10.0 μm, and further an average grain diameter of oxides in the decarburized layer is 30 to 500 nm, and an average density of the oxides in the decarburized layer is in a range of $1.0 \times 10^{12}$ oxides/m² to $1.0 \times 10^{16}$ oxides/m².

(2) The high-strength hot-dip galvanized steel sheet having excellent delayed fracture resistance according to (1), in which the base steel sheet further contains, in mass %, one kind or two or more kinds selected from Cr: 0.01 to 2.00%,
Ni: 0.01 to 2.00%,
Cu: 0.01 to 2.00%,
Mo: 0.01 to 2.00%,
B: 0.0001 to 0.0100%, and
W: 0.01 to 2.00%.

(3) The high-strength hot-dip galvanized steel sheet having excellent delayed fracture resistance according to (1), in which the base steel sheet further contains, in mass %, one kind or two or more kinds selected from Ti: 0.001 to 0.150%,
Nb: 0.001 to 0.100%, and
V: 0.001 to 0.300%.

(4) The high-strength hot-dip galvanized steel sheet having excellent delayed fracture resistance according to (1), in which the base steel sheet further contains 0.0001 to 0.0100 mass % in total of one kind or two or more kinds selected from Ca, Ce, Mg, Zr, La, and REM.

(5) The high-strength hot-dip galvanized steel sheet having excellent delayed fracture resistance according to (1), in which in the base steel sheet, an average work hardening coefficient (n value) in a range where total elongation is 3 to 7% is 0.060 or more.

(6) The high-strength hot-dip galvanized steel sheet having excellent delayed fracture resistance according to (1), in which in the base steel sheet, a value of a limit diffusible hydrogen content in the rolling direction divided by a limit diffusible hydrogen content in the sheet width direction is in the 0.1-to-1.5 range, (7) The high-strength hot-dip galvanized steel sheet having excellent delayed fracture resistance according to (1), in which in the base steel sheet, an X-ray random intensity ratio of BCC iron at the position of ¼ thickness from the surface is 4.0 or less.

(8) The high-strength hot-dip galvanized steel sheet having excellent delayed fracture resistance according to 1), in which the hot-dip galvanizing layer is one having been subjected to an alloying treatment.

(9) A manufacturing method of a high-strength hot-dip galvanized steel sheet having excellent delayed fracture resistance, includes:

a hot rolling step in which a slab containing:
in mass %,
C: 0.075 to 0.400%;
Si: 0.01 to 2.00%;
Mn: 0.80 to 3.50%;
P: 0.0001 to 0.100%;
S: 0.0001 to 0.0100%;
Al: 0.001 to 2.00%;
O: 0.0001 to 0.0100%;
N: 0.0001 to 0.0100%; and a balance being composed of Fe and inevitable impurities is heated to 1080° C. or higher, hot rolling is started, the total number of passes (–) from hot rolling start to hot rolling finish is set to N, a rolling temperature (° C.) at the ith pass is set to $TP_i$, and a reduction ratio (–) at the ith pass is set to $r_i$, the hot rolling is performed in such a manner that N, $TP_i$, and $r_i$ satisfy Expression A below, and the hot rolling is finished when the temperature of a base steel sheet is a temperature in the 850-to-980° C. range;

a primary cooling step in which an elapsed time from the finish of the hot rolling to start of cooling is set to 1.0 second or longer, the hot-rolled base steel sheet is primarily cooled at a cooling rate of not less than 5° C./second, nor more than 50° C./second, and the primary cooling is stopped when the temperature of the base steel sheet is a temperature in the 500-to-650° C. range;

subsequently to the primary cooling step, a secondary cooling step in which the base steel sheet is slowly cooled in such a manner that an elapsed time until the temperature of the base steel sheet becomes 400° C. from the temperature at the time of the primary cooling being stopped becomes one hour or longer, and is secondarily cooled;

after the secondary cooling, a cold rolling step of cold rolling the base steel sheet by setting the total reduction ratio to 30 to 75%;

after the cold rolling, an annealing step in which the temperature is increased in such a manner that an average temperature increasing rate in the 600-to-750° C. range becomes 20° C./sec or less, the cold-rolled base steel sheet is heated to a temperature of 750° C. or higher, and subsequently the heated base steel sheet is cooled, in such a manner that an average cooling rate in the 750-to-650° C. range becomes 1.0 to 15.0° C./second; and a plating step of performing hot-dip galvanizing on the surface of the base steel sheet obtained after the annealing step.

[Numerical expression 1]

$$0.10 \le \sum_{i=1}^{N} 1.00 \times 10^{10} \times \exp\left\{-\frac{2.44 \times 10^4}{(TP_i + 273)}\right\} \times \left\{\frac{1}{(1543 - TP_i)} - 1.00 \times 10^{-3}\right\} \times r_i \le 1.00 \quad \text{(Expression A)}$$

(10) The manufacturing method of the high-strength hot-dip galvanized steel sheet having excellent delayed fracture resistance according to (9), in which the annealing step and the plating step are continuously performed by a continuous annealing and plating line having a preheating zone, a reduction zone, and a plating zone, and further at least part of the preheating zone is set to an oxidation treatment zone where an air ratio being a value of the volume of air contained in a mixed gas per unit volume, being a mixed gas of air used for a burner for heating and combustion gas, divided by the volume of air theoretically required for completely combusting the combustion gas contained in the mixed gas per unit volume is 0.7 to 1.2, and in the oxidation treatment zone, oxides are generated in a surface layer portion of the base steel sheet obtained after the cold rolling, and next in the reduction zone where a partial pressure ratio $P(H_2O)/P(H_2)$ being a value of a water vapor partial pressure divided by a hydrogen partial pressure is 0.0001 to 2.0, the oxides are reduced, and then in the plating zone, the base steel sheet having passed through the reduction zone is immersed in a hot-dip galvanizing bath with a plating bath temperature set to 450 to 470° C. and an effective Al amount in the plating bath set to 0.01 to 0.18 mass %, under the condition that the temperature of the steel sheet at the time of entering the plating bath is 430 to 490° C., and thereby the hot-dip galvanizing is performed on the surface of the base steel sheet.

(11) The manufacturing method of the high-strength hot-dip galvanized steel sheet having excellent delayed fracture resistance according to (9), further includes:

after the plating step, an alloying treatment step for alloying a layer of the hot-dip galvanizing.

Advantageous Effects of Invention

According to the present invention, as a hot-dip galvanized steel sheet using a high-strength steel sheet as a base material, it is possible to obtain a high-strength hot-dip galvanized steel sheet that has excellent delayed fracture resistance and has small anisotropy of the delayed fracture resistance in spite of being a thin sheet without impairing ductility and strength. Thus, even when the high-strength hot-dip galvanized steel sheet of the present invention is used as a member on which a high load acts as a thin sheet, high safety can be secured, and there is a small risk that the high-strength hot-dip galvanized steel sheet is subjected to restrictions in terms of design and work, and thus it is possible to increase the degree of freedom of design and work to expand an application range of the high-strength hot-dip galvanized steel sheet.

DESCRIPTION OF EMBODIMENTS

Hereinafter, one embodiment of the present invention will be explained in detail.

A high-strength hot-dip galvanized steel sheet of this embodiment is basically that a high-strength steel sheet having a predetermined chemical composition and having an appropriately adjusted steel structure is set as a base material and on the surface of the steel sheet to be the base material, a hot-dip galvanizing layer is formed. Incidentally, the hot-dip galvanizing layer on the surface of a base steel sheet may also be one that is subjected to an alloying treatment after being subjected to hot-dip galvanizing (an alloyed hot-dip galvanizing layer). Here, the thicknesses of the high-strength hot-dip galvanized steel sheet of this embodiment and the steel sheet to be the base material are not limited in particular, but generally, anisotropy of delayed fracture resistance is likely to occur in a steel sheet having a thin sheet thickness, so that the effect of the present invention is also increased when the thickness of the base steel sheet is thin. It is thus appropriate to apply the present invention to the case where the base steel sheet is a thin sheet. Concretely, the sheet thickness of the high-strength hot-dip galvanized steel sheet is preferably 0.6 to 5.0 mm. That is, when the sheet thickness of the high-strength hot-dip galvanized steel sheet becomes less than 0.6 mm, it becomes difficult to keep the shape of the steel sheet flat. On the other hand, when the sheet thickness of the high-strength hot-dip galvanized steel sheet exceeds 5.0 mm, it becomes difficult to uniformly cool the inside of the steel sheet. Further, the sheet thickness of the base steel sheet is preferably 3.0 mm or less, and more preferably 2.0 mm or less.

In this embodiment, there is fabricated a high-strength hot-dip galvanized steel sheet capable of achieving secure reduction in anisotropy of delayed fracture resistance and simultaneously with sufficient improvement of the delayed fracture resistance while securing ductility (forming workability) and strength by (a) to (f) below.

(a) turning a main body of a microstructure of a steel structure of the base steel sheet into a soft ferrite phase.

(b) limiting non-recrystallized ferrite of the ferrite phase to a small amount and at the same time, controlling a retained austenite phase to a small amount.

(c) controlling a grain diameter ratio being a value of, of crystal grains in the ferrite phase, a grain diameter in the rolling direction divided by a grain diameter in the sheet width direction to be in an appropriate range.

(d) controlling a length ratio being a value of, of an island-shaped hard structure (island-shaped structure composed of an aggregate of hard phases such as mainly bainite, bainitic ferrite, martensite, and tempered martensite), a length in the rolling direction divided by a length in the sheet width direction to be in an appropriate range.

(e) controlling an average aspect ratio of inclusions (mainly Mn sulfides and/or coarse composite inclusions containing Mn sulfides) to be in an appropriate range.

(f) turning a surface layer of the base steel sheet into a relatively thick decarburized layer and dispersing oxides (oxides mainly containing Si and/or Mn) in the decarburized layer finely and highly densely.

Then, there will be explained reasons for limiting these conditions.

First, there will be explained reasons for limiting a chemical composition of the steel sheet to be used as the base material of the high-strength hot-dip galvanized steel sheet of the present invention. Incidentally, in the following description, "%" means mass % unless otherwise specified.

[C: 0.075 to 0.400 mass %]

C is contained for increasing strength of the steel sheet. However, when the content of C exceeds 0.400 mass %, weldability of the steel sheet becomes insufficient. In view of securing the weldability, the content of C is preferably 0.300 mass % or less, and more preferably 0.250 mass % or less. On the other hand, when the content of C is less than 0.075 mass %, the strength of the steel sheet decreases and it becomes difficult to secure the maximum tensile strength of 900 MPa or more. In order to further increase the strength of the steel sheet the content of C is preferably 0.085 mass % or more, and more preferably 0.100 mass % or more.

[Si: 0.01 to 2.00 mass %]

Si is an element that suppresses generation of iron-based carbide in the steel sheet and increases strength and formability of the steel sheet. However, when the content of Si exceeds 2.00 mass %, the steel sheet becomes brittle and ductility deteriorates to create a possibility that cold rolling becomes difficult to be performed. In view of securing the ductility, the content of Si is preferably 1.80 mass % or less and more preferably 1.50 mass % or less. On the other hand, when the content of Si is less than 0.01 mass %, it becomes difficult to sufficiently disperse oxides in the decarburized layer, In view of this, the lower limit value of Si is preferably 0.20 mass % or more and more preferably 0.50 mass % or more ,

[Mn: 0.80 to 3.50 mass %]

Mn is added for increasing strength of the steel sheet. However, when the content of Mn exceeds 3.50 mass %, a coarse Mn concentrated portion occurs in a sheet thickness center portion of the steel sheet. As a result, embrittlement of a slab occurs easily, and a trouble such as breaking of a cast slab occurs easily. Further, when the content of Mn exceeds 3.50 mass %, weldability also deteriorates. Therefore, the content of Mn needs to be 3.50 mass % or less. In view of securing the weldability, the content of Mn is preferably 3.00 mass % or less, and more preferably 2.70 mass % or less. On the other hand, when the content of Mn is less than 0.80 mass %, a large amount of soft structure is formed during cooling after annealing, and thus it becomes difficult to secure the maximum tensile strength of 900 MPa or more. Thus, the content of Mn needs to be 0.80 mass % or more. For further increasing the strength of the steel sheet, the content of Mn is preferably 1.00 mass % or more, and more preferably 1.30 mass % or more.

[P: 0.0001 to 0.100 mass %]

P tends to segregate in a sheet thickness center portion of the steel sheet, and embrittles a weld zone. When the content of P exceeds 0.100 mass %, the weld zone becomes quite brittle, and thus the upper limit of the content of P is set to 0.100 mass %. Further, in view of this, the content of P is more preferably 0.030 mass % or less. On the other hand, setting the content of P to less than 0.0001 mass % is accompanied by a great increase in manufacturing cost, so that 0.0001 mass % is set as the lower limit value. Incidentally, the content of P is more preferably 0.0010 mass % or more.

[S: 0.0001 to 0.0100 mass %]

S adversely affects weldability and manufacturability during casting and hot rolling. Thus, the upper limit value of the content of S is set to 0.0100 mass % or less. Further, S bonds to Mn to form coarse MnS and decreases ductility and stretch flangeability of the steel sheet, so that the content of S is preferably set to 0.0050 mass % or less, and more preferably set to 0.0030 mass % or less. However, setting the content of S to less than 0.0001 mass % is accompanied by a great increase in manufacturing cost, so that 0.0001 mass % is set as the lower limit value. Incidentally, the content of S is preferably 0.0005 mass % or more, and more preferably 0.0010 mass % or more.

[Al: 0.001 to 2.00 mass %]

Al suppresses generation of iron-based carbide to increase strength and formability of the steel sheet. However, when the content of Al exceeds 2.00 mass %, weldability worsens, and thus the upper limit of the content of Al is set to 2.00 mass %. Further, in view of this, the content of Al is preferably set to 1.50 mass % or less and more preferably set to 1.20 mass % or less. On the other hand, the effect of the present invention is exhibited without particularly setting the lower limit of the content of Al. However, Al is an inevitable impurity existing in the material in very small amounts and setting the content to less than 0.001 mass % is accompanied by a great increase in manufacturing cost. Thus, the content of Al is set to 0.001 mass % or more. Further, Al is an effective element as a deoxidizing material, so that in order to more sufficiently obtain the deoxidizing effect, the content of Al is preferably set to 0.010 mass % or more.

[N: 0.0001 to 0.0100 mass %]

N forms a coarse nitride and deteriorates ductility and stretch flangeability of the steel sheet, and thus its added amount needs to be suppressed. When the content of N exceeds 0.0100 mass %, this tendency becomes significant, so that the upper limit of the content of N is set to 0.0100 mass %. Further, N causes generation of blowholes during welding, and thus a smaller amount is better. The effect of the present invention is exhibited without particularly setting the lower limit of the content of N, but setting the content of N to less than 0.0001 mass % causes a great increase in manufacturing cost, and therefore, the lower limit is set to 0.0001 mass % or more.

[O: 0.0001 to 0.0100 mass %]

O forms an oxide and deteriorates ductility and stretch flangeability of the steel sheet, and thus its content needs to be suppressed. When the content of O exceeds 0.0100 mass %, the deterioration of stretch flangeability of the steel sheet becomes significant, and thus the upper limit of the content of O is set to 0.0100 mass %. Further, the content of O is preferably 0.0070 mass % or less, and more preferably 0.0050 mass % or less. The effect of the present invention is exhibited without particularly setting the lower limit of the content of O, but setting the content of O to less than 0.0001 mass % is accompanied by a great increase in manufacturing cost, and therefore, 0.0001 mass % is set to the lower limit, of the content of O. Further, in view of the manufacturing cost, the content of O is preferably 0.0003 mass % or more, and more preferably 0.0005 mass % or more.

Besides, one kind or two or more kinds of elements selected from Cr, Ni, Cu, Mo, B, and W may also be added to the base steel sheet of the alloyed hot-dip galvanized steel sheet of this embodiment as necessary. Reasons for adding these elements are as follows.

[Cr: 0.01 to 2.00 mass %

Cr suppresses phase transformation at high, temperature and is an element effective for achieving high strength of the steel sheet. Thus, Cr may also be added to a slab in place of part of C and/or Mn. When the content of Cr exceeds 2.00 mass %, workability of the slab in a hot rolling step is impaired and productivity decreases, and thus the content of Cr is set to 2.00 mass % or less. The effect of the present invention is exhibited without particularly setting the lower limit of the content of Cr, but the content of Cr is preferably 0.01 mass % or more for sufficiently obtaining the effect of achieving nigh strength of the steel sheet by the addition of Cr.

[Mi: 0.01 to 2.00 mass %]

Ni suppresses phase transformation at high temperature and is an element effective for achieving high strength of the steel sheet. Thus, Ni may also be added to the slab in place of part of C and/or Mn. When the content of Ni exceeds 2.00 mass %, weldability of the steel sheet is impaired, and thus the content of Ni is set to 2.00 mass % or less. The effect of the present invention is exhibited without particularly setting the lower limit of the content of Ni, but the content of Ni is preferably 0.1 mass % or more for sufficiently obtaining the effect of achieving high strength of the steel sheet by the addition of Ni.

[Cu: 0.01 to 2.00 mass %]

Cu is an element that increases strength of the steel sheet by existing as fine particles in steel. Thus, Cu can be added to the slab in place of part of C and/or Mn. When the content of Cu exceeds 2.00 mass %, weldability of the steel sheet is impaired, and thus the content of Cu is set to 2.00 mass % or less. The effect of the present invention is exhibited without particularly setting the lower limit of the content of Cu, but the content of Cu is preferably 0.01 mass % or more for sufficiently obtaining the effect of achieving high strength of the steel sheet by the addition of Cu.

[Mo: 0.01 to 2.00 mass %]

Mo suppresses phase transformation at high temperature and is an element effective for achieving high strength of the steel sheet. Thus, Mo may also be added to the slab in place of part of C and/or Mn. When the content of Mo exceeds 2.00 mass %, workability of the slab in the hot rolling step is impaired and productivity decreases, so that the content of Mo is set to 2.00 mass % or less. The effect of the present invention, is exhibited without particularly setting the lower limit of the content of Mo, but the content of Mo is preferably 0.01 mass % or more for sufficiently obtaining the effect of achieving nigh strength of the steel sheet by the addition of Mo.

[W: 0.01 to 2.00 mass %]

W suppresses phase transformation at high temperature and is an element effective for achieving high strength of the steel sheet, and may also be added to the slab in place of part of C and/or Mn. When the content of W exceeds 2.00 mass %, workability of the slab in the hot rolling step is impaired and productivity decreases, so that the content of W is s preferably 2.00 mass % or less. The effect of the present invention is exhibited without particularly setting the lower limit of the content of but the content of W is preferably 0.01 mass % or more for sufficiently obtaining the effect of achieving high strength of the steel sheet by W.

[B: 0.0001 to 0.0100 mass %]

B suppresses phase transformation at high temperature and is an element effective for achieving high strength of the steel sheet. Thus, B may also be added to the slab in place of part of C and/or Mn. When the content of B exceeds 0.0100 mass %, workability of the slab in the hot rolling step is impaired and productivity decreases, so that the content of B is set to 0.0100 mass % or less. In view of the productivity, the content of B is more preferably 0.0050 mass % or less, and still more preferably 0.0030 mass % or less. The effect of the present invention is exhibited without particularly setting the lower limit of the content of B, but the content of B is preferably set to 0.0001 mass % or more for sufficiently obtaining the effect of achieving high strength of the steel sheet by the addition of B. For further achieving high strength of the steel sheet, the content of B is more preferably 0.0003 mass % or more, and still more preferably 0.0005 mass % or more.

Further, one kind or two or more kinds of elements selected from Ti, Nb, and V may also be added to the base steel sheet of the alloyed hot-dip galvanized steel sheet of this embodiment as necessary. Reasons for adding these elements are as follows.

[Ti: 0.001 to 0.150 mass %]

Ti is an element that contributes to strength increase of the steel sheet by dislocation strengthening through precipitate strengthening, fine grain strengthening by growth suppression of ferrite crystal grains, and suppression of recrystallization. However, when the content of Ti exceeds 0.150 mass %, precipitation of carbonitride increases and formability of the steel sheet deteriorates, and thus the content of Ti is set to 0.150 mass % or less. In view of securing the formability of the steel sheet, the content of Ti is more preferably 0.100 mass % or less and still more preferably 0.070 mass % or less. The effect of the present invention is exhibited without particularly setting the lower limit of the content of Ti, but the content of Ti is preferably 0.001 mass % or more for sufficiently obtaining the strength increasing effect of the steel sheet by the addition of Ti. For further achieving high strength of the steel sheet, the content of Ti is more preferably 0.010 mass % or more, and still more preferably 0.015 mass % or more.

[Nb: 0.001 to 0.100 mass %]

Nb is an element that contributes to strength increase of the steel sheet by dislocation strengthening through precipitate strengthening, fine grain strengthening by growth suppression of ferrite crystal grains, and suppression of recrystallization. However, when the content of Nb exceeds 0.100 mass %, precipitation of carbonitride increases and formability of the steel sheet deteriorates, and thus the content of Nb is set to 0.100 mass % or less. In view of securing the formability of the steel sheet, the content of Nb is more preferably 0.050 mass % or less. The effect of the present invention is exhibited without particularly setting the lower limit of the content of Nb, but the content of Nb is preferably 0.001 mass % or more for sufficiently obtaining the strength increasing effect of the steel sheet by the addition of Nb. For further achieving high strength of the steel sheet, the content of Nb is preferably 0.010 mass % or more.

[V: 0.001 to 0.300 mass %]

V is an element that contributes to strength increase of the steel sheet by dislocation strengthening through precipitate strengthening, fine grain strengthening by growth suppression of ferrite crystal grains, and suppression, of recrystallization. However, when the content of V exceeds 0.300 mass %, precipitation of carbonitride increases and formability of the steel sheet deteriorates, and thus the content of V is set to 0.300 mass % or less. In view of securing the formability of the steel sheet, the content of V is more preferably 0.200 mass % or less, and still more preferably 0.150 mass % or less. The effect of the present invention is exhibited without particularly setting the lower limit of the content of V, but the content of V is preferably 0.001 mass % or more for sufficiently obtaining the strength increasing effect of the steel sheet by the addition of V.

Further, as other elements, 0.0001 to 0.0100 mass % in total of one kind or two or more kinds of Ca, Ce, Mg, Zr, La, and REM may also be added to the base steel sheet in the alloyed hot-dip galvanized steel sheet of this embodiment. Reasons for adding these elements are as follows.

Ca, Ce, Mg, Zr, La, and REM are elements effective for improving formability of the steel sheet, and one kind or two or more kinds of them can be added to the slab. However, when the total content of one kind or two or more kinds of Ca, Ce, Mg, Zr, La, and REM exceeds 0.0100 mass %, there is a risk that ductility of the steel sheet is impaired on the contrary. Therefore, the total content of the respective elements is preferably 0.0100 mass % or less. The effect of the present invention is exhibited without particularly setting the lower limit of the content of one kind or two or more kinds of Ca, Ce, Mg, Zr, La, and REM, but the total content of the respective elements is preferably 0.0001 mass % or more for sufficiently obtaining the effect of improving the formability of the steel sheet. In view of the formability of the steel sheet, the total content of one kind or two or more kinds of Ca, Ce, Mg, Zr, La, and REM is more preferably 0.0005 mass % or more, and still more preferably 0.0010 mass % or more.

Note that REM stands for Rare Earth Metal, and refers to an element belonging to the lanthanoid series. In this embodiment, REM or Ce is often added in misch metal, and may contain elements of the lanthanoid series other than La and Ce in a complex form. The effect of the present invention is exhibited even when elements of the lanthanoid series other than La and Ce are contained in the slab as inevitable impurities. Further, the effect of the present invention is exhibited even when metals La and Ce are added to the slab.

The balance other than the above respective elements of the base steel sheet only needs to be set to Fe and inevitable impurities. Incidentally, a very small amount of each of Cr, Ni, Cu, Mo, W, B, Ti, Nb, and V described above being less than the above-described lower limit value is allowed to be contained as an impurity. Further, regarding Ca, Ce, Mg, Zr, La, and REM as well, a minute amount of them being less than the above-described lower limit value of the total content of them is allowed to be contained as an impurity.

Next, there will be explained, the structure of the high-strength steel sheet to be used as the base material of the high-strength hot-dip galvanized steel sheet of this embodiment.

The structure of the high-strength steel sheet to be used as the base material of the high-strength hot-dip galvanized steel sheet of this embodiment is set that as its microstructure, in a range of ⅛ thickness to ⅜ thickness with the position of ¼ thickness of the sheet thickness of the steel sheet from the surface of the steel sheet being the center, 40 to 90% in volume fraction of a ferrite phase is contained and retained austenite is controlled to 5% or less in volume fraction. Then, the ferrite phase is set that a ratio of non-recrystallized ferrite to the entire ferrite phase is controlled to 50% or less in volume fraction.

Here, the reason why the structure in the range of ⅛ thickness to ⅜ thickness with the position of ¼ thickness of the sheet thickness of the steel sheet from the surface of the steel sheet being the center is controlled is because the structure in this range may be considered as one representing the structure of the entire steel sheet except for the decarburized layer in the surface layer portion of the steel sheet. That is, this is because as long as the above-described structure is formed in this range, the entire steel sheet except for the decarburized layer in the surface layer portion of the steel sheet can be determined to be the above-described structure.

As described above, the structure containing a large amount of ferrite is set, and at the same time, the ratio of non-recrystallized ferrite contained in the ferrite phase is controlled to 50% or less in volume fraction, and further retained austenite is controlled to be small in amount, and thereby it is possible to achieve the high-strength steel sheet whose delayed fracture resistance is improved while securing good ductility. Then, there will be next explained reasons for limiting these structure conditions.

[Ferrite: 40 to 90%]

Ferrite is a structure effective for improving ductility of the steel sheet, and 40 to 90% in volume fraction needs to be contained in the steel sheet structure. When the volume fraction of ferrite is less than 40%, there is a risk that sufficient ductility of the steel sheet cannot be obtained. The volume fraction of ferrite contained in the steel sheet structure is more preferably 45% or more, and still more preferably 50% or more in view of ductility of the steel sheet. On the other hand, ferrite is a soft structure, so that when its volume fraction exceeds 90%, there is a risk that sufficient strength of the steel sheet cannot be obtained. In order to sufficiently increase the strength of the steel sheet, the volume fraction of ferrite contained in the steel sheet structure is preferably set to 85% or less, and more preferably set to 75% or less.

[Retained Austenite: 5% or less]

Retained austenite is transformed to quite hard martensite during working to drastically increase work hardening ability, so that it is a structure effective for improving strength and ductility of the steel sheet and may be contained in the steel sheet. However, quite hard martensite transformed from retained austenite significantly promotes delayed fracture of the steel sheet caused by entry of hydrogen, to thus deteriorate the delayed fracture resistance. For this reason, the upper limit of the volume fraction of retained austenite is set to 5.0% or less. Further, in view of it, the volume fraction of retained austenite is preferably set to 3.0% or less, and may be 0%.

Here, the volume fraction of retained austenite can be measured in the following manner.

That is, X-ray analysis is performed on an observation surface that is a surface at the position of ¼ thickness of the the base steel sheet from the surface of the base steel sheet and is parallel to the sheet surface of the base steel sheet. Then, from a result thereof, an area fraction of retained austenite on the observation surface is calculated. In this embodiment, this area fraction is regarded as the volume fraction of retained austenite at ⅛ thickness to ⅜ thickness with the position of ¼ thickness of the sheet thickness of the base steel sheet from the surface of the base steel sheet being the center. Incidentally, the observation surface may be set at an arbitrary position of ⅛ thickness to ⅜ thickness as long as it is parallel to the sheet surface of the base steel sheet.

[Non-Recrystallized Ferrite: 50% or less to the Entire Ferrite Phase]

Ferrite includes three kinds: recrystallized ferrite in which recrystallization has been caused in an annealing step; non-recrystallized ferrite in which no recrystallization has been caused and crystal orientations after cold rolling remain; and transformed ferrite that has been once inverse transformed to austenite in an annealing step to then be phase transformed to ferrite.

Among them, the non-recrystallized ferrite is not preferable because crystal orientation s are deflected by cold rolling to increase the anisotropy of the steel sheet. In view of this, the ratio of non-recrystallized ferrite to the entire ferrite is set to less than 50% in volume fraction. Further, inside the non-recrystallized ferrite, many dislocations and/or dislocation substructures exist, so that the existence of a large amount of non-recrystallized ferrite causes a decrease in ductility of the steel sheet. In view of this, the volume fraction of non-recrystallized ferrite in the steel sheet needs to be decreased, the volume fraction of non-recrystallized ferrite to the entire ferrite is preferably set to less than 30%, and more preferably set to less than 15%. The lower volume fraction of non-recrystallized ferrite is more preferable, and may also be 0%.

Here, the volume fraction of non-recrystallized ferrite can be measured as follows.

That is, the non-recrystallized ferrite has a characteristic that a crystal orientation changes in a single crystal grain because many dislocations and/or dislocation substructures exist inside non-recrystallized ferrite. Further, bainite, bainitic ferrite, martensite, and tempered martensite constituted by BCC crystal of iron other than ferrite each also have many dislocations and/or dislocation substructures there inside similarly to non-recrystallized ferrite, to thus have a characteristic that a crystal orientation changes in a single crystal grain similarly. On the other hand, in each crystal grain of recrystallized ferrite and transformed ferrite, a disorientation of 1.0° or more does not exist.

By this characteristic, the non-recrystallized ferrite and the other ferrites can be distinguished by performing high-resolution crystal orientation analysis using an EBSD (Electron Bach-Scattering Diffraction) method in a visual field where FE-SEM observation has been performed to measure structural fractions. Concretely, a surface that is at the position of ¼ thickness of the sheet thickness of the base steel sheet from the surface of the base steel sheet and is parallel to the sheet surface of the base steel sheet is mirror-finished, and is subjected to the high-resolution crystal orientation, analysis using an EBSD method at a measurement step of 0.5 μm. Next, a crystal misorientation between a second proximity measurement point and each measurement point is obtained, points each having a crystal misorientation of 5.0° or more are ignored as a point to be determined to belong to a different crystal grain, and there is obtained an average value of crystal misorientations of a group of the remaining second proximity measurement points each having a crystal misorientation of 5.0° or less and determined to be in the same crystal grain. Then, it is possible that the points each having the average value of less than 1.0° are determined to be recrystallized ferrite or transformed ferrite to obtain an area fraction of them. Then, by comparing the area fraction of the entire ferrite obtained by FE-SEM observation and the area fractions of recrystallized ferrite and transformed ferrite, the area fraction of the non-recrystallized ferrite and the ratio of the non-recrystallized ferrite to the entire ferrite can be obtained. In this embodiment, the area fraction of non-recrystallized ferrite obtained in this manner is regarded as the volume fraction of non-recrystallized ferrite.

[Other Steel Structures]

As the steel structures other than the above-described ferrite phase (including non-recrystallized ferrite; and retained austenite phase, bainite, bainitic ferrite, and martensite (tempered martensite or fresh martensite) are normally contained, and further pearlite and coarse cementite are sometimes contained. Ratios of these structures are not limited in particular to be preferably controlled depending on the intended use. For example, a high yield ratio (=yield stress/tensile strength) is required in the steel sheet, the ratio (volume fraction) of bainite, bainitic ferrite, martensite, tempered martensite, pearlite, and so on is preferably set to 40% or more in total. On the other hand, when further improvement of ductility of the steel sheet is required, the ratio (volume fraction) of bainite, bainitic ferrite, martensite, tempered martensite, pearlite, and so on is preferably set to 40% or less in total.

Incidentally, as described previously, the ratio of each of the steel structures other than the ferrite phase (including non-recrystallized ferrite) and the retained austenite phase is not limited in particular, but each preferable range and its reason are as follows.

[Fresh Martensite: 40% or less]

Fresh martensite is a structure to greatly improve tensile strength. When the ratio of fresh martensite exceeds 40% in volume fraction, ductility of the steel sheet deteriorates greatly. Therefore, fresh martensite may also be contained in the base steel sheet with 40% in volume fraction set as the upper limit. In order to sufficiently increase the tensile strength of the steel sheet, the volume fraction of fresh martensite is preferably set to 4% or more. On the other hand, fresh martensite becomes a starting point of fracture to deteriorate low-temperature toughness, so that the volume fraction of fresh martensite is preferably set to 20% or less, more preferably set to 15% or less, and still more preferably set to 12% or less.

[Tempered Martensite: 50% or less]

Tempered martensite is a structure to greatly improve tensile strength of the steel sheet and does not easily become a starting point of fracture of the steel sheet, so that 50% or less in volume fraction may also be contained in the steel sheet structure. When the volume fraction of tempered martensite exceeds 50%, ducility of the steel sheet greatly deteriorates, which is not preferable.

(Bainitic Ferrite and/or Bainite: 60% or less)

Bainitic ferrite and/or bainite are/is excellent structures/an excellent structure contributing to a balance between strength and ductility of the steel sheet, and may also be contained in the steel sheet structure in a volume fraction of 60% or less. Further, bainitic ferrite and bainite are microstructures each having an intermediate strength between soft ferrite and hard martensite and having an intermediate strength between tempered martensite and retained austenite. Thus, when being utilized with the aim of sophistication of the steel sheet, these structures are both contained in the steel sheet, to thereby decrease a local hard difference inside the steel sheet and to provide an effect of suppressing occurrence of fracture, which is preferable in view of low-temperature toughness. In order to sufficiently obtain this effect, the volume fraction of bainitic ferrite and/or bainite is preferably 10% or more, and more preferably 15% or more. On the other hand, when the volume fraction of bainitic ferrite and/or bainite exceeds 60%, ductility of the steel sheet deteriorates, which is not preferable. In view of securing the ductility of the steel sheet, the volume fraction of bainitic ferrite and/or bainite is preferably set to 50% or less, and more preferably set to 45% or less.

Besides, in the steel sheet structure of the high-strength steel sheet set as the base material in this embodiment, structures such as pearlite and/or coarse cementite other than the above may also be contained. However, when pearlite and/or coarse cementite are/is increased in the steel sheet structure of the high-strength steel sheet, bendability of the steel sheet deteriorates. From this, the volume fraction of pearlite and/or coarse cementite contained in the steel sheet structure is preferably 6% or less, and more preferably 4% or less in total.

The volume fractions of the respective structures contained in the steel sheet structure of the high strength steel sheet to be used as the base material in this embodiment can be measured by the following methods, for example.

X-ray analysis is performed on an observation surface that is at ¼ thickness of the base steel sheet and is parallel to the sheet surface of the base steel sheet, and from a result thereof, an area fraction of retained austenite is calculated, and this area fraction can be regarded as the volume fraction of retained austenite.

Here, the volume fractions of the respective structures, namely ferrite, bainitic ferrite, bainite, tempered martensite, and fresh martensite can be obtained as follows.

First, a cross section parallel to the rolling direction of the base steel sheet and perpendicular to the sheet surface is set as an observation surface, and a sample is taken therefrom. Next, the observation surface is polished and nital-etched. Next, the range of ⅛ thickness to ⅜ thickness with the position of ¼ thickness of the sheet thickness of the base steel sheet from the surface of the base steel sheet being the center is observed by a field emission scanning electron microscope (FE-SEM: Field Emission Scanning Electron Microscope) to measure area fractions of the respective structures, and these area fractions can be regarded as the volume fractions of the respective structures.

Further, regarding the steel sheet to be used as the base material in this embodiment, (a) to (c) below are set in order to reduce the anisotropy of the delayed fracture resistance.

(a) adjusting a grain diameter ratio being a value of, of crystal grains of the ferrite phase in a surface parallel to the sheet surface (rolled surface) of the steel sheet, a grain diameter in the rolling direction divided by a grain diameter in the sheet width direction (direction perpendicular to the rolling direction) (=a grain diameter in the rolling direction÷a grain diameter in the sheet width direction) to be in the 0.75-to-1.33 range.

(b) adjusting a length ratio being a value of, of a hard structure (hard phase) dispersed in an island shape in a surface parallel to the sheet surface (rolled surface) of the steel sheet, a length in the rolling direction divided by a length in the sheet width direction (= a length in the rolling direction ÷ a length in the sheet width direction) to be in the 0.75-to-1.33 range.

(c) adjusting an average aspect ratio of inclusions in a surface parallel to the sheer surface (rolled surface) of the steel sheet to 5.0 or less. Hereinafter, there will be explained limiting reasons and measuring methods of these.

[Ratio of, of Crystal Grams of the Ferrite Phase, a Grain Diameter in the Rolling Direction and a Grain Diameter in the Sheet Width Direction]

When ferrite crystal grains are extended in a specific direction in a surface parallel to the sheet surface (rolled surface), in-plane anisotropy of the delayed fracture resistance is enhanced. Of crystal grains of the ferrite phase, an average grain diameter in the rolling direction is set to d(RD) and an average grain diameter in the sheet width direction is set to d(TD). When d(RD)/d(TD) falls below 0.75, the delayed fracture resistance in the rolling direction of the steel sheet decreases with respect to the sheet width direction. Therefore, the ratio of, of crystal grains of the ferrite phase, a grain diameter in the rolling direction and a grain diameter in the sheet width direction, namely d(RD)/d(TD) is set to 0.75 or more. Incidentally, d(RD)/d(TD) is preferably 0.80 or more, and more preferably 0.85 or more. Similarly, when d(RD)/d(TD) exceeds 1.33, the delayed fracture resistance in the rolling direction of the steel sheet decreases with respect to the sheet width direction. Therefore, 1.33 is set to the upper limit of d(RD)/d(TD). Incidentally, d(RD)/d(TD) is preferably 1.25 or less, and more preferably 1.18 or less.

Incidentally, measurement of the grain diameters in the respective directions of crystal grains of the ferrite phase can be performed as follows.

That is, a surface that is at ¼ thickness of the sheet thickness of the base steel sheet from the surface of the base steel sheet and is parallel to the sheet surface of the base steel sheet is corroded by nital and the surface is observed by a FE-SEM. Grain diameters in the rolling direction and the sheet width direction of each of 100 to 1000 crystal grains of the ferrite phase that are chosen randomly in the observation are measured.

[Ratio of, of an Island-Shaped Hard Structure, a Length in the Rolling Direction and a Length in the Sheet Width Direction]

The hard structure is that plural crystal grains aggregate to exist in an island shape in a surface parallel to the sheet surface (rolled surface) of the steel sheet. When this island-shaped hard structure is extended in a specific direction in a surface parallel to the sheet surface (rolled surface) of the steel sheet, the in-plane anisotropy of the delayed fracture resistance in the steel sheet is enhanced. Of island-shaped hard structures in a surface parallel to the sheet surface (rolled surface) of the steel sheet, an average length in the rolling direction is set to L(RD) and an average length in the sheet width direction is set to L(TD). When L(RD)/L(TD) falls below 0.75, the delayed fracture resistance in the rolling direction of the steel sheet decreases with respect to the sheet width direction, so that the value of, of the hard structure, the length in the rolling direction divided by the length in the sheet width direction, namely the value of L(RD)/L(TD) is set to 0.75 or more.

Incidentally, L(RD)/L(TD) is preferably 0.80 or more, and more preferably 0.85 or more. Similarly, when L(RD)/L(TD) exceeds 1.33, the delayed fracture resistance in the sheet width direction of the steel sheet decreases with respect to the rolling direction, so that 1.33 is set to the upper limit. L(RD)/L(TD) is preferably 1.25 or less, and more preferably 1.18 or less.

Incidentally, the island-shaped hard structure here means an island-shaped structure composed of an aggregate of hard phases such as bainite, bainitic ferrite, martensite, and tempered martensite mainly, in other words, a structure in which plural crystal grains composed of phases harder than ferrite aggregate to form an island shape to be dispersed in a parent phase made of a ferrite phase.

Measurement of the length ratio of the island-shaped hard structure can be performed as follows.

That is, first, a surface that is at ¼ thickness of the sheet thickness of the base steel sheet from the surface of the base steel sheet and is parallel to the sheet surface of the base steel sheet is mirror finished to be subjected to high-resolution crystal orientation analysis using an EBSD method at a measurement step of 0.5 μm. Next, a crystal misorientation between a second proximity measurement point and each measurement point is obtained, points each having a crystal misorientation of 5.0° or less and determined to be in the same crystal grain are only extracted, and an average value of crystal misorientations of a group of the points is obtained. Then, the points each having the average value of 1.0° or more are mapped. The points each having the average crystal disorientation of 1.0° or more are sometimes non-recrystallized ferrite as well as the hard structure. Thus, after the crystal orientation analysis, the same visual field as that used for the crystal orientation analysis is corroded by nital and is observed by a FE-SEM to obtain a dispersed state of ferrite. Then, by comparing the dispersed state of ferrite and the result of the crystal orientation analysis, only the hard structures can be extracted. In 30 to 300 island-shaped hard structures randomly chosen from the island-shaped hard structures obtained as above, lengths in the rolling direction and the sheet width direction of the base steel sheet are measured and their ratio is obtained.

[Aspect Ratio of Inclusions]

An extended coarse Mn sulfide and/or a coarse composite inclusion containing Mn sulfide significantly deteriorate/deteriorates the delayed fracture resistance of true steel sheet. When the average aspect ratio of inclusions exceeds 5.0, the delayed fracture resistance of the steel sheet cannot be obtained sufficiently, so that it is necessary to set the average aspect ratio of inclusions contained in the base steel sheet to 5.0 or less. In view of securing the delayed fracture resistance of the steel sheet, the average aspect ratio of inclusions is preferably 4.0 or less, and more preferably 3.0 or less. The smaller the aspect ratio of inclusions is, the more preferable it is, and 1.0 is set to the lower limit of the aspect ratio of inclusions. Incidentally, the aspect ratio of inclusions here means, when a two-dimensional shape of an inclusion is approximated to an ellipse, a value of, of the ellipse, a major axis divided by a minor axis (= a major axis ÷ a minor axis).

Further, as long as the above-described coarse inclusions are each in a shape selectively extended in a specific direction, the anisotropy of the delayed fracture resistance in the steel sheet becomes strong significantly. Of inclusions in a surface parallel to the sheet surface (rolled surface) of the steel sheet, an average length in the rolling direction is set to D(RD) and an average length in the sheet width direction is set to D(TD). When D(RD)/D(TD) falls below 0.50, the delayed fracture resistance in the rolling direction of the steel sheet deteriorates with respect to the sheet width direction. On the other hand, when D(RD)/D(TD) exceeds 2.00, the delayed fracture resistance in the sheet width direction of the steel sheet deteriorates with respect to the rolling direction. In order to reduce the anisotropy of the delayed fracture resistance in the steel sheet, D(RD)/D(TD) is preferably in the 0.5-to-2.0 range. The lower limit of D(RD)/D(TD) is preferably 0.60 or more, and more preferably 0.70 or more. The upper limit of D(RD)/B(TD) is preferably 1.67 or less, and more preferably 1.43 or less.

The average aspect ratio of inclusions can be obtained as follows.

That is, a cross section parallel to the rolling direction of the base steel sheet and perpendicular to the sheet surface is mirror-finished as an observation surface. Thereafter, by using a FE-SEM, 10 to 100 inclusions each having a grain diameter of 2 μm or more are observed in a range of ⅛ thickness to ⅞ thickness, and an aspect ratio of each of them is obtained. Then, an average value of them is set to an average aspect ratio. Further, also on a cross section perpendicular to the rolling direction of the base steel sheet and perpendicular to the sheet surface, the similar observation is performed, and an average aspect ratio is obtained. The larger average aspect ratio of the two is set to the average aspect ratio of inclusions in the steel sheet.

Further, the length in the rolling direction of inclusions D(RD) can be obtained as follows.

That is, a cross section parallel to the rolling direction of the base steel sheet and perpendicular to the sheet surface is mirror-finished as an observation surface. Thereafter, by using a FE-SEM, 10 to 100 inclusions each having a grain diameter of 2 μm or more are observed in a range of ⅛ thickness to ⅞ thickness. Then, the length along the rolling direction of each of the observed inclusions is measured and an average value of the lengths is set to the length in the rolling direction of inclusions D(RD).

Similarly, on a cross section perpendicular to the rolling direction of the steel sheet and perpendicular to the sheet surface, the length of inclusions in the sheet width direction of inclusions D(TD) is obtained.

Incidentally, when observing inclusions, composition analysis of inclusions is performed by using an energy dispersive X-ray spectrometer provided with the FE-SEM to confirm that all or some of inclusions are Mn sulfides, and the observation is performed.

[Degree of Deflection of Crystal Orientations]

Further, when the degree of deflection of crystal orientations in the steel structure is high in the base steel sheet, the anisotropy of the delayed fracture resistance in the steel sheet is enhanced. That is, when crystal orientations of ferrite and hard structures (bainite, bainitic ferrite, martensite, and tempered martensite) are deflected in one or two or more specific directions, the anisotropy of the delayed fracture resistance in the steel sheet is enhanced. Thus, in this embodiment, the degree of deflection of these structures is determined by an X-ray random intensity ratio of BCC iron at the position of ¼ thickness of the sheet thickness of the base steel sheet from the surface of the base steel sheet (a phase of a structure having a body-centered cubic lattice structure of the steel structure). Concretely, the X-ray random intensity ratio is preferably controlled to 4.0 or less. A reason thereof is as follows.

The above-described structures are all constituted of BCC crystals of iron (crystals of a body-centered cubic lattice). Thus, a texture of BCC crystals of iron is measured by an X-ray diffraction method, thereby making it possible to evaluate the degree of deflection of the structures. The X-ray random intensity ratio of BCC iron only needs to be obtained from an orientation distribution function (Orientation Distribution Function, which will be called ODF, hereinafter), that is calculated by a series expansion method based on a plurality of pole figures out of pole figures of {110}, {100}, {211}, and {310} measured by X-ray diffraction and shows a three-dimensional texture. Incidentally, the X-ray random intensity ratio is a numerical value obtained by measuring X-ray intensities of a standard sample not having accumulation in a specific orientation and a test sample under the same conditions by an X-ray diffraction method, or the like and dividing the obtained X-ray intensity of the test sample by the X-ray intensity of the standard sample.

Fabrication of the samples for X-ray diffraction is performed as follows. The steel sheet is polished to a predetermined position in the sheet thickness direction by mechanical polishing, chemical polishing, or the like, to remove strain by electrolytic polishing, chemical polishing, or the like as necessary, and at the same time, the sample is adjusted in such a manner that a surface at the position of ¼ thickness of the sheet thickness of the base steel sheet from the surface of the base steel sheet becomes a measurement surface. Note that it is difficult to position the measurement surface at ¼ thickness precisely. Thus, the sample only needs to be fabricated in such a manner that a region within a range of 3% of the sheet thickness with the targeted position (position of ¼ thickness of the sheet thickness of the base steel sheet from the surface of the base steel sheet) being the center becomes a measurement surface. Further, when the measurement by X-ray diffraction is difficult, a statistically sufficient number of measurements may also be performed by an EBSD method.

In order to sufficiently reduce the anisotropy of the delayed fracture resistance, peak intensities on respective cross sections at $\phi2=0°$, $45°$, $60°$ in Euler space are obtained in the above-described orientation distribution function (ODF) and by the maximum value of the peak intensities, the degree of deflection of the structures is evaluated. In order to sufficiently reduce the anisotropy of the delayed fracture resistance in the steel sheet, the peak intensity is desirably set to 4.0 or less. For the reduction in the anisotropy of the delayed fracture resistance in the steel sheet, the lower peak intensity is more preferable, and it is more preferably set to 3.5 or less, and still more preferably set to 3.0 or less. The lower limit of the peak intensity is not obtained in particular, but it is quite difficult to set the peak intensity to less than 1.5 industrially, so that it is preferably set to 1.5 or more.

[Decarburized Layer]

In this embodiment, in order to prevent occurrence of delayed fracture caused by hydrogen to enter from the surface of the steel sheet, a microstructure of the surface layer portion (surface layer) of the base steel sheet is controlled. Concretely, in order to prevent delayed fracture starting from the surface layer portion of the base steel sheet, the surface layer portion of the base steel sheet is turned into a decarburized layer whose hard structures are reduced, and in the decarburized layer, fine oxides working as trap sites for hydrogen are dispersed highly densely. In this embodiment, diffusion of hydrogen into the inside from the surface layer portion of the base steel sheet is prevented in this manner, to thereby improve the delayed fracture resistance of the steel sheet. That is, (a) to (c) below are set.

(a) turning the surface layer of the base steel sheet into a decarburized layer having a thickness of 0.01 to 10.0 μm.

(b) setting an average grain diameter of oxides in the decarburized layer to 500 nm or less.

(c) making an average density of oxides in the decarburized layer fall within a range of $1.0 \times 10^{12}$ oxides/m$^2$ to $1.0 \times 10^{16}$ oxides/m$^2$.

These limiting reasons are as follows.

The base steel sheet has the decarburized layer having a sufficient thickness (layer whose hard structures are reduced) in the surface layer portion, to thereby make it possible to suppress delayed fracture starting from the surface layer portion. When the thickness of the decarburized layer is less than 0.01 μm, the delayed fracture in the surface layer portion of the base steel sheet is not suppressed, so that the thickness of the decarburized layer is set to 0.01 μm or more. In order to sufficiently improve the delayed fracture resistance of the steel sheet, the thickness of the decarburized layer is preferably set to 0.10 μm or more, and more preferably 0.30 μm or more. On the other hand, an excessively thick decarburized layer decreases tensile strength and fatigue strength of the steel sheet. In view of this, the thickness of the decarburized layer is set to 10.0 μm or less. In view of the fatigue strength, the thickness of the decarburized layer is preferably 9.0 μm or less, and more preferably 8.0 μm or less.

Incidentally, the decarburized layer is a region continuing from an uppermost surface of a base iron inside the steel sheet, and indicates a region where the volume fraction of hard structure is equal to or less than half the volume fraction of the hard structure at the position of ¼ thickness of the thickness of the base steel sheet (the potion of base iron). Further, the hard structure said herein indicates a structure composed of phases harder than ferrite, namely a structure composed of phases such as mainly bainite, bainitic ferrite, martensite, tempered martensite, and retained austenite.

Further, the thickness of the decarburized layer is determined as follows. That is, a measurement surface obtained by mirror finishing a cross section parallel to the rolling direction of the steel sheet and perpendicular to the sheet surface is observed by using a FE-SEM, the thickness of the decarburized layer is measured at three places or more in the single steel sheet, and an average value of the thicknesses is set to the thickness of the decarburized layer.

[Oxides in the Decarburized Layer]

Density and grain diameters of oxides (oxides containing Si and/or Mn mainly) dispersedly existing in the decarburized layer of the steel sheet also greatly affect the delayed fracture resistance of the steel sheet. That is, the oxides dispersed in crystal grains and/or at crystal grain boundaries in the decarburized layer of the steel sheet function as trap sites for external hydrogen to suppress entry of hydrogen into the inside of the steel street, to thus contribute to improvement of the delayed fracture resistance of the steel sheet. As the density of oxides is higher, the entry of hydrogen is suppressed, so that the density of oxides is set to $1.0 \times 10^{12}$ oxides/m$^2$ or more. In order to more sufficiently suppress the entry of hydrogen into the inside of the steel sheet, the density of oxides is preferably set to $3.0 \times 10^{12}$ oxides/m$^2$ or more, and more preferably set to $5.0 \times 10^{12}$ oxides/m$^2$ or more. On the other hand, when the density of oxides exceeds $1.0 \times 10^{16}$ oxides/m$^2$, a distance between oxides becomes small excessively, the surface layer portion of the steel sheet is broken by light working, and a plating layer on an outer side thereof is also broken. Therefore, the density of oxides is set to $1.0 \times 10^{16}$ oxides/m$^2$ or less. In order for the surface layer portion of the steel sheet to exhibit sufficient formability, the density of oxides is preferably set to $5.0 \times 10^{15}$ oxides/m$^2$ or less, and more preferably set to $1.0 \times 10^{15}$ oxides/m$^2$ or less.

Further, as the oxides to be dispersed in the surface layer portion (decarburized layer) of the base steel sheet are finer, they are effective as trap sites for hydrogen. Therefore, the average grain diameter of oxides is set to 500 nm or less. In order to more effectively suppress diffusion of hydrogen, the average grain diameter of oxides is preferably set to 300 nm or less, and more preferably set to 100 nm or less. Although the lower limit of the average grain diameter of oxides is not particularly set, for setting the average grain diameter to less than 30 nm, it is necessary to strictly control treatment atmospheres and temperatures in manufacturing processes of the base steel sheet, which becomes difficult in practical application. Thus, the average grain diameter of oxides is preferably set to 30 nm or more.

Incidentally, the oxides in the surface layer portion (decarburized layer) of the base steel sheet are observed on a measurement surface obtained by mirror-finishing a cross section parallel to the rolling direction of the steel sheet and perpendicular to the sheet surface by using a FE-SEM. The density of oxides is obtained by observing 7 μm$^2$ of the decarburized layer to count the number of oxide, or by using an observation area required for counting up to 1000 oxides. Here, the observation area means a two-dimensional area of the portion to observe oxides. Further, the average grain diameter of oxides is obtained by averaging circle-equivalent diameters of 100 to 1000 oxides chosen randomly. Here, the circle-equivalent diameter means the square root of the product of a major axis diameter and a minor axis diameter of a two-dimensional shape of the portion to observe oxides.

[Work Hardening Coefficient (n Value) of the Base Steel Sheet]

As evaluation of workability of the base steel sheet, it is effective to use a work hardening coefficient (n value), and the n value of the base steel sheet in the high-strength hot-dip galvanized steel sheet of this embodiment is desirably 0.060 or more. When the n value of the base steel sheet is less than 0.060, workability of the steel sheet deteriorates to cause a risk that fracture occurs in the steel sheet during hard forming work.

[Index of the Anisotropy of the Delayed Fracture Resistance]

The delayed fracture resistance is ascribable to the fact that hydrogen to enter externally mainly diffuses into the inside of the steel sheet to cause hydrogen embrittlement. Therefore, as an index of the anisotropy of the delayed fracture resistance, particularly an index of the in-plane anisotropy, it is possible to use a ratio H(RD)/H(TD) being a value of a limit diffusible hydrogen content H(RD) in the rolling direction in a surface parallel to the sheet surface (rolled surface) of the base steel sheet divided by a limit diffusible hydrogen content H(TD) in the sheet width direction in the surface parallel to the sheet surface (rolled surface) of the base steel sheet similarly. In the high-strength hot-dip galvanized steel sheet of this embodiment, the value of the above-described ratio H(RD)/H(TD) of the base steel sheet is desirably in the 0.5-to-2.0 range, and more desirably in the 0.5-to-1.5 range. When the value of the above-described ratio H(RD)/H(TD) is less than 0.5, or exceeds 2.0, the in-plane anisotropy of the delayed fracture resistance in the steel sheet is large, and in order to secure safety when the steel sheet is used as a member to which a large load is applied, restriction in terms of design or work increases.

Incidentally, the limit diffusible hydrogen content here means a hydrogen content in the steel sheet when hydrogen is forced to enter (be charged in) the inside from the surface of the steel sheet and a load (stress) is applied to the steel sheet and fracture occurs (on the contrary, a limit hydrogen content that does not cause fracture by hydrogen embrittlement). Then, the limit diffusible hydrogen content in the rolling direction in a surface parallel to the sheet surface (rolled surface) of the base steel sheet means a limit diffusible hydrogen content when a load is applied to the steel sheet in the rolling direction. The limit diffusible hydrogen content in the sheet width direction in a surface parallel to the sheet surface (rolled surface) of the base steel sheet means a limit diffusible hydrogen content when a load is applied to the steel sheet in the sheet width direction.

As a method of measuring the limit diffusible hydrogen content for evaluating the anisotropy of the delayed fracture resistance, the following method can be applied with reference to Non-Patent Literature 1. Also in steel sheets in examples to be described later, limit diffusible hydrogen contents in the rolling direction and in the sheet width direction of a base steel sheet were measured by the method.

That is, from the steel sheet, test pieces long in the rolling direction and long in the sheet width direction are first cut out, and the test pieces are each preliminarily worked into a U shape. Then, a stress of 0.6 times the tensile strength is applied to a U-shaped worked portion of each of the test pieces, and then the test pieces are charged with hydrogen by cathode electrolysis at a current density of 0.05 mA/cm$^2$ in a 0.3% ammonium thiocyanate solution, and a hydrogen content in each of the test pieces immediately after fracture is measured by a temperature-programmed analysis by gas chromatography. The respective hydrogen contents of the rolling direction test piece and the sheet width direction test piece that are measured in this manner are set to the limit diffusible hydrogen content in the rolling direction and the limit diffusible hydrogen content in the sheet width direction respectively.

Further, as evaluation of the delayed fracture resistance itself of the steel sheet, U-shaped test pieces in the two directions that are prepared in the same manner as the above are immersed in hydrochloric acid, and the case where one or more of the test pieces are fractured within 24 hours is determined that the delayed fracture resistance is poor.

[Hot-Dip Galvanizing Layer]

The high-strength hot-dip galvanized steel sheet of this embodiment is that the hot-dip galvanizing layer is formed on the decarburized layer in the previously described base steel sheet. An adhesion amount of the hot-dip galvanizing layer is not particularly limited, but is desirably 20 g/m$^2$ or more in view of corrosion resistance of the steel sheet and is desirably 150 g/m$^2$ or less in view of economic efficiency.

Further, this hot-dip galvanizing layer may also be an alloyed layer mainly composed of a Zn—Fe alloy (alloyed hot-dip galvanizing layer). The alloyed layer mainly composed of a Zn—Fe alloy (alloyed hot-dip galvanizing layer) is formed in a manner that a Zn plating layer is formed on the surface of the base steel sheet by hot-dip galvanizing to then be reheated to a temperature equal to or higher than the melting point of Zn and is subjected to an alloying treatment to diffuse Fe in the base steel sheet into the plating layer. In this case, the average content of Fe in the alloyed hot-dip galvanizing layer is preferably in the 8.0-to-12.0 mass % range. Further, even when the not-dip galvanizing layer contains one kind or two or more kinds of Pb, Sb, Si, Sn, Mg, Mn, Ni, Cr, Co, Ca, Cu, Li, Ti, Be, Bi, Sr, I, Cs, and REM in small amounts in addition to Zn and Fe, the effect of the present invention is not impaired. Further, depending on its/their amount, this has an advantage such as improvements in corrosion resistance and workability.

Next, there will be explained one example of a method of manufacturing the high-strength hot-dip galvanized steel sheet of this embodiment.

[Casting of a Slab]

First, a slab having chemical components (composition) controlled with respect to the previously described base steel sheet is cast in accordance with an ordinary method such as continuous casting or a thin slab caster, and the slab is hot rolled. Incidentally, the manufacturing method of the high-strength hot-dip galvanized steel sheet of this embodiment is also compatible with a process such as continuous casting-direct rolling (CC-DR) in which hot rolling is performed immediately after casting.

[Heating of the Slab]

The obtained slab is heated to a temperature of 1080° C. or higher, preferably 1180° C. or higher for hot rolling. In order to suppress anisotropy of crystal orientations ascribable to the casting, it is necessary to set a slab heating temperature to 1080°0 C. or higher, preferably 1180° C. or higher. Further, in view of the above, the slab heating temperature is more preferably set to 1200° C. or higher. The upper limit of the slab heating temperature is not particularly set, but in order to heat it at higher than 1300° C., a large amount of energy needs to be applied, so that the slab heating temperature is preferably set to 1300° C. or lower.

[Hot Rolling]

After heating the slab, hot rolling is performed, When rolling is performed in hot working, hardness of inclusions decreases at high temperature. Therefore, when excessive reduction is performed at high temperature, inclusions are extended in one direction, resulting in that the delayed fracture resistance in the steel sheet deteriorates and its anisotropy also increases. In order to avoid this, the hot rolling is performed in a range satisfying Expression 1 below. Incidentally, in Expression 1, N of the hot rolling represents the total number of passes of rolling. Further, the content of Σ represents an expression to the ith pass in the hot rolling, i represents a pass number (i=1 to N), $TP_i$ a represents a rolling temperature at the ith pass (° C.), and $r_i$ represents a reduction ratio at the ith pass (–). As the pass is earlier in terms of time, the value of the pass number i becomes a smaller value.

[Numerical expression 2]

$$0.10 \leq \sum_{i=1}^{N} 1.00 \times 10^{10} \times \exp\left\{-\frac{2.44 \times 10^4}{(TP_i + 273)}\right\} \times \left\{\frac{1}{(1543 - TP_i)} - 1.00 \times 10^{-3}\right\} \times r_i \leq 1.00 \quad \text{(Expression 1)}$$

Expression 1 is an expression for evaluating the degree of extension of inclusions by the rolling. Expression 1 expresses that as the value of Expression 1 is smaller, inclusions are extended isotropically to be harmless. The exponential term in Expression 1 is a term related to distribution of strain between an iron part of the steel sheet and inclusions. The term expresses that as the value of this exponential term is larger, strain enters inclusions easily and the inclusions are easily extended in one direction. In Expression 1, the term of $\{1/(1540-TP_i)-1.00\times10^{-3}\}$ is a term related to softness of inclusions. The term expresses that, as the value of this term is larger, inclusions are soft and are easily extended in one direction.

Thus, in this embodiment, a reduction amount and a rolling temperature in each pass are controlled in such a manner that the value of Expression 1 becomes 1.00 or less. This makes it possible to prevent excessive extension of inclusions, so that it is possible to obtain a sufficiently good property as the delayed fracture resistance in the steel sheet and to prevent the anisotropy of the delayed fracture resistance from increasing. In order to securely suppress the extension of inclusions, the value of Expression 1 is preferably set to 0.90 or less, and more preferably set to 0.80 or less.

On the other hand, when the value of Expression 1 falls below 0.10, excessive rolling is performed in a low-temperature region, resulting in that strong anisotropy is generated in a texture of austenite in the steel sheet. When the strong anisotropy is generated in austenite, the strong anisotropy is given not only to a hot-rolled coil obtained after cooling but also to various transformed structures in the steel sheet obtained after cold rolling and annealing, so that the anisotropy of the delayed fracture resistance in the steel sheet is generated. In view of this, the value of Expression 1 needs to be set to 0.10 or more. In order to further reduce the anisotropy of the delayed fracture resistance in the steel sheet, the value of Expression 1 is preferably set to 0.20 or more, and more preferably set to 0.30 or more.

A hot rolling finishing temperature is set to be in the 850-to-980° C. range, preferably in the 850-to-950° C. range. When the hot rolling finishing temperature is lower than 850°

C., strong anisotropy is generated in austenite to strengthen a texture of a product sheet and the anisotropy of the delayed fracture resistance in the steel sheet is enhanced. On the other hand, when the hot rolling finishing temperature exceeds 980° C., it becomes difficult to limit the value of Expression 1 to 1.00 or less, resulting in that inclusions are extended in one direction and the anisotropy of the delayed fracture resistance in the steel sheet is enhanced.

[Up to Primary Cooling after the Hot Rolling]

After the hot rolling is finished, a hot-rolled steel sheet is quickly cooled to be coiled into a coil. Time until start of this quick cooling (primary cooling) and conditions of the quick cooling (primary cooling) affect the anisotropy of the steel sheet, so that they need to be controlled appropriately. That is, an elapsed time from, hot rolling finish to cooling start is set to 1.0 second or longer, the cooling (primary cooling) is performed at a cooling rate of not less than 5° C./second nor more than 50° C./second, and the primary cooling is stopped at a temperature in the 500-to-650° C. range. These limiting reasons are as follows.

That is, immediately after the hot rolling, the texture of austenite in the steel sheet has strong anisotropy by working. In order to reduce this anisotropy, it is necessary to promote recrystallization of austenite between the not rolling finish and the primary cooling start. In view of this, the time from the hot rolling finish to the cooling start is prescribed to be 1.0 second or longer. In order to further promote the recrystallization of austenite, it is preferably set to 1.5 seconds or longer, and more preferably set to 2.0 seconds or longer. The upper limit of the time is not particularly set, but in order to start the cooling after a long time longer than 20 seconds elapses, a space sufficient enough to retain the steel sheet therein after the hot rolling is required and a significant increase in size of a facility is required, which is not preferable in terms of cost. Therefore, the time is preferably set to 20 seconds or shorter. In view of cost, it is further preferably set to 15 seconds or shorter.

[Primary Cooling]

After completion of the hot rolling, the hot-rolled steel sheet is quickly cooled primarily cooled) to an appropriate temperature as described previously in order to coil the hot-rolled steel sheet into a coil. Concretely, the hot-rolled steel sheet is cooled (primarily cooled) at a cooling rate of 50° C./second or less (preferably 5° C./second or more) and the primary cooling is stopped at a temperature in the 500-to-650° C. range.

When the cooling rate of this primary cooling is large excessively, anisotropics of various transformed structures in a hot-rolled coil become strong, so that an average cooling rate in the primary cooling after completion of the rolling is set to 50° C./second or less. Here, the average cooling rate is a value of the absolute value of a difference between a temperature at the time of start of a target section, (which is a primary cooling step,) and a temperature at the time of finish of the section divided by the time required for the section. As the average cooling rate of the primary cooling is smaller, the anisotropies in the hot-rolled coil become weaker, so that the average cooling rate is preferably set to 42° C./second or less, and more preferably set to 35° C./second or less. The lower limit of the average cooling rate in the primary cooling is not particularly limited, but in order to sufficiently cool the hot-rolled steel sheet to a coiling temperature at a cooling rate of less than 5° C./second, a huge facility is required, which is not preferable in terms of cost. Therefore, the average cooling rate of the primary cooling is preferably set to 5° C./second o more, and more preferably set to 10° C./second or more.

A cooling stop temperature in the primary cooling affects structure transformation during a step of coiling the hot-rolled steel sheet into a coil. That is, in a step of coiling the hot-rolled steel sheet as a coil (corresponding to secondary cooling), pearlite and/or coarse cementite having a long diameter of greater than 1 μm are/is generated in the hot-rolled steel sheet, thereby making it possible to randomize textures and shapes of the various transformed structures to reduce the anisotropics in an annealing step after cold rolling. In order to generate pearlite and/or coarse cementite, the cooling stop temperature of the primary cooling after the hot rolling is set to 500° C. or higher. In order to sufficiently reduce the anisotropy of the steel sheet, the cooling stop temperature of the primary cooling is preferably 530° C. or higher, and more preferably 550° C. or higher. On the other hand, when the cooling stop temperature of the primary cooling is increased too much, a scale layer of the surface layer portion of the steel sheet thickens excessively and surface quality is impaired, so that it is necessary to set the cooling stop temperature of the primary cooling to 650° C. or lower. In view of this, the cooling stop temperature of the primary cooling is preferably set to 630° C. or lower.

[Coiling/Secondary Cooling]

As described previously, in the step of coiling the primarily-cooled hot-rolled steel sheet as a coil continuously, the hot-rolled steel sheet is slowly cooled in such a manner that an elapsed time from stop of the primary cooling to 400° C. becomes 1 hour or longer (secondary cooling step). That is, in order to sufficiently generate pearlite and/or coarse cementite to reduce the anisotropy of the delayed, fracture resistance in the steel sheet, the hot-rolled steel sheet needs to be retained for a sufficient time in a temperature region where cementite is generated after the quick cooling is stopped in the primary cooling step. Therefore, the primarily-cooled hot-rolled steel sheet is slowly cooled (secondarily cooled) in such a manner that the elapsed time from stop of the quick cooling in the primary cooling step to 400° C. becomes 1.0 hour or longer. The elapsed time is preferably set to 2.0 hours or longer, and more preferably set to 3.0 hours or longer. The upper limit of the elapsed time is not particularly set, but a special facility is required in order to retain the hot-rolled steel sheet for longer than 24.0 hours, which is not preferable in terms of cost, so that the elapsed time is preferably set to 24.0 hours or shorter. Incidentally, the above-described secondary cooling normally overlaps the coiling step, but it is a matter of course that the above-described elapsed time may also include up to a period where the coiled coil is allowed to stand. Further, it is a matter of course that the slow cooling in the secondary cooling step includes the case where the hot-rolled steel sheet primarily cooled down to a specific temperature is retained in a partial period of the above-described elapsed time.

[Cold Rolling]

On the steel sheet coiled as a hot-rolled coil as described previously, cold rolling is thereafter performed.

The cold rolling is performed in such a manner that the total reduction ratio becomes not less than 30% nor more than 75%. The cold rolling is preferably performed in a plurality of passes, and any number of passes of the rolling and any reduction ratio distribution to each pass are applicable. When the total reduction ratio of the cold rolling falls below 30%, sufficient strain is not accumulated in the steel sheet, in the annealing step thereafter, recrystallization does not progress sufficiently, and structures in a worked state remain. As a result, anisotropies of textures and ferrite crystal grains of the steel sheet become strong and anisotropy of the delayed fracture resistance in the steel sheet occurs. In order to sufficiently accumulate strain in the steel sheet, the total reduction ratio of the cold rolling is preferably set to 33% or more, and more preferably set to 36% or more. On the other hand, when the total reduction ratio of the cold rolling exceeds 75%, a recrystallized texture of ferrite develops and anisotropy of the delayed fracture resistance in the steel sheet occurs. Therefore, the total reduction ratio of the cold rolling is preferably set to 75% or less. In view of this, the total reduction ratio of the cold rolling is preferably set to 65% or less, and more preferably set to 60% or less.

[Annealing]

Next, on a cold-rolled steel sheet (base steel sheet) obtained as above, an annealing process is performed. Into a cooling process after reaching the maximum heating temperature during this annealing step, a hot-dip galvanizing treatment on the surface of the steel sheet (further, an alloying treatment of a plating layer depending on the circumstances) is/are desirably incorporated. That is, as a facility for performing the annealing step, a continuous annealing and plating line having a preheating zone, a reduction zone, and a plating zone is preferably used. Thus, hereinafter, the case where a continuous treatment that steps related to plating are incorporated into the cooling process after annealing is performed by using such a continuous annealing and plating line will be explained as an example.

The annealing step is set that temperature is increased in such a manner that an average temperature increasing rate in the 600-to-750° C. range becomes 20° C./sec or less, and the base steel sheet is heated to a temperature of 750° C. or higher and is cooled (first cooled) in such a manner that the average cooling rate in the 750-to-650° C. range becomes 1.0 to 15.0° C./second. Here, the average temperature increasing rate is a value of the absolute value of a difference between a temperature at the time of start of a target section, (which is the section of the preheating zone, here,) and a temperature at the time of finish of the target section divided by the time required for the section. Incidentally, at the average cooling rate is as described previously.

Here, in the continuous annealing and plating line, a temperature increasing process including the temperature increasing at an average temperature increasing rate of 20° C./sec or less in the above-described 600-to-750° C. range is first performed in the preheating zone. In the following reduction zone, the temperature of the base steel sheet is brought to the maximum heating temperature (750° C. or higher) of the annealing. Thereafter, during the cooling process to the plating zone, as first cooling, the cooling at an average cooling rate of 1.0 to 15.0° C./second in the above-described 750-to-650° C. range is performed.

These annealing conditions will be explained below.

The temperature increasing rate of the base steel sheet in the annealing step affects the behavior of recrystallization in the base steel sheet. Particularly, the temperature increasing rate at 600 to 750° C. is important, and an average temperature increasing rate during this period is set to 20° C./second or less, thereby making it possible to sufficiently promote the recrystallization. Thereby, it is possible to make the textures, ferrite crystal grains, and island-shaped hard structures isotropic and to decrease non-recrystallized ferrite to cause deterioration of ductility of the base steel sheet. Further, for decreasing the non-recrystallized ferrite to improve ductility of the base steel sheet, the average temperature increasing rate at 600 to 750° C. is preferably set to 15° C./second or less, and more preferably set to 12° C./second or less. The lower limit of the average temperature increasing rate is not particularly limited, but when the average temperature increasing rate is set to 0.5° C./second or less, productivity of the base steel sheet significantly decreases, so that the average temperature increasing rate is preferably set to 0.5° C./second or more.

Further, the temperature increasing process in the annealing step is performed in the preheating zone in the continuous annealing and plating line. At least part of the preheating zone is set to an oxidation treatment zone. Then, in the oxidation treatment zone, an oxidation treatment for forming an Fe-oxide coating film having an appropriate thickness in the surface layer portion of the base steel sheet is desirably performed. That is, as a pretreatment at the stage where the decarburized layer is formed in the surface layer portion of the steel sheet by heating in the following reduction zone, the Fe-oxide coating film having an appropriate thickness is desirably formed in the surface layer portion of the base steel sheet in the oxidation treatment zone being at least part of the preheating zone. In this case, the temperature of the steel sheet when passing through the oxidation treatment zone is set to 400 to 800° C., and under the condition that an air ratio (a value of the volume of air contained in a mixed gas per unit volume, being a mixed gas of air used for a preheating burner and combustion gas, divided by the volume of air theoretically required for completely combusting the combustion gas contained in the mixed gas per unit volume (=[volume of air contained in a mixed gas per unit volume]÷[volume of air theoretically required for completely combusting the combustion gas contained in the mixed gas per unit volume]) is set to 0.7 to 1.2, preheating is performed. Thereby, the Fe-oxide coating film having a thickness of 0.01 to 20 μm is desirably formed in the surface layer portion of the base steel sheet.

Here, when the above-described air ratio in the oxidation treatment zone exceeds 1.2, there is a risk that the oxide coating film grows excessively and the decarburized layer grows excessively in the following reduction zone. Further, there is a risk that in the reduction zone, the oxide coating film cannot be reduced completely to remain in the surface layer portion of the steel sheet and platability decreases. On the other hand, when the above-described air ratio is less than 0.7, an oxide coating film is not formed sufficiently in the surface layer portion of the base steel sheet. Here, the oxide coating film to be formed in the surface layer portion of the base steel sheet in the oxidation treatment zone of the preheating zone functions as an oxygen supply source of oxides containing Si and/or Mn in the decarburized layer to be formed in the following reduction zone. Thus, unless the oxide coating film is sufficiently formed in the surface layer portion of the base steel sheet, there is a risk that the already-described decarburized layer in which oxides are dispersed highly densely cannot be obtained.

Further, when the temperature of the steel sheet when passing through the oxidation treatment zone of the preheating zone is lower than 400° C., no sufficient oxide coating film can be formed in the surface layer portion of the base steel sheet. On the other hand, when the temperature of the base steel sheet when passing through the oxidation treatment zone of the preheating zone is a high temperature of higher than 800° C., the oxide coating film grows excessively in the surface layer portion of the base steel sheet, so that it becomes difficult to make the thickness of the decarburized layer fall within a predetermined range.

The maximum heating temperature of the base steel sheet in the annealing step is set to 750° C. or higher, and a reason thereof is as follows.

That is, when the maximum heating temperature of the base steel sheet in the annealing step is low, coarse cementite is left unmelted and ductility of the base steel sheet deteriorates significantly. In order to sufficiently solid-dissolve cementite to secure ductility of the base steel sheet, the maximum heating temperature of the base steel sheet is set to 750° C. or higher, and preferably set to 760° C. or higher. The upper limit of the maximum heating temperature of the base steel sheet is not particularly set, but when the base steel sheet is heated at higher than 1000°C., surface quality of the steel sheet is significantly impaired and wettability of plating deteriorates. Therefore, the maximum heating temperature of the base steel sheet is preferably set to 1000° C. or lower, and more preferably set to 950° C. or lower.

Further, in the reduction zone in the continuous annealing and plating line, the temperature of the base steel sheet in the annealing step is desirably brought to the maximum heating temperature. In the reduction zone, it is possible to reduce the Fe-oxide coating film formed in the oxidation treatment zone of the preheating zone to form the decarburized layer and to turn the decarburized layer (surface layer) into a structure in which oxides containing Si and/or Mn are dispersed moderately. An atmosphere of the reduction zone is desirably set to an atmosphere in which a value of a partial pressure ratio $P(H_2O)/P(H_2)$ being a value of a water vapor partial pressure $P(H_2O)$ divided by a hydrogen partial pressure $P(H_2)$ is in the 0.0001-to-2.00 range. When the above-described partial pressure ratio $P(H_2O)/P(H_2)$ is less than 0.0001, oxides containing Si and/or Mn are formed only in the uppermost surface layer of the base steel sheet, to thereby make it difficult to moderately disperse the oxides containing Si and/or Mn into the inside of the decarburized layer. On the other hand, when the above-described partial pressure ratio $P(H_2O)/P(H_2)$ exceeds 2.00, decarburization progresses excessively to cause a risk that the thickness of the decarburized layer cannot be controlled to be in a predetermined range. Incidentally, the above-described partial pressure ratio $P(H_2O)/P(H_2)$ is preferably set to be in the 0.001-to-1.50 range, and more preferably set to be in the 0.002-to-1.20 range.

The cooling process from the maximum heating temperature of the base steel sheet in the annealing step is important to generate sufficient ferrite in the base steel sheet. Thus, the base steel sheet needs to be cooled in such a manner that the average cooling rate of the cooling in the 750-to-650° C. range in this cooling process (a first cooling step) becomes 1.0 to 15.0° C./second. That is, the range of 750° C. to 650° C. is a temperature region where ferrite is generated in the base steel sheet. Thus, the average cooling rate of the first cooling in the temperature region is set to not less than 1.0° C./second nor more than 15° C./second, thereby making it possible to generate a sufficient amount of ferrite in the base steel sheet. When the average cooling rate of the first cooling exceeds 15° C./second, a sufficient amount of ferrite sometimes cannot be obtained and ductility of the base steel sheet deteriorates. On the other hand, when the average cooling rate of the first cooling falls below 1.0° C./second, in the base steel sheet, ferrite is generated excessively, pearlite is generated, and the like, resulting in that a sufficient amount of hard structure cannot be obtained. As a result, strength of the base steel street deteriorates.

Further, an average cooling rate in cooling (a second cooling step) until the temperature of the base steel sheet becomes the temperature to stop the cooling for entering a plating bath from 650° C. in the cooling process of the annealing step is preferably set to 3.0° C./second or more. This is to obtain hard structures in which crystal orientations are more random by more decreasing the temperature of transformation to the hard structure. In view of this, the average cooling rate of the second cooling is more preferably set to 5.0° C./second or more. The upper limit of the average cooling rate of the second cooling is not particularly set, but in order to set the average cooling rate so 200° C./second or more, a special cooling facility is required, so that the average cooling rate is preferably set to 200° C./second or less.

In this embodiment, by rough rolling·finish rolling being rolling after heating in the hot rolling step, giving strain and a temperature history to the steel sheet in the cooling step and coiling step, and giving strain and a temperature history to the steel sheet in the following cold rolling step and annealing step, textures are made isotonic. As a result, speeds of recrystallization and crystal growth are also made isotropic and a ratio of, of the ferrite and hard structure, the grain diameter in the rolling direction and the grain diameter in the sheet width direction (d(RD)/d(TD)) becomes 0.75 to 1.33.

[Hot-Dip Galvanizing]

Subsequently, the base steel sheet is immersed in the hot-dip galvanizing bath in the plating zone to be subjected to hot-dip galvanizing. The plating bath is mainly composed of zinc. Further, an effective Al amount being a value obtained by subtracting the total Fe amount from the total Al amount in the plating bath is preferably set to be in the 0.1-to-0.18-mass % range. Particularly, when the alloying treatment is performed after plating, the effective Al amount in the plating bath is preferably set to be in the 0.07-to-0.12-mass % range in order to control progress of alloying of the plating layer.

Further, when the plating layer is not alloyed, no problem is caused even though the effective Al amount in the plating bath is in the 0.18-to-0.30-mass % range.

Further, even when one kind or two or more kinds of Pb, Sb, Si, Sn, Mg, Mn, Ni, Cr, Co, Ca, Cu, Li, Ti, Be, Bi, Sr, I, Cs, and REM are mixed in the galvanizing bath, the effect of the present invention is not. impaired. Depending on its/their amount, this has an advantage such as improvements in corrosion resistance and workability.

A plating bath temperature is preferably set to 450° C. to 470° C. When the plating bath temperature is lower than 450° C., the viscosity of the plating bath, becomes high excessively, controlling the thickness of the plating layer becomes difficult, and the external appearance of the steel sheet is impaired. On the other hand, when the plating bath temperature exceeds 470° C., a lot of fumes occur and safe manufacture becomes difficult, so that the plating bath temperature is preferably 470° C. or lower. Further, when the temperature of the steel sheet when the steel sheet enters the plating bath falls below 430° C., there occurs a need to give a large amount of heat to the plating bath in order to stabilize the plating bath temperature at 450° C. or higher, which is not preferable for practical use. On the other hand, when the temperature of the steel sheet when the steel sheet enters the plating bath exceeds 490° C., a facility where a large amount of heat, is removed from the plating bath needs to be introduced in order to stabilize the plating bath temperature at 470° C. or lower, which is not preferable in terms of cost. Thus, in order to stabilize the plating bath temperature, the temperature at which the steel sheet enters the plating bath is preferably set to 430° C. to 490° C.

[Bainite Transformation Process]

Further, before or after immersion into the plating bath, a process in which the steel sheet is retained for 20 to 1000 seconds at a temperature in the 300-to-470° C. range (bainite transformation process) may also be performed with the aim of promoting bainite transformation for improving strength, ductility, and the like of the steel sheet. Further, when the alloying treatment is performed after the plating, the bainite transformation process may also be performed before or after the alloying treatment.

However, the bainite transformation process affects the final ratio of retained austenite in the base steel sheet. On the other hand, in this embodiment, the amount of retained austenite in the base steel sheet is controlled to be small. Thus, the timing of performing the bainite transformation process is desirably selected appropriately in consideration of the effect of the bainite process on the amount of retained austenite.

That is, when the bainite transformation process is performed at a temperature of 430° C. or lower (300° C. or higher), there is sometimes a case that with progress of bainite transformation, a large amount of carbon is concentrated to non-transformed austenite and when cooling to room temperature thereafter, the volume fraction of retained austenite remaining in the base steel sheet increases. On the other hand, the solid-solution carbon amount in austenite is decreased by reheating the base steel sheet to a temperature higher than the temperature causing the bainite transformation. Then, as long as the bainite transformation process is performed at the stage before the base steel sheet being immersed in the plating bath, the steel sheet is reheated up to the plating bath temperature at the time of immersion in the plating bath thereafter, and thereby the solid-solution carbon amount in non-transformed austenite can be decreased, and when cooling down to room temperature thereafter, the amount of retainedaustenite remaining in the base steel sheet can be decreased. From such a viewpoint, the bainite transformation process is preferably performed before the base steel sheet is immersed in the plating bath. In this case, as long as a bainite transformation process temperature is in the 300-to-470° C. range, the temperature is not limited to a temperature region of higher than 430° C.

On the other hand, when the bainite transformation process is performed after the immersion in the plating bath, the bainite transformation process is appropriately performed in a temperature region of higher than 430° C. to 470° C. or lower in order to prevent retained austenite from increasing excessively.

Incidentally, the bainite transformation process temperature (300 to 470° C.) is often lower than the temperature at which the base steel sheet enters the plating bath (normally, 430 to 490° C.). Then, when the bainite transformation process is performed at the stage before the base steel sheet being immersed in the plating bath, subsequently to the bainite transformation process, the base steel sheet is desirably reheated to then be brought into the plating bath.

[Alloying Treatment of the Plating Layer]

After the immersion in the plating bath, the alloying treatment of the plating layer may also be performed. When an alloying treatment temperature is lower than 470° C., alloying of the plating layer does not progress sufficiently. Therefore, the alloying treatment temperature is preferably set to 470° C. or higher. Further, when the alloying treatment temperature exceeds 620° C., coarse cementite is generated and strength of the steel sheet decreases significantly. Therefore, the alloying treatment temperature is preferably set to 620° C. or lower. From such a viewpoint, the alloying treatment temperature is more preferably set to 480 to 600° C., and still more preferably set to 490 to 580° C.

An alloying treatment time is preferably set to two seconds or longer, and more preferably five seconds or longer in order to make the alloying of the plating layer progress sufficiently. On the other hand, when the alloying treatment time exceeds 200 seconds, the plating layer is alloyed excessively to cause a concern that its property deteriorates, so that the alloying treatment time is preferably set to 200 seconds or shorter, and more preferably set to 100 seconds or shorter.

Incidentally, the alloying treatment is preferably performed immediately after the base steel sheet is immersed in the plating bath, but it is also possible that after the immersion of the base steel sheet, the temperature of the base steel sheet is once decreased down to 150° C. or lower, and then the base steel sheet is reheated up to the alloying treatment temperature.

[Cooling after the Plating (Third Cooling Step)]

In a cooling process after the hot-dip galvanizing (after the alloying treatment when the alloying treatment is performed immediately after the hot-dip galvanizing), when an average cooling rate of the steel sheet in a cooling step when cooling down to a temperature region of 150° C. or lower (a third cooling step) falls below 0.5° C./second, coarse cementite is generated to cause a concern that strength and/or ductility of the steel sheet deteriorate/deteriorates. Therefore, the average cooling rate of the steel sheet in the third cooling step is preferably set to 0.5° C./second or more, and more preferably set to 1.0° C./second or more.

Further, during or after the cooling in the third cooling step after the hot-dip galvanizing (after the alloying treatment when the alloying treatment is performed immediately after the hot-dip galvanizing), a reheating treatment may also be performed with the aim of tempering martensite. A heating temperature when reheating is preferably set to 200° C. or higher because when it is lower than 200° C., tempering does not progress sufficiently. Further, when the heating temperature exceeds 620° C., strength of the steel sheet deteriorates significantly, so that the heating temperature is preferably set to 620° C. or lower, and more preferably set to 550° C. or lower.

Further, on the high-strength hot-dip galvanized steel sheet cooled down to room temperature, cold rolling at a reduction ratio of 3.00% or less (corrective rolling) may also be performed for correction of its shape.

Further, on the high-strength hot-dip galvanized steel sheet obtained by the above-described method, a phosphoric acid-based coating film forming process may also be performed to form a coating film made of phosphorus oxides and/or composite oxides containing phosphorus. The coating film made of phosphorus oxides and/or composite oxides containing phosphorus can function as a lubricant when the high-strength hot-dip galvanized steel sheet is worked, and can protect the plating layer formed on the surface of the base steel sheet.

According to this embodiment explained above, as a hot-dip galvanized steel sheet using a high-strength steel sheet as a base material, it is possible to obtain the high-strength hot-dip galvanized, steel sheet that has excellent delayed fracture resistance and has small anisotropy of the delayed fracture resistance (particularly, anisotropy of the delayed fracture resistance in a surface parallel to the sheet surface (rolled surface) (in-plane anisotropy)) in spite of being a thin sheet without impairing ductility and strength. Thus, even when the high-strength hot-dip galvanized steel sheet is used as a member on which a high load acts as a thin sheet, high safety can be secured, and there is a small risk that the high-strength hot-dip galvanized steel sheet is subjected to restrictions in terms of design and work, and thus it is possible to increase the degree of freedom of design and work to expand an application range of the high-strength hot-dip galvanized steel sheet.

It should be noted that the above-described embodiment merely illustrates a concrete example of implementing the present invention, and the technical scope of the present invention is not to be construed in a restrictive manner by the embodiment. That is, the present invention may be implemented in various forms without departing from the technical spirit or main features thereof.

EXAMPLE

Hereinafter, the present invention will be explained concretely by examples. Incidentally, examples below are to illustrate concrete effects by the present invention, and it is a matter of course that conditions described in the examples do not limit the technical scope of the present invention.

Slabs having chemical components A to Z, AA to AG shown in Table 1 and Table 2 are cast in accordance with an ordinary method. Immediately after the casting, under each condition shown in Experimental examples 1 to 123 in Table 3 to Table 7, on the slabs, heating and hot rolling are performed in this order, and cooling (primary cooling and secondary cooling) is performed, and hot-rolled steel sheets are each coiled into a coil. Thereafter, the hot-rolled steel sheets are each subjected to cold rolling to be finished to a cold-rolled steel sheet having a sheet thickness of 1.4 mm.

The obtained cold-rolled steel sheets in Experimental examples 1 to 128 were each annealed under each condition shown in Table 6 to Table 12 (heated to the maximum heating temperature to then be cooled by first cooling and second cooling), and were subsequently subjected to hot-dip galvanizing, and then were cooled down to a temperature of 150° C. or lower as third cooling by using a continuous annealing and plating line. Incidentally, as the continuous annealing and plating line, one having a preheating zone, a reduction zone, and a plating zone (hot-dip galvanizing furnace) was used.

Further, in some examples (Steel type GA) out of Experimental examples 1 to 128, an alloying furnace was disposed at the downstream side of the hot-dip galvanizing furnace in the continuous annealing and plating line, and an alloying treatment of a plating layer was performed after hot-dip galvanizing. Regarding the other steel types (Steel type GI), an alloying treatment of a plating layer was not performed after hot-dip galvanizing, or an alloying treatment temperature was set to lower than 470° C., and hot-dip galvanized steel sheets (GI), each having an unalloyed plating layer was manufactured.

Further, in some examples out of Experimental examples 1 to 128, subsequently to the second cooling in an annealing step, a bainite transformation process (a retention process at 300 to 470° C.) was performed, and then base steel sheets were each brought into the plating furnace in the plating zone. However, in Experimental example 60 out of the examples where the bainite transformation process was performed, the bainite transformation process was performed after the hot-dip galvanizing. Incidentally, in each of the examples where the bainite transformation process was performed and then the base steel sheet was brought into a plating bath, subsequently to the bainite transformation process (retention process), the base steel sheet was slightly reheated to then be brought in to the plating bath.

Further, in some examples out of Experimental examples 1 to 128, after the plating (after the alloying treatment in the case of the alloying treatment being performed), as third cooling, the hot-dip galvanized steel sheets (including alloyed hot-dip galvanized steel sheets) were each cooled down to a temperature of 150° C. or lower to then be subjected to a tempering step.

Similarly, in some examples out of Experimental examples 1 to 128, after the plating (after the alloying treatment in the case of the alloying treatment being performed), as third cooling, the hot-dip galvanized steel sheets (including the alloyed hot-dip galvanized steel sheets) were each cooled down to a temperature of 150° C. or lower, and then on the cooled hot-dip galvanized steel sheets (including the alloyed hot-dip galvanized steel sheets), corrective rolling was performed in cold working.

Regarding each of the obtained hot-dip galvanized steel sheets (including the alloyed hot-dip galvanized steel sheets) of Experimental examples 1 to 128, a microstructure of the base steel sheet (a volume fraction of each phase, a volume fraction of non-recrystallized ferrite to a ferrite phase, a ratio of a grain diameter in the rolling direction/a grain diameter in the sheet width direction of ferrite d(RD)/d(TD), a ratio of a length in the rolling direction/a length in the sheet width direction of an island-shaped hard structure L(RD)/L(TD), and an X-ray random intensity ratio of BCC iron), a thickness of a surface layer (decarburized layer) of the base steel sheet, and a density and a size (an average grain diameter) of oxides in the surface layer (decarburized layer) of the base steel sheet were measured by the respective already-described methods. These results are shown in Table 13 to Table 21.

Further, regarding each of the hot-dip galvanized steel sheets of Experimental examples 1 to 128, as its performance evaluation, an external appearance inspection, a tensile test, and a plating peeling test were performed, and further as evaluation of the delayed fracture resistance, a salt spray test was performed, and as anisotropy evaluation of the delayed fracture resistance, a ratio of a limit diffusible hydrogen content in the rolling direction and a limit diffusible hydrogen content in the sheet width direction was examined. These results are shown in Table 13 to Table 21.

Incidentally, methods of the respective evaluation tests are as follows.

[External Appearance Inspection]

On the hot-dip galvanized steel sheets (including the alloyed hot-dip galvanized steel sheets) manufactured by the above-described procedures, each external appearance inspection was performed. On this occasion, regarding the external appearance of the surface of the steel sheet, an unplating occurrence state was visually determined by visual observation, and results were shown in Tables 13 to 21 as "◯" and "X." Incidentally, "X" each shown in Tables 13 to 21 indicates a steel sheet on which, unplating with a diameter of 0.5 mm or more was observed and that deviated from a tolerance range of the external appearance, and "◯" each indicates a steel sheet having a practically allowable external appearance other than the above.

[Plating Peeling Test]

On each of the steel sheets manufactured by the above-described procedures, in accordance with the description of Non-Patent Literature 2, there was performed a plating peeling test to evaluate plating adhesiveness at the time of working to add compressive stress to a steel sheet. Concretely, by using each of the steel sheets, in accordance with a Metallic materials-Bend test described in JIS Z 2248, a 60° C. V bending test was performed and a test piece was fabricated, and then an adhesive cellophane tape was applied to an inner side of a bent portion of the test piece, and the adhesive cellophane tape was peeled off. Then, from a peeled state of the plating layer peeled off with the adhesive cellophane tape, the plating adhesiveness was evaluated, and results were shown in Table 13 to Table 21 as "◯" and "X." Here, "X" each shown in Tables 13 to 21 indicates a practically unallowable steel sheet whose peeled width was 7.0 mm or more. "◯" each indicates a steelsheet having practically allowable plating adhesives other than the above.

[Tensile Property]

The steel sheets of Experimental examples were each worked to obtain No. 5 test pieces described in JIS Z 2201. Regarding the obtained test pieces, in accordance with a test method described in JIS Z 2241, tensile strength (MPa) and total elongation (%) were measured, and further in accordance with a test method described in JIS G 0202, yield strength (MPa) was measured. Further, as for an n value (work hardening coefficient), from results of the tensile test, nominal stresses at a point of nominal strain of 3% and at a point of nominal strain of 7% were read and the nominal stresses and the nominal strains were converted into true stresses of σ3% and a σ7% and true strains of ε31 and ε7%, and the n value (work hardening coefficient) was obtained in accordance with the following expression.

$$\{n=\log(\sigma7\%/\sigma3\%)/\log(\varepsilon7\%/\varepsilon35)\}$$

However, regarding the steel sheet with the uniform elongation of less than 7%, the n value (work hardening coefficient) was obtained in accordance with the above-described expression from two points: the point of nominal strain of 3%; and the point of maximum tensile stress.

Additionally, the delayed fracture resistance and the anisotropy thereof were measured and evaluated by the already-described methods.

TABLE 1

| Chemical Component | Chemical Composition (MASS %) | | | | | | | | | | | | |
|---|---|---|---|---|---|---|---|---|---|---|---|---|---|
| | C | Si | Mn | P | S | Al | N | O | Ti | Nb | V | Cr | Ni |
| A | 0.142 | 0.53 | 2.35 | 0.0055 | 0.0032 | 0.048 | 0.0021 | 0.0007 | | | | | |
| B | 0.220 | 0.35 | 1.77 | 0.0065 | 0.0013 | 0.257 | 0.0030 | 0.0005 | | | | | |
| C | 0.102 | 1.72 | 1.26 | 0.0125 | 0.0008 | 0.043 | 0.0042 | 0.0010 | | | | | |
| D | 0.357 | 0.05 | 2.50 | 0.0086 | 0.0037 | 0.725 | 0.0025 | 0.0011 | | | | | |
| E | 0.081 | 1.16 | 2.83 | 0.0111 | 0.0044 | 0.020 | 0.0019 | 0.0003 | | | | | |
| F | 0.237 | 1.53 | 1.94 | 0.0093 | 0.0016 | 0.045 | 0.0038 | 0.0025 | | | | | 0.52 |
| G | 0.255 | 1.79 | 2.01 | 0.0078 | 0.0014 | 0.053 | 0.0052 | 0.0010 | | 0.015 | | | |
| H | 0.093 | 0.87 | 2.00 | 0.0143 | 0.0041 | 0.066 | 0.0038 | 0.0007 | 0.039 | | | | |
| I | 0.113 | 1.09 | 1.17 | 0.0135 | 0.0059 | 0.069 | 0.0033 | 0.0014 | | | | | 1.13 |
| J | 0.212 | 0.68 | 1.41 | 0.0195 | 0.0046 | 0.070 | 0.0039 | 0.0032 | | | 0.112 | | |
| K | 0.161 | 0.42 | 1.55 | 0.0125 | 0.0050 | 0.064 | 0.0028 | 0.0004 | | | | | |
| L | 0.240 | 0.73 | 1.52 | 0.0129 | 0.0009 | 0.056 | 0.0059 | 0.0003 | | | | | |
| M | 0.171 | 1.14 | 1.15 | 0.0079 | 0.0025 | 0.090 | 0.0018 | 0.0013 | | | | 0.30 | |
| N | 0.156 | 0.63 | 2.72 | 0.0159 | 0.0022 | 0.034 | 0.0023 | 0.0022 | | | | | |
| O | 0.130 | 1.38 | 2.50 | 0.0063 | 0.0057 | 0.051 | 0.0027 | 0.0022 | | | | | |
| P | 0.263 | 0.74 | 1.67 | 0.0071 | 0.0023 | 0.057 | 0.0024 | 0.0007 | | | | | |
| Q | 0.093 | 1.86 | 1.78 | 0.0060 | 0.0028 | 0.022 | 0.0048 | 0.0021 | | | | | |
| R | 0.150 | 0.18 | 1.29 | 0.0159 | 0.0007 | 1.158 | 0.0038 | 0.0022 | 0.004 | 0.008 | | | |
| S | 0.195 | 0.27 | 2.72 | 0.0105 | 0.0037 | 0.047 | 0.0027 | 0.0016 | 0.081 | | | | |

| Chemical Component | Chemical Composition (MASS %) | | | | | | | | | | Classification |
|---|---|---|---|---|---|---|---|---|---|---|---|
| | Cu | Mo | B | W | Ca | Ce | Mg | Zr | La | REM Fe | |
| A | | | | | | | | | | BALANCE | EXAMPLE |
| B | | | | | | | | | | BALANCE | EXAMPLE |
| C | | | | | | | | | | BALANCE | EXAMPLE |
| D | | | | | | | | | | BALANCE | EXAMPLE |
| E | | | | | | | | | | BALANCE | EXAMPLE |
| F | 0.57 | | | | | 0.0012 | | | | BALANCE | EXAMPLE |
| G | | | | | | | | | | BALANCE | EXAMPLE |
| H | | | 0.0008 | | 0.0009 | | | | | BALANCE | EXAMPLE |
| I | | | | | | | | | | BALANCE | EXAMPLE |
| J | | | | | | | | | | BALANCE | EXAMPLE |
| K | | | 0.0035 | | | | | | | BALANCE | EXAMPLE |
| L | 0.19 | | | | | | | | | BALANCE | EXAMPLE |
| M | | 0.05 | | | | | | | | BALANCE | EXAMPLE |
| N | | | | | 0.0014 | 0.0026 | | | | BALANCE | EXAMPLE |
| O | | | | 0.2500 | | | | | | BALANCE | EXAMPLE |
| P | | | | | | 0.0052 | | | | BALANCE | EXAMPLE |
| Q | | | | | | | 0.0028 | | | BALANCE | EXAMPLE |
| R | | | 0.0051 | | | 0.0009 | | | | BALANCE | EXAMPLE |
| S | | | | | | | | | | BALANCE | EXAMPLE |

TABLE 2

| Chemical Component | C | Si | Mn | P | S | Al | N | O | Ti | Nb | V | Cr | Ni | Cu |
|---|---|---|---|---|---|---|---|---|---|---|---|---|---|---|
| T | 0.209 | 0.70 | 2.26 | 0.0067 | 0.0037 | 0.015 | 0.0033 | 0.0008 | | | | 0.65 | | |
| U | 0.112 | 0.52 | 1.01 | 0.0135 | 0.0014 | 0.221 | 0.0050 | 0.0010 | | | | | | |
| V | 0.134 | 0.93 | 0.84 | 0.0164 | 0.0007 | 0.062 | 0.0023 | 0.0015 | | | | 1.48 | | |
| W | 0.174 | 1.09 | 2.45 | 0.0095 | 0.0036 | 0.040 | 0.0040 | 0.0033 | | | | | | |
| X | 0.192 | 0.85 | 1.37 | 0.0162 | 0.0061 | 0.062 | 0.0020 | 0.0022 | 0.021 | 0.041 | | | | |
| Y | 0.216 | 1.42 | 1.82 | 0.0202 | 0.0051 | 0.028 | 0.0027 | 0.0013 | | | | | | |
| Z | 0.137 | 0.99 | 2.18 | 0.0143 | 0.0040 | 0.072 | 0.0016 | 0.0023 | | | | | | |
| AA | 0.177 | 1.65 | 1.59 | 0.0087 | 0.0030 | 0.016 | 0.0043 | 0.0019 | | | | | | |
| AB | 0.166 | 0.57 | 0.94 | 0.0046 | 0.0014 | 0.346 | 0.0004 | 0.0025 | | | | | | |
| AC | 0.209 | 0.68 | 1.91 | 0.0226 | 0.0027 | 0.056 | 0.0025 | 0.0004 | | | | | 0.20 | 0.12 |
| AD | 0.277 | 1.33 | 2.26 | 0.0142 | 0.0053 | 0.044 | 0.0043 | 0.0024 | | | | | | |
| AE | 0.062 | 0.86 | 2.14 | 0.0088 | 0.0046 | 0.045 | 0.0036 | 0.0012 | | | | | | |
| AF | 0.490 | 0.81 | 2.17 | 0.0107 | 0.0046 | 0.051 | 0.0038 | 0.0009 | | | | | | |
| AG | 0.147 | 0.89 | 0.06 | 0.0083 | 0.0045 | 0.043 | 0.0045 | 0.0021 | | | | | | |
| BA | 0.164 | 2.41 | 2.30 | 0.015 | 0.0043 | 0.108 | 0.0033 | 0.0009 | | | | | | |
| BB | 0.161 | 0.00 | 2.55 | 0.016 | 0.0040 | 0.089 | 0.0048 | 0.0016 | | | | | | |
| BC | 0.174 | 0.89 | 3.96 | 0.018 | 0.0028 | 0.120 | 0.0033 | 0.0017 | | | | | | |
| BD | 0.172 | 0.78 | 2.42 | 0.008 | 0.0024 | 2.38 | 0.0025 | 0.0014 | | | | | | |
| BE | 0.109 | 1.77 | 2.65 | 0.002 | 0.0010 | 0.059 | 0.0040 | 0.0008 | | | | | | |

| Chemical Component | Mo | B | W | Ca | Ce | Mg | Zr | La | REM | Fe | Classification |
|---|---|---|---|---|---|---|---|---|---|---|---|
| T | | | | | | | | | | BALANCE | EXAMPLE |
| U | 0.16 | 0.0019 | | | | | | | | BALANCE | EXAMPLE |
| V | | | | | | | | | | BALANCE | EXAMPLE |
| W | | | | | | | 0.0019 | | | BALANCE | EXAMPLE |
| X | | | | | | | | | | BALANCE | EXAMPLE |
| Y | | | | | | | | | 0.0029 | BALANCE | EXAMPLE |
| Z | | | | 0.0034 | | | | | | BALANCE | EXAMPLE |
| AA | | | | | | 0.0036 | | | | BALANCE | EXAMPLE |
| AB | 0.37 | | | | | | | | | BALANCE | EXAMPLE |
| AC | | | | | 0.0035 | | | | | BALANCE | EXAMPLE |
| AD | | | | | | | | 0.0018 | | BALANCE | EXAMPLE |
| AE | | | | | | | | | | BALANCE | COMPARATIVE EXAMPLE |
| AF | | | | | | | | | | BALANCE | COMPARATIVE EXAMPLE |
| AG | | | | | | | | | | BALANCE | COMPARATIVE EXAMPLE |
| BA | | | | | | | | | | BALANCE | COMPARATIVE EXAMPLE |
| BB | | | | | | | | | | BALANCE | COMPARATIVE EXAMPLE |
| BC | | | | | | | | | | BALANCE | COMPARATIVE EXAMPLE |
| BD | | | | | | | | | | BALANCE | COMPARATIVE EXAMPLE |
| BE | | | | | | | | | | BALANCE | COMPARATIVE EXAMPLE |

TABLE 3

| EXPERIMENTAL EXAMPLE | CHEMICAL COMPONENT | HOT ROLLING STEP ||||||| SECONDARY COOLING ELAPSED TIME UNTIL 400° C. TIME | COLD ROLLING STEP REDUCTION RATIO % | CLASSIFICATION |
|---|---|---|---|---|---|---|---|---|---|---|
| | | SLAB HEATING TEMPERATURE ° C. | EXPRESSION 1 | ROLLING COMPLETION TEMPERATURE ° C. | PRIMARY COOLING ||| | | |
| | | | | | RETENTION TIME UNTIL START OF SECOND COOLING SECOND | AVERAGE COOLING RATE ° C./SECOND | COOLING STOP TEMPERATURE ° C. | | | |
| 1 | A | 1255 | 0.72 | 943 | 3.5 | 42 | 595 | 3.0 | 40 | EXAMPLE |
| 2 | A | 1270 | 0.67 | 916 | 2.0 | 31 | 631 | 3.0 | 52 | EXAMPLE |
| 3 | A | 1265 | 0.48 | 902 | 5.0 | 40 | 561 | 4.2 | 50 | EXAMPLE |
| 4 | A | 1215 | 2.05 | 932 | 4.7 | 28 | 556 | 2.3 | 65 | COMPARATIVE EXAMPLE |
| 5 | B | 1280 | 0.50 | 910 | 2.0 | 19 | 552 | 2.0 | 64 | EXAMPLE |

TABLE 3-continued

| | | | | HOT ROLLING STEP | | | | | |
|---|---|---|---|---|---|---|---|---|---|
| | | | | | PRIMARY COOLING | | | SECONDARY COOLING | COLD ROLLING STEP |
| EXPERIMENTAL EXAMPLE | CHEMICAL COMPONENT | SLAB HEATING TEMPERATURE ° C. | EXPRESSION 1 | ROLLING COMPLETION TEMPERATURE ° C. | RETENTION TIME UNTIL START OF COOLING SECOND | AVERAGE COOLING RATE ° C./SECOND | COOLING STOP TEMPERATURE ° C. | ELAPSED TIME UNTIL 400° C. TIME | REDUCTION RATIO % | CLASSIFICATION |
|---|---|---|---|---|---|---|---|---|---|---|
| 6 | B | 1260 | 0.14 | 962 | 3.1 | 32 | 589 | 2.9 | 50 | EXAMPLE |
| 7 | B | 1190 | 0.77 | 965 | 1.5 | 33 | 594 | 5.4 | 50 | EXAMPLE |
| 8 | B | 1240 | 0.46 | 925 | 3.6 | 32 | 615 | 3.9 | 60 | COMPARATIVE EXAMPLE |
| 9 | C | 1255 | 0.83 | 938 | 3.5 | 32 | 581 | 2.7 | 40 | EXAMPLE |
| 10 | C | 1205 | 0.25 | 918 | 4.0 | 28 | 578 | 4.9 | 34 | EXAMPLE |
| 11 | C | 1260 | 0.42 | 904 | 3.1 | 25 | 543 | 2.6 | 55 | EXAMPLE |
| 12 | C | 1250 | 0.38 | 966 | 3.1 | 35 | 615 | 3.8 | 50 | COMPARATIVE EXAMPLE |
| 13 | D | 1280 | 0.71 | 913 | 6.2 | 37 | 603 | 4.5 | 57 | EXAMPLE |
| 14 | D | 1275 | 0.73 | 920 | 2.3 | 33 | 608 | 1.4 | 62 | EXAMPLE |
| 15 | D | 1255 | 0.37 | 905 | 1.9 | 24 | 570 | 3.5 | 45 | EXAMPLE |
| 16 | D | 1240 | 0.57 | 922 | 5.2 | 28 | 571 | 2.6 | 45 | COMPARATIVE EXAMPLE |
| 17 | E | 1220 | 0.46 | 899 | 3.9 | 41 | 553 | 2.6 | 50 | EXAMPLE |
| 18 | E | 1200 | 0.35 | 976 | 2.3 | 33 | 616 | 7.6 | 47 | EXAMPLE |
| 19 | E | 1215 | 0.19 | 903 | 6.8 | 34 | 574 | 5.0 | 65 | EXAMPLE |
| 20 | E | 1230 | 0.48 | 918 | 5.1 | 20 | 618 | 5.3 | 47 | COMPARATIVE EXAMPLE |
| 21 | F | 1220 | 0.61 | 940 | 4.2 | 38 | 556 | 4.3 | 50 | EXAMPLE |
| 22 | F | 1270 | 0.33 | 928 | 2.4 | 32 | 523 | 2.0 | 50 | EXAMPLE |
| 23 | F | 1260 | 0.61 | 929 | 1.8 | 25 | 596 | 4.9 | 32 | EXAMPLE |
| 24 | F | 1250 | 0.40 | 966 | 6.7 | <u>86</u> | 586 | 2.8 | 66 | COMPARATIVE EXAMPLE |
| 25 | G | 1265 | 0.78 | 974 | 6.6 | 24 | 582 | 4.7 | 61 | EXAMPLE |
| 26 | G | 1210 | 0.75 | 947 | 2.6 | 29 | 597 | 5.3 | 37 | EXAMPLE |

TABLE 4

| | | | | HOT ROLLING STEP | | | | | |
|---|---|---|---|---|---|---|---|---|---|
| | | | | | PRIMARY COOLING | | | SECONDARY COOLING | COLD ROLLING STEP |
| EXPERIMENTAL EXAMPLE | CHEMICAL COMPONENT | SLAB HEATING TEMPERATURE ° C. | EXPRESSION 1 | ROLLING COMPLETION TEMPERATURE ° C. | RETENTION TIME UNTIL START OF COOLING SECOND | AVERAGE COOLING RATE ° C./SECOND | COOLING STOP TEMPERATURE ° C. | ELAPSED TIME UNTIL 400° C. TIME | REDUCTION RATIO % | CLASSIFICATION |
|---|---|---|---|---|---|---|---|---|---|---|
| 27 | G | 1240 | 0.27 | 936 | 4.6 | 30 | 611 | 3.2 | 58 | EXAMPLE |
| 28 | G | 1260 | 0.55 | 978 | 4.9 | 36 | 619 | 5.6 | 52 | COMPARATIVE EXAMPLE |
| 29 | H | 1270 | 0.79 | 964 | 6.1 | 26 | 582 | 2.8 | 40 | EXAMPLE |
| 30 | H | 1265 | 0.22 | 943 | 4.4 | 28 | 628 | 8.3 | 57 | EXAMPLE |
| 31 | H | 1205 | 0.46 | 921 | 5.5 | 29 | 602 | 6.3 | 39 | EXAMPLE |
| 32 | H | 1200 | 0.64 | 958 | 2.4 | 27 | 554 | 4.1 | 66 | COMPARATIVE EXAMPLE |
| 33 | I | 1260 | 0.77 | 963 | 3.3 | 38 | 551 | 4.1 | 62 | EXAMPLE |
| 34 | I | 1185 | 0.46 | 889 | 4.3 | 37 | 572 | 2.4 | 39 | EXAMPLE |
| 35 | I | 1205 | 0.54 | 960 | 3.5 | 27 | 562 | 4.5 | 46 | EXAMPLE |
| 36 | I | 1210 | 0.61 | 966 | 3.1 | 39 | 553 | <u>0.5</u> | 41 | COMPARATIVE EXAMPLE |
| 37 | J | 1275 | 0.45 | 945 | 4.0 | 33 | 644 | 3.1 | 57 | EXAMPLE |
| 38 | J | 1270 | 0.39 | 927 | 4.9 | 31 | 581 | 2.6 | 57 | EXAMPLE |
| 39 | J | 1245 | 0.46 | 922 | 3.0 | 21 | 577 | 2.7 | 61 | EXAMPLE |
| 40 | J | 1275 | 0.69 | 934 | 2.1 | 16 | <u>736</u> | 8.8 | 39 | COMPARATIVE EXAMPLE |
| 41 | K | 1270 | 0.35 | 919 | 1.9 | 16 | 610 | 3.8 | 44 | EXAMPLE |
| 42 | K | 1280 | 0.94 | 954 | 6.6 | 44 | 572 | 4.7 | 42 | EXAMPLE |
| 43 | K | 1230 | 0.43 | 945 | 2.5 | 26 | 556 | 2.3 | 50 | EXAMPLE |
| 44 | K | 1200 | 0.48 | 927 | 3.3 | 23 | 555 | 2.4 | 60 | COMPARATIVE EXAMPLE |
| 45 | L | 1255 | 0.36 | 895 | 3.3 | 14 | 620 | 5.6 | 62 | EXAMPLE |

TABLE 4-continued

| | | HOT ROLLING STEP | | | | | | | | |
|---|---|---|---|---|---|---|---|---|---|---|
| | | | | | PRIMARY COOLING | | | SECOND- | | |
| EXPERIMENTAL EXAMPLE | CHEMICAL COMPONENT | SLAB HEATING TEMPERATURE °C. | EXPRESSION 1 | ROLLING COMPLETION TEMPERATURE °C. | RETENTION TIME UNTIL START OF COOLING SECOND | AVERAGE COOLING RATE °C./SECOND | COOLING STOP TEMPERATURE °C. | ARY COOLING ELAPSED TIME UNTIL 400° C. TIME | COLD ROLLING STEP REDUCTION RATIO % | CLASSIFICATION |
| 46 | L | 1200 | 0.28 | 943 | 3.3 | 23 | 617 | 1.8 | 59 | EXAMPLE |
| 47 | L | 1195 | 0.32 | 918 | 7.3 | 26 | 590 | 6.1 | 64 | EXAMPLE |
| 48 | L | 1200 | 0.73 | 943 | 2.7 | 32 | 588 | 2.6 | 20 | COMPARATIVE EXAMPLE |
| 49 | M | 1220 | 0.43 | 938 | 2.6 | 33 | 612 | 7.1 | 47 | EXAMPLE |
| 50 | M | 1235 | 0.70 | 888 | 2.3 | 24 | 600 | 5.3 | 41 | EXAMPLE |
| 51 | M | 1270 | 0.81 | 965 | 3.1 | 22 | 613 | 5.1 | 68 | EXAMPLE |
| 52 | M | 1225 | 0.43 | 967 | 6.1 | 28 | 576 | 3.0 | 37 | COMPARATIVE EXAMPLE |

TABLE 5

| | | HOT ROLLING STEP | | | | | | | | |
|---|---|---|---|---|---|---|---|---|---|---|
| | | | | | PRIMARY COOLING | | | SECOND- | | |
| EXPERIMENTAL EXAMPLE | CHEMICAL COMPONENT | SLAB HEATING TEMPERATURE °C. | EXPRESSION 1 | ROLLING COMPLETION TEMPERATURE °C. | RETENTION TIME UNTIL START OF COOLING SECOND | AVERAGE COOLING RATE °C./SECOND | COOLING STOP TEMPERATURE °C. | ARY COOLING ELAPSED TIME UNTIL 400° C. TIME | COLD ROLLING STEP REDUCTION RATIO % | CLASSIFICATION |
| 53 | N | 1215 | 0.23 | 907 | 3.4 | 26 | 581 | 3.0 | 57 | EXAMPLE |
| 54 | N | 1185 | 0.27 | 975 | 2.9 | 28 | 556 | 2.6 | 55 | EXAMPLE |
| 55 | N | 1240 | 0.91 | 934 | 4.6 | 23 | 556 | 2.2 | 60 | EXAMPLE |
| 56 | N | 1275 | 0.39 | 971 | 0.3 | 42 | 569 | 3.7 | 47 | COMPARATIVE EXAMPLE |
| 57 | O | 1225 | 0.74 | 966 | 6.3 | 24 | 590 | 3.5 | 63 | EXAMPLE |
| 58 | O | 1260 | 0.59 | 932 | 4.9 | 32 | 618 | 3.9 | 44 | EXAMPLE |
| 59 | O | 1235 | 0.39 | 915 | 4.5 | 25 | 593 | 3.5 | 46 | EXAMPLE |
| 60 | O | 1275 | 0.44 | 943 | 7.1 | 30 | 552 | 2.0 | 43 | COMPARATIVE EXAMPLE |
| 61 | P | 1280 | 0.77 | 948 | 2.4 | 38 | 608 | 2.7 | 55 | EXAMPLE |
| 62 | P | 1240 | 0.22 | 958 | 3.3 | 32 | 540 | 4.4 | 64 | EXAMPLE |
| 63 | P | 1255 | 0.49 | 961 | 3.4 | 34 | 571 | 2.6 | 57 | EXAMPLE |
| 64 | P | 1200 | 0.57 | 903 | 4.6 | 31 | 577 | 5.9 | 55 | COMPARATIVE EXAMPLE |
| 65 | Q | 1220 | 0.42 | 909 | 5.1 | 25 | 586 | 3.0 | 57 | EXAMPLE |
| 66 | Q | 1235 | 0.31 | 879 | 2.4 | 19 | 593 | 4.9 | 55 | EXAMPLE |
| 67 | Q | 1190 | 0.24 | 946 | 3.8 | 31 | 634 | 5.6 | 63 | EXAMPLE |
| 68 | Q | 1280 | 0.59 | 974 | 6.1 | 27 | 594 | 4.0 | 61 | COMPARATIVE EXAMPLE |
| 69 | R | 1220 | 0.52 | 960 | 2.3 | 29 | 508 | 1.4 | 47 | EXAMPLE |
| 70 | R | 1200 | 0.23 | 919 | 8.4 | 23 | 553 | 2.7 | 68 | EXAMPLE |
| 71 | R | 1265 | 0.35 | 938 | 1.8 | 35 | 550 | 2.0 | 63 | EXAMPLE |
| 72 | R | 1215 | 0.34 | 900 | 5.6 | 30 | 574 | 2.7 | 50 | COMPARATIVE EXAMPLE |
| 73 | S | 1240 | 0.81 | 976 | 2.9 | 23 | 602 | 4.3 | 73 | EXAMPLE |
| 74 | S | 1265 | 0.35 | 950 | 5.6 | 32 | 566 | 2.3 | 50 | EXAMPLE |
| 75 | S | 1250 | 0.66 | 897 | 3.5 | 17 | 635 | 6.9 | 55 | EXAMPLE |
| 76 | S | 1030 | 0.42 | 912 | 5.6 | 35 | 569 | 2.3 | 43 | COMPARATIVE EXAMPLE |
| 77 | T | 1205 | 0.32 | 887 | 1.6 | 24 | 591 | 2.9 | 57 | EXAMPLE |
| 78 | T | 1215 | 0.39 | 876 | 3.7 | 27 | 592 | 4.3 | 57 | EXAMPLE |

TABLE 6

| | | | | | HOT ROLLING STEP | | | | | |
| | | | | | | PRIMARY COOLING | | SECOND- | | |
| EXPERIMENTAL EXAMPLE | CHEMICAL COMPONENT | SLAB HEATING TEMPERATURE °C. | EXPRESSION 1 | ROLLING COMPLETION TEMPERATURE °C. | RETENTION TIME UNTIL START OF COOLING SECOND | AVERAGE COOLING RATE °C./SECOND | COOLING STOP TEMPERATURE °C. | ARY COOLING ELAPSED TIME UNTIL 400° C. TIME | COLD ROLLING STEP REDUCTION RATIO % | CLASSIFICATION |
|---|---|---|---|---|---|---|---|---|---|---|
| 79 | T | 1245 | 0.45 | 974 | 5.8 | 28 | 608 | 3.8 | 41 | EXAMPLE |
| 80 | T | 1215 | 1.27 | 979 | 7.0 | 39 | 601 | 4.3 | 50 | COMPARATIVE EXAMPLE |
| 81 | U | 1220 | 0.67 | 969 | 4.1 | 37 | 604 | 3.9 | 44 | EXAMPLE |
| 82 | U | 1225 | 0.40 | 954 | 5.0 | 32 | 578 | 2.3 | 60 | EXAMPLE |
| 83 | U | 1230 | 0.34 | 966 | 2.9 | 36 | 574 | 2.5 | 52 | EXAMPLE |
| 84 | U | 1225 | 0.45 | 936 | 2.9 | 26 | 587 | 0.6 | 40 | COMPARATIVE EXAMPLE |
| 85 | V | 1235 | 0.46 | 937 | 5.7 | 29 | 577 | 2.2 | 61 | EXAMPLE |
| 86 | V | 1255 | 0.83 | 920 | 2.4 | 26 | 609 | 4.9 | 52 | EXAMPLE |
| 87 | V | 1195 | 0.57 | 874 | 2.1 | 24 | 568 | 4.9 | 65 | EXAMPLE |
| 88 | V | 1255 | 0.23 | 979 | 2.3 | 34 | 570 | 2.2 | 42 | COMPARATIVE EXAMPLE |
| 89 | W | 1220 | 0.41 | 942 | 2.6 | 21 | 597 | 4.0 | 45 | EXAMPLE |
| 90 | W | 1255 | 0.15 | 937 | 9.1 | 40 | 551 | 4.6 | 40 | EXAMPLE |
| 91 | W | 1230 | 0.34 | 905 | 3.2 | 28 | 582 | 4.3 | 50 | EXAMPLE |
| 92 | W | 1200 | 0.71 | 938 | 2.9 | 34 | 608 | 3.4 | 45 | COMPARATIVE EXAMPLE |
| 93 | X | 1225 | 0.33 | 974 | 2.7 | 42 | 561 | 5.4 | 34 | EXAMPLE |
| 94 | X | 1235 | 0.30 | 897 | 4.2 | 35 | 518 | 3.1 | 42 | EXAMPLE |
| 95 | X | 1210 | 0.39 | 940 | 3.2 | 24 | 600 | 4.3 | 63 | EXAMPLE |
| 96 | X | 1255 | 0.73 | 941 | 0.4 | 24 | 560 | 2.7 | 52 | COMPARATIVE EXAMPLE |
| 97 | Y | 1220 | 0.44 | 980 | 6.7 | 40 | 604 | 4.5 | 45 | EXAMPLE |
| 98 | Y | 1225 | 0.35 | 961 | 1.3 | 25 | 569 | 5.3 | 52 | EXAMPLE |
| 99 | Y | 1205 | 0.74 | 914 | 4.0 | 29 | 612 | 2.2 | 46 | EXAMPLE |
| 100 | Y | 1260 | 0.72 | 899 | 5.2 | 28 | 551 | 3.1 | 57 | COMPARATIVE EXAMPLE |
| 101 | Z | 1265 | 0.61 | 959 | 2.2 | 40 | 564 | 5.5 | 39 | EXAMPLE |
| 102 | Z | 1270 | 0.34 | 970 | 7.5 | 48 | 558 | 1.3 | 47 | EXAMPLE |
| 103 | Z | 1225 | 0.45 | 916 | 2.5 | 26 | 503 | 1.5 | 61 | EXAMPLE |
| 104 | Z | 1255 | 0.08 | 950 | 3.0 | 37 | 565 | 2.9 | 54 | COMPARATIVE EXAMPLE |

TABLE 7

| EXPERIMENTAL EXAMPLE | CHEMICAL COMPONENT | HOT ROLLING STEP | | | | PRIMARY COOLING | | | SECONDARY | COLD ROLLING STEP REDUCTION RATION % | CLASSIFICATION |
|---|---|---|---|---|---|---|---|---|---|---|---|
| | | SLAB HEATING TEMPERATURE °C. | EXPRESSION 1 | ROLLING COMPLETION TEMPERATURE °C. | RETENTION TIME UNTIL START OF COOLING SECOND | AVERAGE COOLING RATE °C./SECOND | COOLING STOP TEMPERATURE °C. | COOLING ELAPSED TIME UNTIL 400° C. TIME | | | |
| 105 | AA | 1245 | 0.36 | 985 | 4.4 | 38 | 561 | 2.9 | 66 | EXAMPLE |
| 106 | AA | 1225 | 0.69 | 899 | 4.9 | 30 | 554 | 3.8 | 56 | EXAMPLE |
| 107 | AA | 1240 | 0.71 | 895 | 7.3 | 23 | 603 | 3.3 | 56 | EXAMPLE |
| 108 | AA | 1200 | 0.38 | 939 | 7.0 | 26 | 570 | 5.2 | 60 | COMPARATIVE EXAMPLE |
| 109 | AB | 1200 | 0.46 | 930 | 2.6 | 30 | 612 | 3.2 | 41 | EXAMPLE |
| 110 | AB | 1255 | 0.23 | 912 | 2.8 | 43 | 532 | 2.6 | 64 | EXAMPLE |
| 111 | AB | 1230 | 0.47 | 927 | 3.4 | 24 | 590 | 3.5 | 42 | EXAMPLE |
| 112 | AB | 1250 | 0.64 | 957 | 2.7 | 39 | 435 | 1.5 | 52 | COMPARATIVE EXAMPLE |
| 113 | AC | 1255 | 0.39 | 897 | 2.5 | 21 | 608 | 3.2 | 35 | EXAMPLE |
| 114 | AC | 1275 | 0.31 | 918 | 2.7 | 20 | 609 | 5.8 | 45 | EXAMPLE |
| 115 | AC | 1200 | 0.61 | 974 | 3.9 | 38 | 554 | 4.4 | 40 | EXAMPLE |
| 116 | AC | 1220 | 0.02 | 919 | 4.4 | 31 | 554 | 2.2 | 53 | COMPARATIVE EXAMPLE |
| 117 | AD | 1200 | 0.66 | 895 | 2.5 | 22 | 553 | 4.8 | 50 | EXAMPLE |
| 118 | AD | 1230 | 0.38 | 962 | 4.2 | 27 | 558 | 5.6 | 41 | EXAMPLE |
| 119 | AD | 1250 | 0.80 | 966 | 6.5 | 40 | 526 | 1.9 | 37 | EXAMPLE |
| 120 | AD | 1270 | 0.80 | 965 | 2.6 | 26 | 574 | 2.5 | 85 | COMPARATIVE EXAMPLE |
| 121 | AE | 1280 | 0.64 | 931 | 5.1 | 21 | 612 | 5.6 | 55 | COMPARATIVE EXAMPLE |
| 122 | AF | 1245 | 0.52 | 915 | 6.1 | 29 | 553 | 2.6 | 55 | COMPARATIVE EXAMPLE |
| 123 | AG | 1210 | 0.56 | 897 | 6.7 | 25 | 585 | 2.7 | 55 | COMPARATIVE EXAMPLE |
| 124 | BA | 1245 | 0.34 | 919 | 2.1 | 21 | 595 | 3.1 | — | COMPARATIVE EXAMPLE |
| 125 | BB | 1245 | 0.29 | 914 | 3.0 | 27 | 619 | 4.0 | 40 | COMPARATIVE EXAMPLE |
| 126 | BC | | | TEST INTERRUPTED DUE TO SLAB CRACKING | | | | | | COMPARATIVE EXAMPLE |
| 127 | BD | 1240 | 0.56 | 884 | 1.7 | 20 | 606 | 3.3 | 60 | COMPARATIVE EXAMPLE |
| 128 | BE | 1245 | 0.30 | 919 | 2.2 | 25 | 661 | 2.9 | 47 | COMPARATIVE EXAMPLE |

TABLE 8

| EXPERIMENTAL EXAMPLE | CHEMICAL COMPONENT | STEEL TYPE | HEATING STEP HEATING RATE AT 600 TO 750° C. ° C./SECOND | HEATING STEP MAXIMUM HEATING TEMPERATURE ° C. | ANNEALING STEP-PLATING STEP FIRST STEP COOLING COOLING RATE AT 750° C. TO 650° C. ° C./SECOND | SECOND COOLING STEP COOLING RATE FROM 650° C. ° C./SECOND | BAINITE TRANSFORMATION PROCESS RETENTION TIME AT 300 TO 470° C. SECOND | PRE-HEATING ZONE MIXED GAS RATIO | REDUCTION ZONE P(H₂O)/P(H₂) | PLATING ZONE EFFECTIVE Al AMOUNT MASS % | PLATING ZONE PLATING BATH TEMPERATURE ° C. | PLATING ZONE ENTERING TEMPERATURE OF STEEL SHEET ° C. |
|---|---|---|---|---|---|---|---|---|---|---|---|---|
| 1 | A | GI | 4.8 | 835 | 3.6 | 5.7 | — | 0.7 | 0.562 | 0.09 | 458 | 472 |
| 2 | A | GI | 7.4 | 757 | 6.3 | 41.6 | 115 | 0.9 | 0.023 | 0.10 | 455 | 446 |
| 3 | A | GA | 2.0 | 849 | 1.9 | 19.5 | 48 | 1.0 | 0.017 | 0.10 | 452 | 463 |
| 4 | A | GI | 8.7 | 852 | 4.3 | 26.5 | — | 0.9 | 0.126 | 0.11 | 465 | 476 |
| 5 | B | GI | 7.4 | 893 | 2.2 | 4.0 | — | 1.0 | 0.214 | 0.11 | 461 | 459 |
| 6 | B | GA | 10.5 | 835 | 5.9 | 34.7 | 37 | 1.2 | 0.005 | 0.11 | 463 | 453 |
| 7 | B | GA | 4.4 | 887 | 3.9 | 13.6 | 40 | 1.0 | 0.025 | 0.11 | 466 | 447 |
| 8 | B | GI | 8.6 | 870 | 7.0 | 9.8 | 30 | 0.9 | 0.195 | 0.10 | 453 | 445 |
| 9 | C | GI | 6.5 | 809 | 6.5 | 8.9 | 101 | 0.9 | 0.117 | 0.10 | 453 | 468 |
| 10 | C | GA | 4.1 | 805 | 4.8 | 5.2 | — | 1.0 | 0.013 | 0.08 | 463 | 448 |
| 11 | C | GA | 2.2 | 884 | 4.8 | 7.7 | 349 | 1.0 | 0.219 | 0.07 | 465 | 460 |
| 12 | C | GI | 6.1 | 833 | 3.5 | 0.9 | — | 0.8 | 1.00 | 0.11 | 462 | 470 |
| 13 | D | GI | 5.1 | 805 | 5.4 | 40.2 | 44 | 0.8 | 0.078 | 0.10 | 461 | 468 |
| 14 | D | GI | 9.5 | 790 | 7.4 | 51.4 | 40 | 0.8 | 0.062 | 0.11 | 459 | 471 |
| 15 | D | GA | 2.2 | 824 | 6.4 | 6.0 | — | 1.0 | 0.012 | 0.08 | 463 | 446 |
| 16 | D | GI | 10.2 | 835 | 3.1 | 5.0 | 40 | 1.1 | 0.0000 | 0.12 | 465 | 484 |
| 17 | E | GI | 5.6 | 844 | 3.7 | 6.2 | — | 0.8 | 0.166 | 0.08 | 469 | 463 |
| 18 | E | GA | 5.3 | 824 | 4.3 | 13.5 | 140 | 1.0 | 0.020 | 0.07 | 467 | 434 |
| 19 | E | GI | 6.0 | 973 | 5.8 | 8.3 | 94 | 0.9 | 0.018 | 0.09 | 459 | 443 |
| 20 | E | GI | 5.8 | 868 | 26.0 | 20.0 | 84 | 1.0 | 0.200 | 0.08 | 451 | 441 |
| 21 | F | GI | 6.6 | 817 | 5.6 | 6.2 | 36 | 0.9 | 0.006 | 0.09 | 456 | 457 |
| 22 | F | GA | 13.8 | 821 | 4.5 | 3.3 | 292 | 1.0 | 0.100 | 0.07 | 460 | 463 |
| 23 | F | GA | 6.0 | 862 | 2.6 | 17.4 | 52 | 0.8 | 0.030 | 0.09 | 453 | 472 |
| 24 | F | GI | 2.2 | 804 | 1.6 | 13.5 | 45 | 1.1 | 0.020 | 0.10 | 459 | 472 |
| 25 | G | GI | 5.1 | 848 | 5.9 | 6.9 | — | 0.8 | 0.145 | 0.10 | 457 | 486 |
| 26 | G | GI | 5.3 | 877 | 3.7 | 12.8 | — | 0.9 | 0.240 | 0.07 | 464 | |

| EXPERIMENTAL EXAMPLE | ANNEALING STEP-PLATING STEP ALLOYING FURNACE ALLOYING TEMPERATURE ° C. | ANNEALING STEP-PLATING STEP ALLOYING FURNACE TREATMENT TIME SECOND | THIRD COOLING STEP COOLING RATE ° C./SECOND | TEMPERING STEP TEMPERING TEMPERATURE ° C. | CORRECTIVE ROLLING REDUCTION RATIO % | CLASSIFICATION |
|---|---|---|---|---|---|---|
| 1 | — | — | 1.8 | — | — | EXAMPLE |
| 2 | — | — | 3.7 | — | — | EXAMPLE |
| 3 | 490 | 29 | 2.4 | — | 0.20 | EXAMPLE |

TABLE 8-continued

| | | | | | |
|---|---|---|---|---|---|
| 4 | — | — | 2.7 | — | — | COMPARATIVE EXAMPLE |
| 5 | — | — | 2.5 | — | — | EXAMPLE |
| 6 | 532 | 15 | 1.4 | — | — | EXAMPLE |
| 7 | 519 | 10 | 2.8 | — | — | EXAMPLE |
| 8 | 635 | 28 | 3.8 | — | — | COMPARATIVE EXAMPLE |
| 9 | — | — | 3.8 | — | — | EXAMPLE |
| 10 | 492 | 30 | 0.8 | — | — | EXAMPLE |
| 11 | 477 | 18 | 32.4 | — | — | EXAMPLE |
| 12 | — | — | 3.6 | — | — | COMPARATIVE EXAMPLE |
| 13 | — | — | 3.1 | — | — | EXAMPLE |
| 14 | — | — | 22.0 | — | — | EXAMPLE |
| 15 | 498 | 10 | 2.3 | — | — | EXAMPLE |
| 16 | — | — | 1.0 | — | — | COMPARATIVE EXAMPLE |
| 17 | — | — | 3.6 | — | — | EXAMPLE |
| 18 | 567 | 27 | 4.1 | 291 | — | EXAMPLE |
| 19 | 521 | 24 | 3.6 | — | — | EXAMPLE |
| 20 | — | — | 3.6 | — | — | COMPARATIVE EXAMPLE |
| 21 | — | — | 3.2 | — | — | EXAMPLE |
| 22 | 483 | 20 | 40.0 | — | — | EXAMPLE |
| 23 | 612 | 5 | 4.1 | — | — | EXAMPLE |
| 24 | — | — | 1.5 | — | — | COMPARATIVE EXAMPLE |
| 25 | — | — | 2.8 | — | — | EXAMPLE |
| 26 | — | — | 3.5 | 410 | — | EXAMPLE |

TABLE 9

| EXPERIMENTAL EXAMPLE | CHEMICAL COMPONENT | STEEL TYPE | HEATING STEP | | ANNEALING STEP-PLATING STEP | | | | | | PLATING ZONE | | |
|---|---|---|---|---|---|---|---|---|---|---|---|---|---|
| | | | HEATING RATE AT 600 TO 750° C. ° C./SECOND | MAXIMUM HEATING TEMPERATURE ° C. | FIRST STEP COOLING COOLING RATE AT 750° C. TO 650° C. ° C./SECOND | SECOND COOLING STEP COOLING RATE FROM 650° C. ° C./SECOND | BAINITE TRANSFORMATION PROCESS RETENTION TIME AT 300 TO 470° C. SECOND | PRE-HEATING ZONE MIXED GAS RATIO | REDUCTION ZONE P(H₂O)/P(H₂) | EFFECTIVE Al AMOUNT MASS % | PLATING BATH TEMPERATURE ° C. | ENTERING TEMPERATURE OF STEEL SHEET ° C. |
| 27 | G | GA | 3.1 | 879 | 5.0 | 7.5 | 51 | 1.1 | 0.148 | 0.09 | 460 | 462 |
| 28 | G | GI | 28 | 828 | 6.0 | 18.0 | 69 | 1.2 | 0.072 | 0.10 | 454 | 445 |
| 29 | H | GI | 1.1 | 844 | 5.3 | 107.2 | 50 | 1.0 | 0.015 | 0.10 | 462 | 463 |
| 30 | H | GI | 4.7 | 796 | 2.6 | 4.6 | — | 1.2 | 0.0006 | 0.07 | 456 | 481 |
| 31 | H | GA | 6.6 | 839 | 4.0 | 5.7 | 100 | 0.9 | 0.145 | 0.08 | 462 | 447 |
| 32 | H | GI | 3.2 | 795 | 8.2 | 17.7 | — | 0.9 | 0.093 | 0.11 | 466 | 479 |
| 33 | I | GI | 10.8 | 853 | 6.9 | 6.5 | 121 | 0.9 | 0.024 | 0.09 | 469 | 479 |
| 34 | I | GA | 1.8 | 777 | 3.4 | 8.1 | — | 0.8 | 0.072 | 0.09 | 464 | 459 |
| 35 | I | GI | 5.4 | 857 | 3.4 | 6.2 | — | 1.0 | 0.126 | 0.10 | 454 | 477 |
| 36 | I | GI | 3.8 | 642 | 3.8 | 21.8 | 83 | 1.1 | 0.035 | 0.09 | 468 | 450 |
| 37 | J | GI | 5.6 | 831 | 1.6 | 4.1 | 240 | 1.1 | 0.066 | 0.10 | 457 | 439 |
| 38 | J | GA | 6.7 | 758 | 2.7 | 6.2 | 93 | 0.9 | 0.117 | 0.08 | 456 | 460 |
| 39 | J | GI | 8. | 809 | 12.6 | 45.7 | 297 | 1.0 | 0.003 | 0.08 | 467 | 467 |
| 40 | J | GI | 5.8 | 892 | 3.6 | 26.0 | 78 | 0.8 | 0.158 | 0.08 | 453 | 456 |
| 41 | K | GI | 6.3 | 787 | 4.7 | 4.1 | — | 0.7 | 0.977 | 0.10 | 460 | 476 |
| 42 | K | GI | 3.9 | 817 | 3.9 | 15.2 | 80 | 0.9 | 0.083 | 0.15 | 455 | 436 |
| 43 | K | GA | 8.6 | 826 | 5.2 | 13.9 | 28 | 1.0 | 0.081 | 0.10 | 459 | 465 |
| 44 | L | GI | 31 | 779 | 4.7 | 18.4 | — | 1.0 | 0.005 | 0.10 | 466 | 484 |
| 45 | L | GI | 3.9 | 916 | 3.9 | 4.8 | 132 | 0.7 | 0.006 | 0.12 | 455 | 447 |
| 46 | L | GA | 17.4 | 789 | 8.4 | 15.3 | — | 1.1 | 0.135 | 0.10 | 467 | 479 |
| 47 | L | GI | 5.4 | 798 | 7.5 | 8.9 | 50 | 1.0 | 0.162 | 0.08 | 466 | 445 |
| 48 | L | GI | 8.3 | 842 | 5.5 | 20.2 | — | 0.8 | 0.191 | 0.11 | 462 | 474 |
| 49 | M | GI | 7.1 | 884 | 7.5 | 7.0 | 96 | 0.8 | 0.041 | 0.18 | 455 | 456 |
| 50 | M | GI | 4.7 | 829 | 3.1 | 38.9 | 64 | 0.9 | 0.001 | 0.08 | 457 | 469 |
| 51 | M | GA | 5.1 | 888 | 3.4 | 24.4 | 60 | 0.8 | 0.141 | 0.10 | 468 | 466 |
| 52 | M | GI | 5.4 | 875 | 3.9 | 17.2 | 71 | 0.4 | 0.005 | 0.07 | 466 | 457 |

| EXPERIMENTAL EXAMPLE | ANNEALING STEP-PLATING STEP ALLOYING FURNACE | | THIRD COOLING STEP | TEMPERING STEP TEMPERING | CORRECTIVE ROLLING | CLASSIFICATION |
|---|---|---|---|---|---|---|
| | ALLOYING TEMPERATURE ° C. | TREATMENT TIME SECOND | COOLING RATE ° C./SECOND | TEMPERATURE ° C. | REDUCTION RATIO % | |
| 27 | 483 | 10 | 3.0 | — | 0.20 | EXAMPLE |
| 28 | — | — | 0.9 | — | — | COMPARATIVE EXAMPLE |
| 29 | — | — | 2.0 | — | — | EXAMPLE |

TABLE 9-continued

| | | | | | |
|---|---|---|---|---|---|
| 30 | — | — | 1.0 | — | — | EXAMPLE |
| 31 | 536 | 23 | 3.4 | — | — | EXAMPLE |
| 32 | — | — | 0.2 | — | — | COMPARATIVE EXAMPLE |
| 33 | — | — | 3.5 | — | — | EXAMPLE |
| 34 | 589 | 9 | 1.9 | — | — | EXAMPLE |
| 35 | 508 | 46 | 53.8 | 250 | — | EXAMPLE |
| 36 | — | — | 3.7 | — | — | COMPARATIVE EXAMPLE |
| 37 | — | — | 4.1 | — | 0.10 | EXAMPLE |
| 38 | 520 | 7 | 2.4 | — | — | EXAMPLE |
| 39 | 496 | 16 | 3.0 | — | — | EXAMPLE |
| 40 | — | — | 1.0 | — | — | COMPARATIVE EXAMPLE |
| 41 | — | — | 2.2 | — | 0.1 | EXAMPLE |
| 42 | — | — | 2.5 | — | — | EXAMPLE |
| 43 | 540 | 14 | 2.7 | — | — | EXAMPLE |
| 44 | — | — | 1.6 | — | — | COMPARATIVE EXAMPLE |
| 45 | — | — | 4.4 | — | — | EXAMPLE |
| 46 | 515 | 11 | 2.6 | — | — | EXAMPLE |
| 47 | 480 | 115 | 4.4 | — | — | EXAMPLE |
| 48 | — | — | 2.0 | — | — | COMPARATIVE EXAMPLE |
| 49 | — | — | 4.4 | — | — | EXAMPLE |
| 50 | — | — | 1.7 | — | — | EXAMPLE |
| 51 | 510 | 27 | 1.4 | — | — | EXAMPLE |
| 52 | — | — | 2.5 | — | — | COMPARATIVE EXAMPLE |

TABLE 10

| EXPERI-MENTAL EXAMPLE | CHEMICAL COMPONENT | STEEL TYPE | HEATING STEP HEATING RATE AT 600 TO 750° C. ° C./SECOND | HEATING STEP MAXIMUM HEATING TEMPERATURE ° C. | ANNEALING STEP-PLATING STEP FIRST STEP COOLING COOLING RATE AT 750° C. TO 650° C. ° C./SECOND | SECOND COOLING STEP COOLING RATE FROM 650° C. ° C./SECOND | BAINITE TRANSFOR-MATION PROCESS RETENTION TIME AT 300 TO 470° C. SECOND | PRE-HEATING ZONE MIXED GAS RATIO | REDUC-TION ZONE P(H₂O)/P(H₂) | EFFECTIVE Al AMOUNT MASS % | PLATING ZONE PLATING BATH TEMPER-ATURE ° C. | PLATING ZONE ENTERING TEMPERATURE OF STEEL SHEET ° C. |
|---|---|---|---|---|---|---|---|---|---|---|---|---|
| 53 | N | GI | 8.7 | 838 | 3.0 | 3.6 | — | 0.9 | 0.008 | 0.10 | 436 | 472 |
| 54 | N | GA | 3.6 | 897 | 5.1 | 20.0 | 483 | 1.1 | 1.12 | 0.12 | 458 | 454 |
| 55 | N | GA | 1.4 | 808 | 11.4 | 6.2 | 30 | 0.9 | 0.141 | 0.09 | 457 | 466 |
| 56 | N | GI | 7.7 | 914 | 3.0 | 7.2 | 97 | 1.0 | 0.122 | 0.12 | 458 | 455 |
| 57 | O | GI | 7.8 | 800 | 3.1 | 7.5 | 74 | 0.9 | 0.003 | 0.11 | 462 | 450 |
| 58 | O | GI | 11.4 | 763 | 6.2 | 19.0 | — | 0.9 | 0.251 | 0.11 | 457 | 474 |
| 59 | O | GA | 7.3 | 878 | 3.4 | 5.6 | 380※ | 1.1 | 0.006 | 0.11 | 458 | 476 |
| 60 | O | GI | 3.2 | 894 | 7.5 | 22.4 | 83 | 0.8 | 0.012 | 0.09 | 463 | 448 |
| 61 | P | GI | 9.9 | 842 | 7.3 | 5.5 | 51 | 0.9 | 0.003 | 0.09 | 457 | 457 |
| 62 | P | GA | 1.2 | 810 | 9.4 | 38.9 | 50 | 0.9 | 1.34 | 0.09 | 463 | 450 |
| 63 | P | GA | 9.7 | 813 | 6.7 | 18.2 | 58 | 1.0 | 0.044 | 0.09 | 462 | 456 |
| 64 | P | GI | 3.5 | 873 | 4.6 | 9.1 | 40 | 1.8 | 0.006 | 0.10 | 458 | 465 |
| 65 | Q | GI | 7.2 | 920 | 4.3 | 6.2 | — | 1.0 | 0.105 | 0.10 | 466 | 460 |
| 66 | Q | GA | 13.0 | 909 | 4.2 | 86.5 | 164 | 0.9 | 0.871 | 0.09 | 458 | 475 |
| 67 | Q | GI | 1.9 | 802 | 5.6 | 16.8 | — | 1.1 | 0.046 | 0.11 | 465 | 439 |
| 68 | Q | GI | 5.7 | 709 | 5.9 | 15.3 | 90 | 1.0 | 0.023 | 0.11 | 458 | 455 |
| 69 | R | GI | 4.1 | 861 | 2.0 | 5.4 | 67 | 0.8 | 0.002 | 0.07 | 464 | 480 |
| 70 | R | GA | 6.3 | 842 | 5.5 | 51.6 | 65 | 0.8 | 0.174 | 0.08 | 466 | 457 |
| 71 | R | GA | 9.9 | 786 | 2.1 | 22.7 | 84 | 0.9 | 0.324 | 0.09 | 463 | 446 |
| 72 | R | GI | 9.6 | 879 | 5.1 | 3.5 | 139 | 0.9 | 2.40 | 0.12 | 465 | 458 |
| 73 | S | GI | 6.1 | 840 | 3.6 | 22.4 | 29 | 0.9 | 0.009 | 0.17 | 457 | 460 |
| 74 | S | GA | 3.9 | 883 | 2.5 | 118.7 | 76 | 1.1 | 0.026 | 0.09 | 459 | 443 |
| 75 | S | GA | 2.9 | 894 | 1.3 | 41.6 | 91 | 0.8 | 0.759 | 0.10 | 452 | 471 |
| 76 | S | GI | 4.1 | 850 | 7.5 | 16.8 | 88 | 0.9 | 0.155 | 0.10 | 465 | 451 |
| 77 | T | GI | 8.5 | 796 | 6.2 | 92.7 | — | 1.0 | 0.011 | 0.10 | 466 | 464 |
| 78 | T | GA | 11.2 | 850 | 4.6 | 24.7 | — | 0.9 | 0.085 | 0.07 | 462 | 478 |

| EXPERIMENTAL EXAMPLE | ANNEALING STEP-PLATING STEP ALLOYING FURNACE ALLOYING TEMPERATURE ° C. | ANNEALING STEP-PLATING STEP ALLOYING FURNACE TREATMENT TIME SECOND | THIRD COOLING STEP COOLING RATE ° C./SECOND | TEMPERING STEP TEMPERING TEMPERATURE ° C. | CORRECTIVE ROLLING REDUCTION RATIO % | CLASSIFICATION |
|---|---|---|---|---|---|---|
| 53 | — | — | 3.0 | — | — | EXAMPLE |
| 54 | 537 | 10 | 3.4 | — | — | EXAMPLE |
| 55 | 504 | 20 | 2.0 | — | — | EXAMPLE |

TABLE 10-continued

| | | | | | | |
|---|---|---|---|---|---|---|
| 56 | — | — | 3.5 | — | — | COMPARATIVE EXAMPLE |
| 57 | — | — | 2.8 | — | — | EXAMPLE |
| 58 | — | — | 1.5 | — | — | EXAMPLE |
| 59 | 473 | 72 | 1.0 | 330 | — | EXAMPLE |
| 60 | — | — | 1.8 | — | — | COMPARATIVE EXAMPLE |
| 61 | — | — | 3.8 | — | — | EXAMPLE |
| 62 | 557 | 10 | 3.0 | — | 0.05 | EXAMPLE |
| 63 | 533 | 14 | 2.8 | — | — | EXAMPLE |
| 64 | — | — | 1.8 | — | — | COMPARATIVE EXAMPLE |
| 65 | — | — | 4.2 | — | — | EXAMPLE |
| 66 | 584 | 13 | 10.8 | — | — | EXAMPLE |
| 67 | 483 | 36 | 4.2 | — | — | EXAMPLE |
| 68 | — | — | 2.0 | — | — | COMPARATIVE EXAMPLE |
| 69 | — | — | 3.8 | — | — | EXAMPLE |
| 70 | 541 | 25 | 2.9 | — | 0.80 | EXAMPLE |
| 71 | 585 | 18 | 2.8 | — | — | EXAMPLE |
| 72 | — | — | 4.7 | — | — | COMPARATIVE EXAMPLE |
| 73 | — | — | 3.9 | — | — | EXAMPLE |
| 74 | 497 | 25 | 42.3 | — | — | EXAMPLE |
| 75 | 514 | 41 | 1.3 | 340 | — | EXAMPLE |
| 76 | — | — | 4.2 | — | — | COMPARATIVE EXAMPLE |
| 77 | — | — | 3.2 | — | — | EXAMPLE |
| 78 | 520 | 30 | 3.5 | — | — | EXAMPLE |

TABLE 11

| EXPERI-MENTAL EXAMPLE | CHEMICAL COMPONENT | STEEL TYPE | HEATING STEP HEATING RATE AT 600 TO 750° C. °C./SECOND | HEATING STEP MAXIMUM HEATING TEMPERATURE °C. | ANNEALING STEP-PLATING STEP FIRST STEP COOLING COOLING RATE AT 750° C. TO 650° C. °C./SECOND | SECOND COOLING STEP COOLING RATE FROM 650° C. °C./SECOND | BAINITE TRANSFORMATION PROCESS RETENTION TIME AT 300 TO 470° C. SECOND | PRE-HEATING ZONE MIXED GAS RATIO | REDUCTION ZONE P(H₂O)/P(H₂) | EFFECTIVE Al AMOUNT | PLATING ZONE PLATING BATH TEMPERATURE °C. | PLATING ZONE ENTERING TEMPERATURE OF STEEL SHEET °C. |
|---|---|---|---|---|---|---|---|---|---|---|---|---|
| 79 | T | GA | 6.5 | 848 | 6.2 | 6.3 | 172 | 0.9 | 0.006 | 0.10 | 456 | 463 |
| 80 | T | GI | 6.6 | 837 | 2.3 | 20.8 | 86 | 1.2 | 0.562 | 0.08 | 460 | 449 |
| 81 | U | GI | 6.2 | 792 | 3.5 | 66.0 | 228 | 0.7 | 0.034 | 0.14 | 461 | 466 |
| 82 | U | GI | 0.7 | 864 | 2.8 | 21.5 | 236 | 0.9 | 0.036 | 0.09 | 454 | 486 |
| 83 | U | GA | 2.7 | 827 | 5.9 | 6.7 | 257 | 0.9 | 0.016 | 0.10 | 462 | 433 |
| 84 | U | GI | 3.8 | 840 | 7.3 | 12.5 | 220 | 0.9 | 0.032 | 0.12 | 461 | 475 |
| 85 | V | GI | 4.4 | 834 | 4.7 | 6.0 | 56 | 1.1 | 0.066 | 0.03 | 469 | 461 |
| 86 | V | GI | 4.8 | 877 | 3.7 | 24.5 | 140 | 1.2 | 0.017 | 0.08 | 453 | 473 |
| 87 | V | GA | 9.3 | 857 | 4.5 | 17.1 | 130 | 0.9 | 0.054 | 0.10 | 458 | 457 |
| 88 | V | GI | 7.5 | 886 | 1.8 | 6.2 | 59 | 1.1 | 0.324 | 0.29 | 461 | 447 |
| 89 | W | GI | 4.6 | 862 | 4.1 | 43.7 | 95 | 0.8 | 0.145 | 0.06 | 460 | 477 |
| 90 | W | GI | 6.2 | 785 | 3.0 | 52.0 | 82 | 0.7 | 1.380 | 0.09 | 458 | 475 |
| 91 | W | GA | 4.8 | 822 | 1.4 | 6.6 | — | 0.8 | 0.004 | 0.10 | 465 | 479 |
| 92 | W | GI | 6.9 | 830 | 0.3 | 16.0 | 72 | 1.1 | 0.141 | 0.09 | 457 | 452 |
| 93 | X | GI | 3.6 | 769 | 2.9 | 26.5 | 110 | 1.0 | 0.048 | 0.10 | 465 | 446 |
| 94 | X | GI | 0.9 | 845 | 4.1 | 31.5 | 103 | 1.0 | 0.302 | 0.02 | 456 | 444 |
| 95 | X | GA | 3.3 | 878 | 1.2 | 5.7 | 84 | 0.9 | 0.257 | 0.12 | 467 | 469 |
| 96 | X | GI | 4.7 | 836 | 2.4 | 7.5 | 64 | 0.9 | 0.069 | 0.09 | 456 | 457 |
| 97 | Y | GI | 8.6 | 841 | 2.9 | 16.5 | 37 | 0.9 | 0.019 | 0.09 | 457 | 451 |
| 98 | Y | GA | 7.9 | 832 | 7.5 | 47.9 | 47 | 1.2 | 0.056 | 0.12 | 454 | 468 |
| 99 | Y | GI | 8.6 | 837 | 6.8 | 4.6 | 27 | 0.9 | 0.079 | 0.08 | 464 | 448 |
| 100 | Y | GI | 5.3 | 859 | 3.3 | 23.8 | 32 | 0.9 | 0.083 | 0.11 | 462 | 452 |
| 101 | Z | GI | 8.4 | 812 | 4.9 | 16.5 | — | 1.0 | 0.174 | 0.11 | 459 | 475 |
| 102 | Z | GA | 4.0 | 810 | 6.5 | 4.3 | 68 | 0.8 | 0.005 | 0.09 | 453 | 448 |
| 103 | Z | GA | 8.0 | 864 | 6.5 | 5.6 | 69 | 1.1 | 0.013 | 0.10 | 461 | 462 |
| 104 | Z | GI | 6.7 | 860 | 6.2 | 8.3 | 70 | 0.9 | 0.071 | 0.09 | 457 | 443 |

| EXPERIMENTAL EXAMPLE | ANNEALING STEP-PLATING STEP ALLOYING FURNACE ALLOYING TEMPERATURE °C. | ANNEALING STEP-PLATING STEP ALLOYING FURNACE TREATMENT TIME SECOND | THIRD COOLING STEP COOLING RATE °C./SECOND | TEMPERING STEP TEMPERING TEMPERATURE °C. | CORRECTIVE ROLLING REDUCTION RATIO % | CLASSIFICATION |
|---|---|---|---|---|---|---|
| 79 | 515 | 30 | 3.0 | — | — | EXAMPLE |
| 80 | — | — | 2.8 | — | — | COMPARATIVE EXAMPLE |
| 81 | — | — | 2.0 | — | — | EXAMPLE |

TABLE 11-continued

| | | | | | |
|---|---|---|---|---|---|
| 82 | — | — | 0.8 | 0.60 | EXAMPLE |
| 83 | 498 | 26 | 1.8 | — | EXAMPLE |
| 84 | — | — | 3.6 | — | COMPARATIVE EXAMPLE |
| 85 | — | — | 3.0 | — | EXAMPLE |
| 86 | 500 | 10 | 2.7 | — | EXAMPLE |
| 87 | — | — | 2.8 | — | EXAMPLE |
| 88 | — | — | 1.9 | — | COMPARATIVE EXAMPLE |
| 89 | — | — | 3.3 | — | EXAMPLE |
| 90 | — | — | 3.5 | — | EXAMPLE |
| 91 | 507 | 9 | 2.5 | — | EXAMPLE |
| 92 | — | — | 3.1 | — | COMPARATIVE EXAMPLE |
| 93 | — | — | 2.9 | — | EXAMPLE |
| 94 | — | — | 3.4 | — | EXAMPLE |
| 95 | 527 | 15 | 3.3 | — | EXAMPLE |
| 96 | — | — | 3.1 | — | COMPARATIVE EXAMPLE |
| 97 | — | — | 1.8 | — | EXAMPLE |
| 98 | 530 | 23 | 21.9 | — | EXAMPLE |
| 99 | 570 | 23 | 2.1 | — | EXAMPLE |
| 100 | 498 | 253 | 3.3 | — | COMPARATIVE EXAMPLE |
| 101 | — | — | 4.1 | — | EXAMPLE |
| 102 | 550 | 25 | 3.5 | — | EXAMPLE |
| 103 | 483 | 27 | 2.6 | — | EXAMPLE |
| 104 | — | — | 3.6 | — | COMPARATIVE EXAMPLE |

TABLE 12

| EXPERIMENTAL EXAMPLE | CHEMICAL COMPONENT | STEEL TYPE | HEATING STEP | | ANNEALING STEP-PLATING STEP | | | | | | | PLATING ZONE | | |
|---|---|---|---|---|---|---|---|---|---|---|---|---|---|---|
| | | | HEATING RATE AT 600 TO 750° C. ° C./SECOND | MAXIMUM HEATING TEMPERATURE ° C. | FIRST STEP COOLING COOLING RATE AT 750° C. TO 650° C. ° C./SECOND | SECOND COOLING STEP COOLING RATE FROM 650° C. ° C./SECOND | BAINITE TRANSFORMATION PROCESS RETENTION TIME AT 300 TO 470° C. SECOND | PRE-HEATING ZONE MIXED GAS RATIO | REDUCTION ZONE P(H₂O)/P(H₂) | EFFECTIVE Al AMOUNT | PLATING BATH TEMPERATURE ° C. | ENTERING TEMPERATURE OF STEEL SHEET ° C. | | |
| 105 | AA | GI | 7.1 | 819 | 2.0 | 9.1 | 294 | 0.9 | 0.219 | 0.11 | 466 | 456 | | |
| 106 | AA | GI | 8.4 | 805 | 6.9 | 43.3 | 284 | 1.0 | 1.59 | 0.03 | 458 | 466 | | |
| 107 | AA | GA | 3.0 | 800 | 5.6 | 7.0 | 49 | 1.1 | 0.224 | 0.11 | 454 | 460 | | |
| 108 | AA | GI | 7.6 | 825 | 5.6 | 4.9 | 79 | 1.0 | 0.234 | 0.00 | 458 | 444 | | |
| 109 | AB | GI | 1.3 | 827 | 5.2 | 4.9 | 41 | 1.0 | 0.033 | 0.12 | 459 | 454 | | |
| 110 | AB | GA | 0.8 | 811 | 2.6 | 21.5 | 43 | 1.0 | 0.178 | 0.07 | 453 | 471 | | |
| 111 | AB | GA | 1.5 | 804 | 7.1 | 48.8 | 46 | 0.8 | 0.004 | 0.09 | 461 | 467 | | |
| 112 | AB | GI | 1.5 | 857 | 1.3 | 22.4 | 50 | 0.9 | 0.004 | 0.08 | 459 | 462 | | |
| 113 | AC | GI | 2.9 | 892 | 5.3 | 6.1 | 25 | 0.9 | 0.071 | 0.07 | 453 | 459 | | |
| 114 | AC | GA | 2.5 | 910 | 2.9 | 27.2 | 160 | 1.0 | 0.019 | 0.10 | 455 | 434 | | |
| 115 | AC | GA | 4.7 | 872 | 3.8 | 21.9 | 193 | 0.8 | 0.398 | 0.08 | 458 | 463 | | |
| 116 | AC | GI | 6.5 | 886 | 6.8 | 7.1 | 130 | 0.8 | 0.012 | 0.08 | 461 | 487 | | |
| 117 | AD | GI | 8.1 | 829 | 4.8 | 3.4 | 32 | 1.0 | 0.025 | 0.10 | 466 | 463 | | |
| 118 | AD | GA | 1.6 | 910 | 6.3 | 19.4 | 25 | 0.9 | 0.050 | 0.11 | 464 | 477 | | |
| 119 | AD | GI | 6.0 | 825 | 5.5 | 19.6 | — | 1.1 | 0.012 | 0.11 | 464 | 475 | | |
| 120 | AD | GI | 3.1 | 848 | 3.1 | 4.0 | — | 0.9 | 0.136 | 0.10 | 468 | 472 | | |
| 121 | AE | GI | 5.9 | 841 | 8.3 | 4.9 | 42 | 0.9 | 0.018 | 0.09 | 461 | 460 | | |
| 122 | AF | GI | 4.9 | 837 | 5.7 | 6.9 | 50 | 1.1 | 0.076 | 0.11 | 454 | 449 | | |
| 123 | AG | GI | 2.8 | 833 | 6.8 | 7.8 | 40 | 1.1 | 0.015 | 0.12 | 456 | 456 | | |
| 124 | BA | — | TEST INTERRUPTED DUE TO FRACTURE IN COLD ROLLING STEP | | | | | | | | | | | |
| 125 | BB | GA | 3.4 | 814 | 1.4 | 14.7 | 63 | 0.9 | 0.200 | 0.10 | 466 | 470 | | |
| 126 | BC | — | TEST INTERRUPTED DUE TO SLAB CRACKING | | | | | | | | | | | |
| 127 | BD | — | TEST INTERRUPTED DUE TO WELD ZONE FRACTURE IN ANNEALING STEP | | | | | | | | | | | |
| 128 | BE | GA | 2.5 | 805 | 1.9 | 15.3 | 106 | 1.4 | 0.158 | 0.08 | 463 | 461 | | |

| EXPERIMENTAL EXAMPLE | ANNEALING STEP-PLATING STEP ALLOYING FURNACE | | THIRD COOLING STEP COOLING RATE ° C./SECOND | TEMPERING STEP TEMPERING TEMPERATURE ° C. | CORRECTIVE ROLLING REDUCTION RATIO % | CLASSIFICATION |
|---|---|---|---|---|---|---|
| | ALLOYING TEMPERATURE ° C. | TREATMENT TIME SECOND | | | | |
| 105 | — | — | 0.6 | — | — | EXAMPLE |
| 106 | — | — | 12.6 | — | — | EXAMPLE |
| 107 | 518 | 16 | 3.6 | — | — | EXAMPLE |
| 108 | — | — | 3.8 | — | — | COMPARATIVE EXAMPLE |
| 109 | — | — | 1.9 | — | — | EXAMPLE |

TABLE 12-continued

| | | | | |
|---|---|---|---|---|
| 110 | 525 | 21 | 3.0 | EXAMPLE |
| 111 | 496 | 41 | 3.5 | EXAMPLE |
| 112 | — | — | 2.5 | COMPARATIVE EXAMPLE |
| 113 | — | — | 3.6 | EXAMPLE |
| 114 | 514 | 20 | 4.6 | EXAMPLE |
| 115 | 487 | 34 | 0.7 | EXAMPLE |
| 116 | — | — | 2.9 | COMPARATIVE EXAMPLE |
| 117 | — | — | 3.0 | EXAMPLE |
| 118 | 540 | 15 | 1.9 | EXAMPLE |
| 119 | 508 | 18 | 2.9 | EXAMPLE |
| 120 | — | — | 5.9 | COMPARATIVE EXAMPLE |
| 121 | — | — | 2.2 | EXAMPLE |
| 122 | — | — | 3.1 | EXAMPLE |
| 123 | — | — | 3.7 | EXAMPLE |
| 124 | TEST INTERRUPTED DUE TO FRACTURE IN COLD ROLLING STEP | | | COMPARATIVE EXAMPLE |
| 125 | 497 | 20 | 2.3 | EXAMPLE |
| 126 | TEST INTERRUPTED DUE TO SLAB CRACKING | | | EXAMPLE |
| 127 | TEST INTERRUPTED DUE TO WELD ZONE FRACTURE IN ANNEALING STEP | | | EXAMPLE |
| 128 | 536 | 20 | 2.9 | COMPARATIVE EXAMPLE |

TABLE 13

| EXPERIMENTAL EXAMPLE | CHEMICAL COMPONENT | STEEL TYPE | MICROSTRUCTURE OF BASE STEEL SHEET STRUCTURAL FRACTION | | | | | | | FERRITE | | HARD STRUCTURE L(RD)/L(TD) | BCC IRON X-RAY RANDOM INTENSITY RATIO | INCLUSION | | CLASSIFICATION |
|---|---|---|---|---|---|---|---|---|---|---|---|---|---|---|---|---|
| | | | FERRITE % | BAINITE % | BAINITIC FERRITE % | MARTENSITE % | TEMPERED MARTENSITE % | RETAINED AUSTENITE % | OTHERS % | d(RD)/d(TD) | NON-RECRYSTALIZED FERRITE FRACTION % | | | ASPEC RATIO | D(RD)/D(TD) | |
| 1 | A | GI | 55 | 13 | 10 | 16 | 2 | 3 | 1 | 0.93 | 0 | 0.93 | 2.4 | 3.0 | 1.26 | EXAMPLE |
| 2 | A | GI | 65 | 14 | 12 | 6 | 0 | 1 | 2 | 1.08 | 0 | 0.91 | 2.8 | 3.4 | 1.69 | EXAMPLE |
| 3 | A | GA | 66 | 25 | 0 | 7 | 0 | 0 | 0 | 0.90 | 0 | 0.98 | 3.0 | 2.7 | 1.12 | EXAMPLE |
| 4 | A | GI | 53 | 18 | 5 | 19 | 1 | 4 | 2 | 0.96 | 0 | 0.90 | 2.4 | 6.3 | 3.02 | COMPARATIVE EXAMPLE |
| 5 | B | GI | 52 | 12 | 26 | 7 | 0 | 1 | 2 | 0.82 | 0 | 1.02 | 3.2 | 4.1 | 1.64 | |
| 6 | B | GA | 49 | 31 | 18 | 0 | 0 | 2 | 0 | 1.05 | 0 | 0.97 | 3.0 | 2.7 | 1.41 | |
| 7 | B | GA | 51 | 24 | 20 | 4 | 0 | 0 | 1 | 1.18 | 0 | 1.03 | 2.7 | 3.8 | 1.38 | |
| 8 | B | GA | 47 | 37 | 5 | 0 | 0 | 0 | 11 | 0.90 | 0 | 0.87 | 2.9 | 3.6 | 1.24 | |
| 9 | C | GI | 65 | 0 | 28 | 4 | 0 | 3 | 0 | 0.95 | 0 | 0.92 | 3.1 | 3.8 | 1.55 | |
| 10 | C | GA | 78 | 2 | 14 | 6 | 0 | 0 | 0 | 1.07 | 0 | 1.23 | 3.4 | 3.5 | 1.63 | |
| 11 | C | GI | 59 | 5 | 26 | 8 | 0 | 2 | 0 | 0.91 | 0 | 1.05 | 3.2 | 3.1 | 1.66 | |
| 12 | C | GI | 73 | 2 | 17 | 0 | 0 | 0 | 8 | 0.90 | 0 | 1.06 | 3.6 | 3.3 | 1.47 | |
| 13 | D | GI | 51 | 23 | 17 | 8 | 1 | 0 | 0 | 1.03 | 0 | 0.88 | 2.7 | 3.5 | 1.57 | |
| 14 | D | GI | 49 | 20 | 21 | 7 | 0 | 1 | 2 | 0.98 | 0 | 0.97 | 2.7 | 3.1 | 1.68 | |
| 15 | D | GA | 48 | 22 | 15 | 8 | 1 | 3 | 3 | 1.12 | 0 | 1.06 | 2.6 | 3.4 | 1.59 | |

| EXPERIMENTAL EXAMPLE | SURFACE LAYER (DECABURIZED LAYER) OF BASE STEEL SHEET | | | PROPERTY | | | | | | DELAYED FRACTURE RESISTANCE | | |
|---|---|---|---|---|---|---|---|---|---|---|---|---|
| | DECARBURIZED LAYER THICKNESS μm | OXIDE DENSITY 10¹² OXIDES/m² | OXIDE SIZE nm | EXTERNAL APPEARANCE | YIELD STRESS MPa | TENSILE STRENGHT MPa | TOTAL ELONGATION % | n VALUE | PLATING PEELING | HYDROCHLORIC ACID IMMERSION TEST RESULT | RATIO OF LIMIT DIFFUSIBLE HYDROGEN CONTENT | |
| 1 | 3.45 | 43.0 | 73 | ○ | 679 | 1178 | 16 | 0.087 | — | ○ | 1.23 | |
| 2 | 0.94 | 9.5 | 78 | ○ | 443 | 948 | 22 | 0.136 | — | ○ | 0.73 | |
| 3 | 0.67 | 23.3 | 61 | ○ | 654 | 1126 | 17 | 0.117 | — | ○ | 1.60 | |
| 4 | 3.22 | 38.3 | 66 | ○ | 719 | 1212 | 16 | 0.101 | — | X | 3.40 | |

TABLE 13-continued

|  |  |  |  |  |  |  |  |  |  |
|---|---|---|---|---|---|---|---|---|---|
| 5 | 2.63 | 4.9 | 79 | ○ | 703 | 1183 | 16 | 0.095 | — | 1.18 | EXAMPLE |
| 6 | 0.45 | 6.8 | 63 | ○ | 583 | 989 | 21 | 0.125 | — | 1.10 | EXAMPLE |
| 7 | 0.97 | 9.0 | 74 | ○ | 653 | 1131 | 17 | 0.097 | — | 1.45 | EXAMPLE |
| 8 | 3.42 | 19.4 | 79 | ○ | 494 | 807 | 28 | 0.147 | EXIS-TENCE | 1.25 | COMPARATIVE EXAMPLE |
| 9 | 2.93 | 60.9 | 65 | ○ | 479 | 960 | 22 | 0.140 | — | 1.07 | EXAMPLE |
| 10 | 1.00 | 8.3 | 44 | ○ | 322 | 918 | 23 | 0.165 | — | 1.28 | EXAMPLE |
| 11 | 2.77 | 177.1 | 51 | ○ | 602 | 1091 | 18 | 0.111 | — | 1.48 | EXAMPLE |
| 12 | 4.37 | 50.4 | 75 | ○ | 375 | 764 | 30 | 0.214 | — | 1.32 | COMPARATIVE EXAMPLE |
| 13 | 2.69 | 20.4 | 62 | ○ | 794 | 1130 | 17 | 0.092 | — | 1.52 | EXAMPLE |
| 14 | 2.34 | 17.1 | 67 | ○ | 810 | 1166 | 16 | 0.092 | — | 0.86 | EXAMPLE |
| 15 | 0.66 | 6.2 | 81 | ○ | 844 | 1353 | 13 | 0.081 | — | 1.60 | EXAMPLE |

TABLE 14

| EXPERI-MENTAL EXAMPLE | CHEMICAL COMPONENT | STEEL TYPE | MICROSTRUCTURE OF BASE STEEL SHEET — STRUCTURAL FRACTION ||||||| FERRITE || BCC ||| INCLUSION ||
| --- | --- | --- | --- | --- | --- | --- | --- | --- | --- | --- | --- | --- | --- | --- |
| | | | FER-RITE % | BAI-NITE % | BAINITIC FERRITE % | MAR-TEN-SITE % | TEM-PERED MARTEN-SITE % | RETAINED AUSTENITE % | OTHERS % | d(RD)/d(TD) | FERRITE FRAC-TION % | NON-RE-CRYS-TALIZED FERRITE FRACTION % | HARD STRUC-TURE L(RD)/L(TD) | IRON X-RAY RAN-DOM INTEN-SITY RATIO | ASPEC RATIO | D(RD)/D(TD) |
| 16 | D | GI | 46 | 22 | 20 | 12 | 0 | 0 | 0 | 1.00 | 0 | 1.06 | 3.0 | 3.2 | 1.37 |
| 17 | E | GI | 83 | 0 | 7 | 8 | 0 | 1 | 1 | 0.89 | 0 | 0.92 | 2.9 | 3.3 | 1.76 |
| 18 | E | GA | 73 | 12 | 10 | 0 | 5 | 0 | 0 | 1.13 | 0 | 1.00 | 2.9 | 2.9 | 1.43 |
| 19 | E | GA | 61 | 13 | 15 | 8 | 0 | 3 | 0 | 1.01 | 0 | 1.00 | 3.6 | 2.6 | 1.27 |
| 20 | E | GI | 17 | 28 | 19 | 31 | 0 | 2 | 3 | 1.02 | 0 | 1.09 | 2.0 | 3.6 | 1.47 |
| 21 | F | GI | 53 | 8 | 27 | 9 | 0 | 1 | 2 | 1.12 | 0 | 0.95 | 2.8 | 3.8 | 1.76 |
| 22 | F | GA | 45 | 17 | 26 | 6 | 2 | 4 | 0 | 0.89 | 6 | 0.92 | 3.1 | 3.4 | 0.74 |
| 23 | F | GA | 56 | 28 | 10 | 3 | 0 | 1 | 2 | 1.02 | 0 | 1.06 | 2.6 | 3.1 | 1.70 |
| 24 | F | GI | 64 | 23 | 7 | 5 | 0 | 0 | 1 | 1.24 | 0 | 0.98 | 4.3 | 3.0 | 1.17 |
| 25 | G | GI | 52 | 4 | 20 | 20 | 0 | 3 | 1 | 1.02 | 0 | 1.06 | 2.9 | 4.5 | 1.51 |
| 26 | G | GI | 46 | 5 | 7 | 0 | 40 | 2 | 0 | 1.11 | 0 | 0.83 | 2.6 | 3.1 | 1.34 |
| 27 | G | GA | 50 | 11 | 26 | 9 | 0 | 2 | 2 | 1.15 | 0 | 1.00 | 3.1 | 3.1 | 1.21 |
| 28 | G | GI | 51 | 6 | 32 | 10 | 0 | 0 | 1 | 0.95 | 56 | 1.12 | 3.4 | 4.2 | 1.57 |
| 29 | H | GI | 64 | 10 | 17 | 8 | 0 | 1 | 0 | 1.03 | 0 | 1.16 | 3.0 | 3.9 | 1.85 |
| 30 | H | GI | 85 | 0 | 11 | 4 | 0 | 0 | 0 | 1.17 | 0 | 0.95 | 3.7 | 1.9 | 1.31 |

| EXPERI-MENTAL EXAMPLE | SURFACE LAYER (DECABURIZED LAYER) OF BASE STEEL SHEET ||| PROPERTY |||||| DELAYED FRACTURE RESISTANCE ||| CLASSI-FICATION |
| --- | --- | --- | --- | --- | --- | --- | --- | --- | --- | --- | --- | --- | --- |
| | DECAR-BURIZED LAYER THICKNESS μm | OXIDE DENSITY 10¹² OXIDES/m² | OXIDE SIZE nm | EX-TERNAL APPEAR-ANCE | TENSILE PROPERTY |||| PLATING PEELING | HYDRO-CHLORIC ACID IMMER-SION TEST RESULT | RATIO OF LIMIT DIFFU-SIBLE HYDRO-GEN CONTENT | |
| | | | | | YIELD STRESS MPa | TENSILE STRENGHT MPa | TOTAL ELONGA-TION % | n VALUE | | | | |
| 16 | 0.00 | <1.0 | 28 | X | 823 | 1260 | 14 | 0.075 | — | X | 0.99 | COMPARATIVE EXAMPLE |
| 17 | 2.19 | 110.7 | 53 | ○ | 350 | 852 | 26 | 0.199 | — | ○ | 1.01 | EXAMPLE |
| 18 | 1.39 | 39.3 | 58 | ○ | 429 | 880 | 25 | 0.165 | — | ○ | 0.95 | EXAMPLE |
| 19 | 1.45 | 110.8 | 34 | ○ | 582 | 1131 | 17 | 0.104 | — | ○ | 1.31 | EXAMPLE |

TABLE 14-continued

| | | | | | | | | | |
|---|---|---|---|---|---|---|---|---|---|
| 20 | 3.17 | 129.5 | 53 | ○ | 1219 | 1513 | 11 | 0.048 | — | 1.05 | COMPARATIVE EXAMPLE |
| 21 | 0.82 | 44.7 | 48 | ○ | 766 | 1320 | 13 | 0.072 | — | 0.86 | EXAMPLE |
| 22 | 1.89 | 61.0 | 64 | ○ | 850 | 1374 | 13 | 0.078 | — | 0.87 | EXAMPLE |
| 23 | 2.15 | 46.7 | 63 | ○ | 554 | 1244 | 15 | 0.087 | — | 1.09 | EXAMPLE |
| 24 | 0.66 | 31.9 | 58 | ○ | 512 | 1116 | 17 | 0.101 | — | 0.48 | COMPARATIVE EXAMPLE |
| 25 | 2.39 | 110.0 | 47 | ○ | 884 | 1355 | 13 | 0.074 | — | 1.43 | EXAMPLE |
| 26 | 3.53 | 669.6 | 26 | ○ | 1183 | 1354 | 13 | 0.075 | — | 0.96 | EXAMPLE |
| 27 | 1.53 | 125.8 | 52 | ○ | 1112 | 1407 | 12 | 0.073 | — | 1.17 | EXAMPLE |
| 28 | 1.24 | 68.5 | 59 | ○ | 1013 | 1292 | 10 | 0.058 | — | 1.56 | COMPARATIVE EXAMPLE |
| 29 | 0.85 | 3.0 | 61 | ○ | 636 | 1080 | 18 | 0.108 | — | 0.78 | EXAMPLE |
| 30 | 0.06 | 1.3 | 34 | ○ | 406 | 923 | 23 | 0.162 | — | 1.19 | EXAMPLE |

TABLE 15

| EXPERI-MENTAL EXAMPLE | CHEMICAL COMPONENT | STEEL TYPE | STRUCTURAL FRACTION ||||||| FERRITE ||| BCC || INCLUSION ||
|---|---|---|---|---|---|---|---|---|---|---|---|---|---|---|---|
| | | | FERRITE % | BAINITE % | BAINITIC FERRITE % | MARTENSITE % | TEMPERED MARTENSITE % | RETAINED AUSTENITE % | OTHERS % | d(RD)/d(TD) | NON-RECRYSTALIZED FERRITE FRACTION % | HARD STRUCTURE L(RD)/L(TD) | IRON X-RAY RANDOM INTENSITY RATIO | ASPECT RATIO | D(RD)/D(TD) |
| 31 | H | GA | 68 | 25 | 7 | 0 | 0 | 0 | 0 | 0.91 | 0 | 1.17 | 3.3 | 2.9 | 1.45 |
| 32 | H | GI | 65 | 15 | 10 | 2 | 0 | 1 | 7 | 0.95 | 0 | 1.01 | 3.2 | 3.5 | 1.52 |
| 33 | I | GI | 72 | 5 | 17 | 6 | 0 | 0 | 0 | 1.07 | 0 | 1.06 | 3.1 | 4.5 | 1.30 |
| 34 | I | GA | 65 | 24 | 7 | 0 | 0 | 3 | 1 | 1.12 | 0 | 1.22 | 2.9 | 3.5 | 1.32 |
| 35 | I | GI | 71 | 3 | 14 | 0 | 10 | 2 | 0 | 0.84 | 0 | 1.14 | 3.1 | 3.6 | 1.16 |
| 36 | I | GI | 64 | 5 | 21 | 8 | 0 | 1 | 1 | 1.26 | 0 | 1.41 | 4.1 | 3.0 | 1.64 |
| 37 | J | GI | 60 | 15 | 15 | 5 | 0 | 4 | 1 | 0.97 | 0 | 1.05 | 3.2 | 3.4 | 1.56 |
| 38 | J | GA | 52 | 24 | 14 | 6 | 0 | 1 | 3 | 1.09 | 0 | 1.04 | 2.9 | 3.5 | 1.36 |
| 39 | J | GA | 52 | 22 | 20 | 4 | 0 | 0 | 2 | 1.08 | 0 | 1.02 | 3.3 | 3.8 | 1.32 |
| 40 | J | GI | 51 | 19 | 21 | 7 | 0 | 0 | 2 | 1.04 | 0 | 1.06 | 2.7 | 3.9 | 1.50 |
| 41 | K | GI | 64 | 21 | 10 | 4 | 0 | 1 | 0 | 1.07 | 0 | 1.17 | 3.0 | 3.4 | 1.25 |
| 42 | K | GI | 60 | 20 | 14 | 4 | 0 | 1 | 1 | 1.00 | 0 | 1.01 | 2.7 | 4.5 | 1.45 |
| 43 | K | GA | 58 | 25 | 10 | 6 | 0 | 2 | 0 | 1.12 | 0 | 0.83 | 3.0 | 3.3 | 1.49 |
| 44 | K | GI | 60 | 13 | 7 | 14 | 0 | 3 | 3 | 1.39 | 54 | 1.52 | 4.3 | 3.2 | 1.41 |
| 45 | L | GI | 44 | 21 | 21 | 13 | 0 | 0 | 1 | 1.13 | 0 | 1.05 | 2.6 | 2.8 | 1.52 |

| | SURFACE LAYER (DECABURIZED LAYER OF BASE STEEL SHEET) ||| PROPERTY |||||| DELAYED FRACTURE RESISTANCE || |
|---|---|---|---|---|---|---|---|---|---|---|---|---|
| EXPERIMENTAL EXAMPLE | DECARBURIZED LAYER THICKNESS μm | OXIDE DENSITY 10¹² OXIDES/m² | OXIDE SIZE nm | EXTERNAL APPEARANCE | TENSILE PROPERTY ||||| PLATING PEELING | HYDROCHLORIC ACID IMMERSION TEST RESULT | RATIO OF LIMIT DIFFUSIBLE HYDROGEN CONTENT | CLASSIFICATION |
| | | | | | YIELD STRESS MPa | TENSILE STRENGHT MPa | TOTAL ELONGATION % | n VALUE | | | | |
| 31 | 3.08 | 35.0 | 63 | ○ | 521 | 944 | 22 | 0.154 | — | ○ | 1.19 | EXAMPLE |
| 32 | 1.95 | 46.0 | 60 | ○ | 471 | 841 | 26 | 0.176 | — | ○ | 0.65 | COMPARATIVE EXAMPLE |
| 33 | 1.72 | 42.7 | 51 | ○ | 432 | 966 | 19 | 0.137 | — | ○ | 0.99 | EXAMPLE |
| 34 | 2.65 | 29.9 | 66 | ○ | 516 | 1000 | 19 | 0.128 | — | ○ | 1.82 | EXAMPLE |

TABLE 15-continued

| | | | | | | | | |
|---|---|---|---|---|---|---|---|---|
| 35 | 1.85 | 37.7 | 64 | ○ | 565 | 1036 | 18 | 0.130 | — | 0.99 | EXAMPLE |
| 36 | 1.11 | 22.0 | 71 | ○ | 456 | 976 | 18 | 0.109 | — | 0.46 | COMPARATIVE EXAMPLE |
| 37 | 1.48 | 9.9 | 90 | ○ | 805 | 1019 | 21 | 0.143 | — | 1.45 | EXAMPLE |
| 38 | 2.27 | 12.3 | 82 | ○ | 616 | 1084 | 18 | 0.113 | — | 0.74 | EXAMPLE |
| 39 | 0.17 | 5.6 | 70 | ○ | 647 | 1085 | 18 | 0.111 | — | 1.11 | EXAMPLE |
| 40 | 2.69 | 23.7 | 68 | × | 708 | 1209 | 15 | 0.084 | — | 1.21 | COMPARATIVE EXAMPLE |
| 41 | 8.20 | 8.1 | 109 | ○ | 608 | 1003 | 21 | 0.131 | — | 1.80 | EXAMPLE |
| 42 | 1.84 | 14.1 | 78 | ○ | 526 | 1053 | 19 | 0.123 | — | 1.05 | EXAMPLE |
| 43 | 2.34 | 7.5 | 83 | ○ | 549 | 1011 | 20 | 0.118 | — | 1.56 | EXAMPLE |
| 44 | 0.85 | 7.5 | 66 | ○ | 1033 | 1204 | 9 | 0.053 | — | 0.29 | COMPARATIVE EXAMPLE |
| 45 | 0.72 | 19.4 | 565 | ○ | 866 | 1414 | 12 | 0.059 | — | 1.01 | EXAMPLE |

TABLE 16

| EXPERI-MENTAL EXAMPLE | CHEMICAL COMPONENT | STEEL TYPE | MICROSTRUCTURE OF BASE STEEL SHEET ||||||||| FERRITE ||| BCC || INCLUSION ||
|---|---|---|---|---|---|---|---|---|---|---|---|---|---|---|---|
| | | | STRUCTURAL FRACTION |||||||| HARD STRUC-TURE L(RD)/L(TD) | NON-RE-CRYS-TALIZED FERRITE FRACTION % | IRON X-RAY RAN-DOM INTEN-SITY RATIO | ASPEC RATIO | D(RD)/D(TD) |
| | | | FER-RITE % | BAI-NITE % | BAINITIC FERRITE % | MAR-TEN-SITE % | TEM-PERED MARTEN-SITE % | RETAINED AUSTENITE % | OTHERS % | d(RD)/d(TD) | | | | | |
| 46 | L | GA | 42 | 11 | 12 | 23 | 5 | 4 | 3 | 1.02 | 1.28 | 16 | 2.6 | 4.0 | 1.24 |
| 47 | L | GA | 45 | 32 | 16 | 5 | 0 | 0 | 2 | 0.93 | 1.15 | 0 | 2.7 | 3.1 | 1.53 |
| 48 | L | GI | 50 | 10 | 12 | 25 | 0 | 3 | 0 | 1.65 | 1.48 | 42 | 5.5 | 4.1 | 1.39 |
| 49 | M | GI | 58 | 8 | 28 | 5 | 0 | 0 | 1 | 0.98 | 0.98 | 0 | 3.3 | 3.1 | 1.57 |
| 50 | M | GI | 54 | 19 | 20 | 7 | 0 | 0 | 0 | 1.04 | 0.91 | 0 | 3.3 | 4.4 | 1.67 |
| 51 | M | GA | 59 | 23 | 10 | 6 | 0 | 2 | 0 | 0.91 | 0.88 | 0 | 2.5 | 3.6 | 1.61 |
| 52 | M | GI | 56 | 14 | 23 | 4 | 0 | 0 | 1 | 1.11 | 0.93 | 0 | 3.5 | 3.8 | 1.49 |
| 53 | N | GI | 57 | 18 | 15 | 7 | 0 | 1 | 2 | 1.19 | 1.20 | 0 | 3.4 | 2.0 | 1.26 |
| 54 | N | GA | 65 | 22 | 8 | 4 | 0 | 1 | 0 | 1.00 | 1.08 | 0 | 3.4 | 2.1 | 0.74 |
| 55 | N | GA | 51 | 25 | 16 | 5 | 0 | 0 | 3 | 1.05 | 0.86 | 0 | 2.7 | 2.9 | 1.31 |
| 56 | N | GI | 63 | 18 | 13 | 4 | 0 | 2 | 0 | 1.26 | 0.97 | 0 | 4.7 | 2.4 | 0.80 |
| 57 | O | GI | 66 | 10 | 17 | 3 | 0 | 1 | 3 | 1.01 | 1.05 | 0 | 3.0 | 3.5 | 1.66 |
| 58 | O | GI | 63 | 4 | 8 | 0 | 23 | 2 | 0 | 1.00 | 1.04 | 5 | 3.1 | 4.2 | 1.61 |
| 59 | O | GA | 68 | 4 | 12 | 14 | 0 | 2 | 0 | 0.88 | 1.09 | 0 | 3.1 | 3.5 | 1.61 |
| 60 | O | GI | 54 | 7 | 29 | 2 | 0 | 8 | 0 | 0.95 | 0.96 | 0 | 3.3 | 3.3 | 1.24 |

| EXPERI-MENTAL EXAMPLE | SURFACE LAYER ||| PROPERTY |||||| DELAYED FRACTURE RESISTANCE || CLASSI-FICATION |
|---|---|---|---|---|---|---|---|---|---|---|---|---|
| | (DECABURIZED LAYER) OF BASE STEEL SHEET ||| EX-TERNAL APPEAR-ANCE | TENSILE PROPERTY |||| PLATING PEELING | HYDRO-CHLORIC ACID IMMER-SION TEST RESULT | RATIO OF LIMIT DIFFU-SIBLE HYDRO-GEN CONTENT | |
| | DECAR-BURIZED LAYER THICKNESS μm | OXIDE DENSITY 10¹²OXIDES/m² | OXIDE SIZE nm | | YIELD STRESS MPa | TENSILE STRENGHT MPa | TOTAL ELONGA-TION % | n VALUE | | | | |
| 46 | 2.29 | 4.2 | 87 | ○ | 890 | 1316 | 14 | 0.078 | — | ○ | 1.24 | EXAMPLE |
| 47 | 2.39 | 1.7 | 96 | ○ | 788 | 1239 | 15 | 0.077 | — | ○ | 1.54 | EXAMPLE |
| 48 | 3.04 | 18.7 | 82 | ○ | 1094 | 1350 | 8 | 0.046 | — | ○ | 0.36 | COMPARATIVE EXAMPLE |
| 49 | 1.74 | 4.7 | 69 | ○ | 566 | 1031 | 20 | 0.125 | — | ○ | 1.34 | EXAMPLE |

TABLE 16-continued

| | | | | | | | | | |
|---|---|---|---|---|---|---|---|---|---|
| 50 | 0.18 | 2.2 | 57 | ○ | 595 | 1053 | 19 | 0.121 | — | ○ | 1.45 | EXAMPLE |
| 51 | 2.38 | 33.8 | 73 | ○ | 615 | 1215 | 15 | 0.089 | — | ○ | 1.07 | EXAMPLE |
| 52 | 2.01 | <1.0 | 756 | ○ | 725 | 1261 | 15 | 0.096 | — | × | 1.08 | COMPARATIVE EXAMPLE |
| 53 | 0.80 | 35.5 | 41 | ○ | 688 | 1244 | 18 | 0.108 | — | ○ | 1.41 | EXAMPLE |
| 54 | 7.00 | 87.2 | 54 | ○ | 481 | 967 | 22 | 0.138 | — | ○ | 1.21 | EXAMPLE |
| 55 | 2.47 | 24.3 | 72 | ○ | 704 | 1150 | 17 | 0.096 | — | ○ | 1.04 | EXAMPLE |
| 56 | 1.87 | 58.1 | 53 | ○ | 624 | 1218 | 15 | 0.091 | — | ○ | 0.46 | COMPARATIVE EXAMPLE |
| 57 | 0.74 | 43.9 | 37 | ○ | 473 | 1016 | 20 | 0.142 | — | ○ | 1.16 | EXAMPLE |
| 58 | 3.12 | 260.3 | 46 | ○ | 1110 | 1404 | 12 | 0.083 | — | ○ | 0.89 | EXAMPLE |
| 59 | 0.28 | 55.2 | 47 | ○ | 569 | 1203 | 16 | 0.104 | — | ○ | 0.84 | EXAMPLE |
| 60 | 1.46 | 95.9 | 32 | ○ | 574 | 1000 | 22 | 0.147 | — | × | 1.04 | COMPARATIVE EXAMPLE |

TABLE 17

| EXPERI-MENTAL EXAMPLE | CHEMICAL COMPONENT | STEEL TYPE | STRUCTURAL FRACTION ||||| FERRITE || BCC || INCLUSION ||
| | | | FER-RITE % | BAI-NITE % | BAINITIC FERRITE % | MAR-TEN-SITE % | TEM-PERED MARTEN-SITE % | RETAINED AUSTENITE % | OTHERS % | d(RD)/d(TD) | FERRITE FRAC-TION % | NON-RE-CRYS-TALIZED FERRITE FRAC-TION % | HARD STRUC-TURE L(RD)/L(TD) | DOM INTEN-SITY RATIO | IRON X-RAY RAN-DOM INTEN-SITY RATIO | ASPEC RATIO | D(RD)/D(TD) |
| 61 | P | GI | 44 | 28 | 16 | 12 | 0 | 2 | 0 | 1.02 | 0 | 1.06 | 2.9 | 3.9 | 1.20 |
| 62 | P | GA | 45 | 35 | 15 | 3 | 0 | 1 | 1 | 1.03 | 0 | 0.98 | 3.0 | 2.2 | 1.43 |
| 63 | P | GA | 50 | 35 | 11 | 4 | 0 | 0 | 0 | 0.98 | 0 | 1.07 | 3.2 | 3.6 | 0.76 |
| 64 | P | GI | 49 | 28 | 16 | 4 | 0 | 2 | 1 | 0.90 | 0 | 0.93 | 2.9 | 3.0 | 0.66 |
| 65 | Q | GI | 73 | 0 | 18 | 6 | 0 | 3 | 0 | 1.03 | 0 | 0.93 | 3.3 | 2.2 | 0.75 |
| 66 | Q | GA | 69 | 12 | 5 | 14 | 0 | 0 | 0 | 0.82 | 0 | 1.12 | 3.3 | 2.9 | 1.21 |
| 67 | Q | GA | 68 | 6 | 17 | 7 | 0 | 2 | 0 | 0.87 | 0 | 1.27 | 3.0 | 3.5 | 0.98 |
| 68 | Q | GI | 92 | 0 | 0 | 0 | 0 | 0 | 8 | 0.92 | 0 | 1.02 | 3.2 | 3.2 | 1.37 |
| 69 | R | GI | 64 | 12 | 13 | 9 | 0 | 2 | 0 | 1.08 | 0 | 0.98 | 3.0 | 2.8 | 1.34 |
| 70 | R | GA | 57 | 26 | 10 | 6 | 0 | 1 | 0 | 0.97 | 0 | 1.04 | 3.0 | 2.2 | 0.82 |
| 71 | R | GA | 60 | 22 | 13 | 5 | 0 | 0 | 0 | 0.96 | 4 | 0.91 | 3.0 | 3.1 | 1.54 |
| 72 | R | GI | 60 | 10 | 22 | 6 | 0 | 0 | 2 | 1.07 | 0 | 1.19 | 3.1 | 2.4 | 1.16 |
| 73 | S | GI | 56 | 19 | 19 | 5 | 0 | 1 | 0 | 1.11 | 0 | 1.07 | 3.0 | 3.4 | 1.29 |
| 74 | S | GA | 57 | 24 | 11 | 0 | 8 | 0 | 0 | 1.03 | 0 | 0.94 | 3.3 | 3.1 | 1.41 |
| 75 | S | GA | 57 | 22 | 10 | 9 | 0 | 2 | 0 | 1.12 | 0 | 1.01 | 2.4 | 3.0 | 1.51 |

| EXPERI-MENTAL EXAMPLE | SURFACE LAYER (DECABURIZED LAYER) OF BASE STEEL SHEET ||| EX-TERNAL APPEAR-ANCE | PROPERTY |||||| DELAYED FRACTURE RESISTANCE || CLASSI-FICATION |
| | DECAR-BURIZED LAYER THICKNESS μm | OXIDE DENSITY 10¹² OXIDES/m² | OXIDE SIZE nm | | TENSILE PROPERTY ||||| HYDRO-CHLORIC ACID IMMER-SION TEST RESULT | RATIO OF LIMIT DIFFU-SIBLE HYDRO-GEN CONTENT | |
| | | | | | YIELD STRESS MPa | TENSILE STRENGHT MPa | TOTAL ELONGA-TION % | n VALUE | PLATING PEELING | | | |
| 61 | 0.47 | 8.1 | 63 | ○ | 893 | 1407 | 12 | 0.068 | — | ○ | 1.10 | EXAMPLE |
| 62 | 5.18 | 23.8 | 86 | ○ | 771 | 1052 | 18 | 0.100 | — | ○ | 1.39 | EXAMPLE |
| 63 | 1.43 | 20.8 | 69 | ○ | 705 | 1166 | 16 | 0.098 | — | ○ | 1.27 | EXAMPLE |
| 64 | 18.35 | 4.0 | 202 | X | 530 | 889 | 20 | 0.114 | — | ○ | 1.33 | COMPARATIVE EXAMPLE |

TABLE 17-continued

| | | | | | | | | | |
|---|---|---|---|---|---|---|---|---|---|
| 65 | 2.22 | 144.4 | 48 | ◯ | 479 | 1223 | 15 | 0.095 | — | 1.01 | EXAMPLE |
| 66 | 5.71 | 234.9 | 49 | ◯ | 518 | 1207 | 15 | 0.101 | — | 0.98 | EXAMPLE |
| 67 | 1.27 | 49.3 | 58 | ◯ | 504 | 1069 | 19 | 0.131 | — | 1.50 | EXAMPLE |
| 68 | 1.06 | 43.2 | 59 | ◯ | 658 | 778 | 8 | 0.057 | — | 1.19 | COMPARATIVE EXAMPLE |
| 69 | 0.72 | 2.9 | 72 | ◯ | 612 | 1146 | 17 | 0.106 | — | 1.57 | EXAMPLE |
| 70 | 3.56 | 5.6 | 108 | ◯ | 957 | 1126 | 15 | 0.085 | — | 1.21 | EXAMPLE |
| 71 | 4.17 | 5.1 | 113 | ◯ | 619 | 1065 | 19 | 0.111 | — | 1.12 | EXAMPLE |
| 72 | 14.42 | 8.9 | 104 | ◯ | 620 | 1025 | 20 | 0.132 | — | 0.85 | COMPARATIVE EXAMPLE |
| 73 | 0.84 | 16.1 | 58 | ◯ | 803 | 1135 | 17 | 0.096 | — | 1.65 | EXAMPLE |
| 74 | 1.14 | 17.2 | 70 | ◯ | 875 | 1117 | 17 | 0.105 | — | 1.65 | EXAMPLE |
| 75 | 4.63 | 24.1 | 91 | ◯ | 802 | 1165 | 17 | 0.096 | — | 0.85 | EXAMPLE |

TABLE 18

| EXPERIMENTAL EXAMPLE | CHEMICAL COMPONENT | STEEL TYPE | MICROSTRUCTURE OF BASE STEEL SHEET - STRUCTURAL FRACTION FERRITE % | BAINITE % | BAINITIC FERRITE % | MARTENSITE % | TEMPERED MARTENSITE % | RETAINED AUSTENITE % | OTHERS % | FERRITE d(RD)/d(TD) | NON-RECRYSTALIZED FERRITE FRACTION % | HARD STRUCTURE L(RD)/L(TD) | BCC IRON X-RAY RANDOM INTENSITY RATIO | INCLUSION ASPECT RATIO | D(RD)/D(TD) |
|---|---|---|---|---|---|---|---|---|---|---|---|---|---|---|---|
| 76 | S | GI | 54 | 20 | 20 | 5 | 0 | 0 | 1 | 0.63 | 0 | 0.58 | 4.8 | 3.0 | 0.42 |
| 77 | T | GI | 45 | 14 | 28 | 10 | 0 | 3 | 0 | 0.96 | 0 | 0.95 | 3.1 | 3.9 | 1.50 |
| 78 | T | GA | 48 | 18 | 25 | 6 | 0 | 0 | 3 | 1.02 | 0 | 0.98 | 2.8 | 2.9 | 1.61 |
| 79 | T | GA | 51 | 19 | 20 | 8 | 0 | 1 | 1 | 0.95 | 0 | 0.90 | 2.6 | 3.4 | 1.68 |
| 80 | T | GI | 48 | 16 | 26 | 8 | 0 | 2 | 0 | 1.02 | 0 | 0.93 | 3.0 | 5.5 | 2.37 |
| 81 | U | GI | 77 | 0 | 16 | 7 | 0 | 0 | 0 | 0.94 | 0 | 1.01 | 3.4 | 4.0 | 1.43 |
| 82 | U | GI | 67 | 5 | 19 | 8 | 0 | 1 | 0 | 1.04 | 0 | 0.96 | 2.7 | 3.0 | 1.38 |
| 83 | U | GA | 58 | 12 | 20 | 8 | 0 | 2 | 0 | 1.01 | 0 | 0.83 | 3.1 | 3.1 | 1.25 |
| 84 | U | GI | 70 | 0 | 23 | 6 | 0 | 1 | 0 | 1.39 | 0 | 1.40 | 4.2 | 4.4 | 1.61 |
| 85 | V | GI | 65 | 9 | 18 | 8 | 0 | 0 | 0 | 1.05 | 0 | 1.05 | 3.5 | 3.7 | 1.42 |
| 86 | V | GI | 68 | 10 | 14 | 7 | 0 | 1 | 0 | 0.98 | 0 | 0.97 | 3.0 | 3.7 | 1.59 |
| 87 | V | GA | 61 | 8 | 19 | 7 | 0 | 3 | 2 | 1.16 | 0 | 0.91 | 2.8 | 3.8 | 1.28 |
| 88 | V | GI | 65 | 10 | 15 | 7 | 0 | 3 | 0 | 1.03 | 0 | 1.00 | 3.2 | 3.6 | 1.51 |
| 89 | W | GI | 54 | 17 | 20 | 7 | 0 | 2 | 0 | 1.00 | 0 | 1.00 | 3.3 | 3.1 | 1.29 |
| 90 | W | GI | 57 | 10 | 24 | 8 | 0 | 1 | 0 | 1.00 | 0 | 1.10 | 3.5 | 3.2 | 1.45 |

| EXPERIMENTAL EXAMPLE | SURFACE LAYER (DECABURIZED LAYER) OF BASE STEEL SHEET DECARBURIZED LAYER THICKNESS μm | OXIDE DENSITY 10¹² OXIDES/m² | OXIDE SIZE nm | EXTERNAL APPEARANCE | PLATING PEELING | TENSILE PROPERTY YIELD STRESS MPa | TENSILE STRENGHT MPa | TOTAL ELONGATION % | n VALUE | DELAYED FRACTURE RESISTANCE HYDROCHLORIC ACID IMMERSION TEST RESULT | RATIO OF LIMIT DIFFUSIBLE HYDROGEN CONTENT | CLASSIFICATION |
|---|---|---|---|---|---|---|---|---|---|---|---|---|
| 76 | 2.60 | 16.9 | 86 | ○ | — | 754 | 1053 | 8 | 0.044 | X | 0.26 | COMPARATIVE EXAMPLE |
| 77 | 1.21 | 13.7 | 66 | ○ | — | 814 | 1255 | 15 | 0.081 | ○ | 1.30 | EXAMPLE |
| 78 | 1.72 | 22.9 | 74 | ○ | — | 701 | 1168 | 16 | 0.085 | ○ | 1.14 | EXAMPLE |
| 79 | 0.64 | 29.2 | 56 | ○ | — | 713 | 1252 | 15 | 0.088 | ○ | 1.55 | EXAMPLE |

TABLE 18-continued

| | | | | | | | | | | | | |
|---|---|---|---|---|---|---|---|---|---|---|---|---|
| 80 | 4.45 | 43.6 | 71 | ○ | 779 | 1265 | 14 | 0.078 | — | ○ | 2.44 | COMPARATIVE EXAMPLE |
| 81 | 1.93 | 7.5 | 89 | ○ | 369 | 936 | 23 | 0.170 | — | ○ | 1.75 | EXAMPLE |
| 82 | 1.80 | 7.8 | 83 | ○ | 760 | 1043 | 16 | 0.103 | — | ○ | 1.18 | EXAMPLE |
| 83 | 1.59 | 7.6 | 82 | ○ | 661 | 1198 | 16 | 0.100 | — | ○ | 1.08 | EXAMPLE |
| 84 | 1.09 | 5.7 | 83 | ○ | 443 | 1018 | 20 | 0.136 | — | ○ | 0.40 | COMPARATIVE EXAMPLE |
| 85 | 1.91 | 19.1 | 78 | ○ | 497 | 1015 | 20 | 0.131 | — | ○ | 1.36 | EXAMPLE |
| 86 | 0.78 | 13.4 | 73 | ○ | 439 | 1023 | 20 | 0.121 | — | ○ | 1.40 | EXAMPLE |
| 87 | 2.07 | 26.1 | 63 | ○ | 565 | 1066 | 19 | 0.120 | — | ○ | 0.79 | EXAMPLE |
| 88 | 4.22 | 15.3 | 95 | × | 494 | 1005 | 21 | 0.149 | — | ○ | 1.13 | COMPARATIVE EXAMPLE |
| 89 | 3.16 | 109.9 | 51 | ○ | 656 | 1166 | 16 | 0.093 | — | ○ | 1.28 | EXAMPLE |
| 90 | 5.85 | 42.0 | 76 | ○ | 574 | 1042 | 19 | 0.120 | — | ○ | 1.54 | EXAMPLE |

TABLE 19

MICROSTRUCTURE OF BASE STEEL SHEET

| EXPERI-MENTAL EXAMPLE | CHEMICAL COMPONENT | STEEL TYPE | STRUCTURAL FRACTION ||||||||| FERRITE ||| BCC || INCLUSION ||
|---|---|---|---|---|---|---|---|---|---|---|---|---|---|---|---|
| | | | FERRITE % | BAINITE % | BAINITIC FERRITE % | MARTEN-SITE % | TEMPERED MARTEN-SITE % | RETAINED AUSTENITE % | OTHERS % | d(RD)/d(TD) | NON-RECRYS-TALIZED FERRITE FRACTION % | HARD STRUCTURE L(RD)/L(TD) | IRON X-RAY RAN-DOM INTEN-SITY RATIO | ASPEC RATIO | D(RD)/D(TD) |
| 91 | W | GA | 65 | 11 | 5 | 14 | 0 | 2 | 3 | 1.03 | 0 | 0.96 | 2.6 | 3.4 | 1.69 |
| 92 | W | GI | 83 | 0 | 5 | 3 | 0 | 0 | 9 | 0.90 | 0 | 1.05 | 3.3 | 3.5 | 1.39 |
| 93 | X | GI | 55 | 17 | 20 | 7 | 0 | 1 | 0 | 1.28 | 23 | 1.31 | 2.7 | 3.5 | 1.49 |
| 94 | X | GI | 54 | 21 | 13 | 11 | 0 | 1 | 0 | 0.96 | 0 | 1.01 | 3.1 | 3.8 | 1.61 |
| 95 | X | GA | 70 | 21 | 0 | 6 | 0 | 0 | 3 | 0.83 | 0 | 1.04 | 2.8 | 4.1 | 1.50 |
| 96 | X | GI | 57 | 14 | 20 | 7 | 0 | 2 | 0 | 1.25 | 12 | 0.98 | 4.3 | 3.7 | 1.43 |
| 97 | Y | GI | 57 | 10 | 22 | 8 | 0 | 1 | 2 | 1.01 | 0 | 1.04 | 3.2 | 3.3 | 1.27 |
| 98 | Y | GA | 46 | 22 | 16 | 12 | 2 | 1 | 1 | 0.94 | 0 | 1.03 | 2.8 | 3.9 | 1.61 |
| 99 | Y | GA | 48 | 19 | 20 | 12 | 0 | 0 | 1 | 1.07 | 0 | 1.05 | 2.7 | 3.4 | 1.37 |
| 100 | Y | GA | 51 | 5 | 30 | 8 | 0 | 3 | 3 | 0.92 | 0 | 1.02 | 2.9 | 3.9 | 1.70 |
| 101 | Z | GI | 63 | 0 | 7 | 23 | 0 | 4 | 3 | 1.01 | 0 | 1.04 | 2.6 | 2.5 | 1.36 |
| 102 | Z | GA | 55 | 19 | 15 | 5 | 0 | 2 | 4 | 0.97 | 0 | 0.86 | 3.2 | 2.6 | 1.63 |
| 103 | Z | GA | 55 | 13 | 27 | 4 | 0 | 0 | 1 | 1.04 | 0 | 0.91 | 3.1 | 3.2 | 1.29 |
| 104 | Z | GI | 53 | 8 | 24 | 10 | 0 | 2 | 3 | 1.29 | 0 | 1.22 | 4.3 | 3.0 | 1.25 |
| 105 | AA | GI | 52 | 7 | 30 | 9 | 0 | 2 | 0 | 1.08 | 0 | 1.12 | 3.2 | 2.8 | 1.35 |

PROPERTY

| EXPERIMENTAL EXAMPLE | SURFACE LAYER (DECARBURIZED LAYER) OF BASE STEEL SHEET ||| TENSILE PROPERTY |||||| DELAYED FRACTURE RESISTANCE || CLASSI-FICATION |
|---|---|---|---|---|---|---|---|---|---|---|---|---|
| | DECARBURIZED LAYER THICKNESS μm | OXIDE DENSITY $10^{12}$ OXIDES/$m^2$ | OXIDE SIZE nm | EXTERNAL APPEARANCE | YIELD STRESS MPa | TENSILE STRENGHT MPa | TOTAL ELONGATION % | n VALUE | PLATING PEELING | HYDROCHLORIC ACID IMMERSION TEST RESULT | RATIO OF LIMIT DIFFUSIBLE HYDROGEN CONTENT | |
| 91 | 0.89 | 85.9 | 34 | ○ | 564 | 1224 | 15 | 0.093 | — | ○ | 1.36 | EXAMPLE |
| 92 | 1.92 | 141.1 | 50 | ○ | 474 | 850 | 16 | 0.123 | — | ○ | 1.46 | COMPARATIVE EXAMPLE |
| 93 | 1.33 | 11.2 | 89 | ○ | 847 | 1224 | 15 | 0.082 | — | ○ | 1.14 | EXAMPLE |
| 94 | 3.66 | 5.9 | 93 | ○ | 459 | 1134 | 17 | 0.094 | — | ○ | 1.50 | EXAMPLE |

TABLE 19-continued

| | | | | | | | | | | |
|---|---|---|---|---|---|---|---|---|---|---|
| 95 | 3.14 | 29.5 | 74 | ○ | 685 | 1144 | 17 | 0.107 | — | 1.18 | EXAMPLE |
| 96 | 2.09 | 17.7 | 75 | ○ | 788 | 1132 | 17 | 0.104 | — | 0.45 | COMPARATIVE EXAMPLE |
| 97 | 1.45 | 7.1 | 55 | ○ | 671 | 1280 | 14 | 0.088 | — | 1.17 | EXAMPLE |
| 98 | 1.08 | 6.4 | 65 | ○ | 907 | 1425 | 12 | 0.070 | — | 1.45 | EXAMPLE |
| 99 | 2.42 | 10.8 | 62 | ○ | 710 | 1197 | 16 | 0.084 | — | 1.13 | EXAMPLE |
| 100 | 1.59 | 58.2 | 57 | ○ | 706 | 1218 | 16 | 0.102 | EXISTENCE | 0.94 | COMPARATIVE EXAMPLE |
| 101 | 3.23 | 21.9 | 83 | ○ | 523 | 1122 | 18 | 0.125 | — | 0.64 | EXAMPLE |
| 102 | 0.78 | 22.0 | 56 | ○ | 544 | 1000 | 21 | 0.140 | — | 1.61 | EXAMPLE |
| 103 | 0.86 | 25.2 | 60 | ○ | 570 | 1028 | 20 | 0.117 | — | 0.97 | EXAMPLE |
| 104 | 1.74 | 90.5 | 46 | ○ | 661 | 1151 | 17 | 0.109 | — | 0.36 | COMPARATIVE EXAMPLE |
| 105 | 3.88 | 88.7 | 60 | ○ | 808 | 1370 | 13 | 0.075 | — | 1.16 | EXAMPLE |

TABLE 20

| | | | SURFACE LAYER (DECABURIZED LAYER) OF BASE STEEL SHEET | | | MICROSTRUCTURE OF BASE STEEL SHEET | | | | | | | | | FERRITE | | BCC | | INCLUSION | |
|---|---|---|---|---|---|---|---|---|---|---|---|---|---|---|---|---|---|---|---|
| | | | | | | STRUCTURAL FRACTION | | | | | | | | | NON-RE-CRYS-TALIZED FERRITE FRAC-TION % | HARD STRUC-TURE L(RD)/L(TD) | IRON X-RAY RAN-DOM INTEN-SITY RATIO | | | |
| EXPERI-MENTAL EXAM-PLE | CHE-MICAL COMPO-NENT | STEEL TYPE | DECAR-BURIZED LAYER THICKNESS μm | OXIDE DENSITY 10¹² OXIDES/ m² | OXIDE SIZE nm | FER-RITE % | BAI-NITE % | BAINITIC FERRITE % | MAR-TEN-SITE % | TEM-PERED MARTEN-SITE % | RETAINED AUSTENITE % | OTHERS % | d(RD)/ d(TD) | | | | ASPEC RATIO | D(RD)/ D(TD) | |
| 106 | AA | GI | 5.95 | 166.9 | 47 | 48 | 11 | 28 | 11 | 0 | 0 | 2 | 0.85 | 0 | 0.81 | 2.9 | 3.8 | 0.85 | |
| 107 | AA | GA | 3.73 | 73.9 | 61 | 56 | 13 | 20 | 9 | 0 | 1 | 1 | 0.97 | 0 | 1.26 | 2.8 | 2.8 | 0.67 | |
| 108 | AA | GI | 3.78 | 41.5 | 82 | 57 | 3 | 33 | 7 | 0 | 0 | 0 | 1.00 | 0 | 1.05 | 3.1 | 2.9 | 1.24 | |
| 109 | AB | GI | 1.54 | 7.3 | 88 | 64 | 11 | 15 | 8 | 0 | 2 | 0 | 1.18 | 0 | 1.14 | 3.0 | 3.3 | 1.35 | |
| 110 | AB | GA | | | | 54 | 15 | 21 | 7 | 0 | 0 | 3 | 1.13 | 0 | 0.94 | 2.5 | 3.1 | 1.46 | |
| 111 | AB | GA | | | | 53 | 13 | 19 | 10 | 0 | 3 | 2 | 1.00 | 0 | 1.07 | 2.7 | 3.9 | 1.67 | |
| 112 | AB | GI | | | | 62 | 10 | 20 | 3 | 0 | 3 | 2 | 1.39 | 0 | 1.55 | 4.3 | 3.8 | 1.39 | |
| 113 | AB | GI | | | | 48 | 22 | 18 | 8 | 0 | 1 | 3 | 1.01 | 0 | 1.07 | 3.0 | 2.3 | 1.53 | |
| 114 | AC | GA | | | | 54 | 34 | 0 | 9 | 0 | 0 | 3 | 1.10 | 0 | 0.98 | 2.9 | 2.5 | 1.37 | |
| 115 | AC | GA | | | | 50 | 25 | 12 | 9 | 0 | 2 | 2 | 1.12 | 0 | 1.15 | 2.7 | 3.3 | 0.63 | |
| 116 | AC | GI | | | | 49 | 16 | 19 | 14 | 0 | 0 | 2 | 1.30 | 0 | 1.08 | 4.8 | 1.9 | 1.17 | |
| 117 | AC | GI | | | | 47 | 8 | 34 | 7 | 0 | 2 | 2 | 1.02 | 0 | 1.00 | 3.0 | 2.6 | 0.78 | |
| 118 | AD | GA | | | | 46 | 23 | 20 | 8 | 0 | 0 | 3 | 0.89 | 0 | 1.07 | 2.6 | 2.5 | 1.23 | |
| 119 | AD | GA | | | | 44 | 7 | 11 | 32 | 0 | 4 | 2 | 1.00 | 0 | 1.18 | 2.7 | 2.7 | 0.95 | |
| 120 | AD | GI | | | | 51 | 11 | 30 | 6 | 0 | 1 | 1 | 1.10 | 0 | 1.30 | 5.1 | 3.7 | 0.78 | |

| | PROPERTY | | | | | | | |
|---|---|---|---|---|---|---|---|---|
| | TENSILE PROPERTY | | | | | DELAYED FRACTURE RESISTANCE | | |
| EXPERI-MENTAL EXAMPLE | YIELD STRESS MPa | TENSILE STRENGHT MPa | TOTAL ELONGA-TION % | n VALUE | PLATING PEELING | HYDRO-CHLORIC ACID IMMER-SION TEST RESULT | RATIO OF LIMIT DIFFU-SIBLE HYDRO-GEN CONTENT | CLASSI-FICATION |
| 106 | 634 | 1083 | 18 | 0.108 | — | ○ | 0.79 | EXAMPLE |
| 107 | 696 | 1301 | 14 | 0.093 | — | ○ | 1.27 | EXAMPLE |
| 108 | 591 | 1063 | 19 | 0.108 | EXIS-TENCE | ○ | 0.70 | COMPARATIVE EXAMPLE |
| 109 | 616 | 1278 | 14 | 0.095 | — | ○ | 1.05 | EXAMPLE |

TABLE 20-continued

| | | | | | | | | | |
|---|---|---|---|---|---|---|---|---|---|
| 110 | 2.52 | 7.1 | 95 | ○ | 635 | 17 | 0.098 | — | 0.98 | EXAMPLE |
| 111 | 0.82 | 5.9 | 62 | ○ | 710 | 16 | 0.102 | — | 0.83 | EXAMPLE |
| 112 | 0.90 | 5.6 | 71 | ○ | 545 | 20 | 0.140 | — | 0.31 | COMPARATIVE EXAMPLE |
| 113 | 1.15 | 42.8 | 55 | ○ | 728 | 16 | 0.087 | — | 1.26 | EXAMPLE |
| 114 | 1.34 | 35.6 | 54 | ○ | 673 | 14 | 0.080 | — | 1.46 | EXAMPLE |
| 115 | 4.85 | 36.6 | 74 | ○ | 746 | 16 | 0.093 | — | 1.54 | EXAMPLE |
| 116 | 0.81 | 18.8 | 62 | ○ | 704 | 15 | 0.088 | — | 0.37 | COMPARATIVE EXAMPLE |
| 117 | 1.37 | 65.3 | 55 | ○ | 954 | 11 | 0.060 | — | 1.56 | EXAMPLE |
| 118 | 1.99 | 154.4 | 42 | ○ | 791 | 14 | 0.072 | — | 0.72 | EXAMPLE |
| 119 | 1.00 | 40.3 | 53 | ○ | 919 | 11 | 0.057 | — | 1.02 | EXAMPLE |
| 120 | 3.11 | 15.0 | 41 | ○ | 661 | 17 | 0.091 | — | 0.42 | COMPARATIVE EXAMPLE |

TABLE 21

| EXPERIMENTAL EXAMPLE | CHEMICAL COMPONENT | STEEL TYPE | MICROSTRUCTURE OF BASE STEEL SHEET | | | | | | | | | | | | |
|---|---|---|---|---|---|---|---|---|---|---|---|---|---|---|---|
| | | | STRUCTURAL FRACTION | | | | | | | FERRITE | | HARD STRUCTURE | BCC IRON X-RAY RANDOM | INCLUSION | |
| | | | FERRITE % | BAINITE % | BAINITIC FERRITE % | MARTENSITE % | TEMPERED MARTENSITE % | RETAINED AUSTENITE % | OTHERS % | d(RD)/d(TD) | NON-RECRYSTALIZED FERRITE FRACTION % | L(RD)/L(TD) | DOM INTENSITY RATIO | ASPECT RATIO | D(RD)/D(TD) |
| 121 | AE | GI | 66 | 12 | 17 | 3 | 0 | 0 | 2 | 0.98 | 0 | 1.01 | 3.5 | 3.9 | 1.72 |
| 122 | AF | GI | 22 | 18 | 30 | 23 | 0 | 7 | 0 | 0.90 | 0 | 1.00 | 2.0 | 3.9 | 1.42 |
| 123 | AG | GI | 88 | 8 | 2 | 0 | 0 | 2 | 0 | 0.97 | 0 | 0.97 | 3.9 | 2.8 | 1.45 |
| 124 | BA | | TEST INTERRUPTED DUE TO FRACTURE IN COLD ROLLING STEP | | | | | | | | | | | | | |
| 125 | BB | GA | 63 | 15 | 5 | 14 | 1 | 0 | 2 | 1.03 | 0 | 1.08 | 3.4 | 3.5 | 1.68 |
| 126 | BC | | TEST INTERRUPTED DUE TO SLAB CRACKING | | | | | | | | | | | | | |
| 127 | BD | | TEST INTERRUPTED DUE TO WILD AONE FRACTURE IN ANNEALING STEP | | | | | | | | | | | | | |
| 128 | BE | GA | 67 | 5 | 6 | 9 | 8 | 4 | 1 | 1.23 | 0 | 1.21 | 3.3 | 4.2 | 1.46 |

| EXPERIMENTAL EXAMPLE | SURFACE LAYER (DECABURIZED LAYER) OF BASE STEEL SHEET | | | PROPERTY | | | | | | DELAYED FRACTURE RESISTANCE | | | | CLASSIFICATION |
|---|---|---|---|---|---|---|---|---|---|---|---|---|---|---|
| | DECARBURIZED LAYER THICKNESS μm | OXIDE DENSITY 10¹²OXIDES/m² | OXIDE SIZE nm | EXTERNAL APPEARANCE | TENSILE PROPERTY | | | | | HYDROCHLORIC ACID IMMERSION TEST RESULT | RATIO OF LIMIT DIFFUSIBLE HYDROGEN CONTENT | PLATING PEELING | | |
| | | | | | YIELD STRESS MPa | TENSILE STRENGHT MPa | TOTAL ELONGATION % | n VALUE | | | | | | |
| 121 | 0.958 | 60.8 | 38 | ○ | 482 | 767 | 22 | 0.132 | | ○ | 1.03 | — | | COMPARATIVE EXAMPLE |
| 122 | 2.43 | 43.8 | 64 | ○ | 1288 | 1642 | 10 | 0.065 | | X | 1.19 | — | | COMPARATIVE EXAMPLE |
| 123 | 0.53 | 5.7 | 89 | ○ | 368 | 629 | 20 | 0.158 | | ○ | 1.46 | — | | COMPARATIVE EXAMPLE |
| 124 | TEST INTERRUPTED DUE TO FRACTURE IN COLD ROLLING STEP | | | | | | | | | | | | | COMPARATIVE EXAMPLE |
| | | | | | | | | | | | | | | COMPARATIVE EXAMPLE |
| | | | | | | | | | | | | | | COMPARATIVE EXAMPLE |

TABLE 21-continued

| | | | | | | | | |
|---|---|---|---|---|---|---|---|---|
| 125 | 0.83 | <1.0 | 43 | ○ | 486 | 915 | 15 | 0.098 | — | X | 1.40 | COMPARATIVE EXAMPLE |
| 126 | | | TEST INTERRUPTED DUE TO SLAB CRACKING | | | | | | | | | COMPARATIVE EXAMPLE |
| 127 | | | TEST INTERRUPTED DUE TO WILD AONE FRACTURE IN ANNEALING STEP | | | | | | | | | COMPARATIVE EXAMPLE |
| 128 | 5.45 | 15000 | 37 | ○ | — | — | — | — | EXIS-TENCE | — | — | COMPARATIVE EXAMPLE |

As is clear from Table 13 to Table 21, in the hot-dip galvanized steel sheets of the examples of the present invention, in which the chemical composition of the base steel sheet is in the range prescribed in the present invention and the microstructure of the base steel sheet satisfies the conditions prescribed in the present invention, and further the thickness of the decarburized layer and the conditions of oxides in the decarburized layer are in the ranges prescribed in the present invention, (Experimental examples 1 to 3, 5 to 7, 9 to 11, 13 to 15, 17 to 19, 21 to 23, 25 to 27, 29, to 31, 33 to 35, 37 to 39, 41 to 43, 45 to 47, 49 to 51, 53 to 55, 57 to 59, 61 to 63, 65 to 67, 69 to 71, 73 to 75, 77 to 79, 81 to 83, 85 to 87, 89 to 91, 93 to 95, 97 to 99, 101 to 103, 105 to 107, 109 to 111, 113 to 115, and 117 to 119), it was confirmed that the delayed fracture resistance evaluated by the salt spray test is excellent, the anisotropy of the delayed fracture resistance evaluated by the ratio of the limit diffusible hydrogen contents in the respective directions is small, and further high strength is provided and high ductility is provided, and the n value is also high, workability is excellent, and further external appearance quality is good, and peeling resistance of the plating layer is also good.

In contrast to this, in comparative examples in which any one or more of the conditions deviated from the range/ranges prescribed in the present invention, one or more of the performances out of the above-described respective performances were poor.

That is, Experimental example 121 is a comparative example using the base steel sheet having the content of C being too small, and in this case, the strength was insufficient. Experimental example 122 is a comparative example using the base steel, sheet having the content of C being too large, and in this case, the delayed fracture resistance deteriorated. Experimental example 123 is a comparative example using the base steel sheet having the content of Mn being too small, and in this case, the strength was insufficient.

Experimental example 124 is a comparative example using the base steel sheet having the content of Si being too large, and is an example where the base steel sheet fractured in the cold rolling step and the test interrupted. Experimental example 125 is a comparative example using the base steel sheet having the content of Si being too small, and in this case, the density of oxides in the decarburized layer was small and the delayed fracture resistance deteriorated. Experimental example 126 is a comparative example using the base steel sheet having the content of Mn being too large, and is an example where the slab fractured between completion of the casting and undergoing the hot rolling step and the test interrupted. Experimental example 127 is a comparative example using the base steel sheet having the content of Al being too large, and is an example where in a continuous annealing step, a zone welded to the preceding steel sheet fractured and the test interrupted.

Regarding the comparative examples other than Experimental examples 121 to 127 described above, the chemical composition of the base steel sheet was in the range prescribed in the present invention, but out of the comparative examples, first, Experimental example 4 is a comparative example where the hot rolling condition was outside of the range prescribed in Expression 1 (an example where it exceeded the upper limit of Expression 1), and in this case, the aspect ratio of inclusions in the base steel sheet became large, and thereby the delayed fracture resistance deteriorated and the anisotropy of the delayed fracture resistance also became large.

Further, Experimental example 8 is a comparative example where the alloying treatment temperature with respect to the plating layer was too high, and in this case, the strength became insufficient and the peeling resistance of the plating layer deteriorated.

Experimental example 12 is a comparative example where the average cooling rate in the second cooling step in the cooling process of the annealing step of the base steel sheet was too small, and in this case, the strength became insufficient.

Experimental example 16 is a comparative example where in the reduction zone of the annealing step, the value of the partial pressure ratio $P(H_2O)/P(H_2)$ of a water vapor partial pressure $P(H_2O)$ and a hydrogen partial pressure $P(H_2)$ was too small, and in this case, the decarburized layer was not formed substantially, and thus the delayed fracture resistance deteriorated and the external appearance became poor.

Experimental example 20 is a comparative example where the cooling rate of the primary cooling in the annealing step of the base steel sheet was too large, and in this case, the strength became insufficient.

Experimental example 24 is a comparative example where the cooling rate of the primary cooling in the hot rolling step of the base steel sheet was too large, and in this case, the random intensity ratio of BCC iron was large and the degree of deflection of crystal grains became large, and thereby the anisotropy of the delayed fracture resistance became large.

Experimental example 28 is a comparative example where the temperature increasing rate of the annealing step of the base steel sheet was too large, and in this case, the ratio of non-recrystallized ferrite to ferrite was too large, so that the n value became small and the workability deteriorated.

Experimental example 32 is a comparative example where the average cooling rate of the steel sheet in the third cooling step after plating in the plaiting step was too small, and in this case, the strength became insufficient.

Experimental example 36 is a comparative example where the retention time in the secondary cooling in the hot rolling step of the base steel sheet was too short, and in this case, island-shaped hard structures in the base steel sheet were extended in the rolling direction, and thereby the anisotropy of the delayed fracture resistance became large.

Experimental example 40 is a comparative example where the cooling stop temperature of the primary cooling in the hot rolling step of the base steel sheet was too high, and in this case, the external appearance became poor.

Experimental example 44 is a comparative example where the temperature increasing rate of the annealing step of the base steel sheet was too large, and in this case, it was found that non-recrystallized ferrite increases, island-shaped hard structures are turned into shapes extended in the rolling direction, and further the degree of deflection of crystal also becomes large, and thereby the anisotropy of the delayed fracture resistance becomes large, the n value also becomes small, and the workability deteriorates.

Experimental example 48 is a comparative example where the reduction ratio of the cold rolling in the process of manufacturing the base steel sheet was too small, and in this case, it was found that non-recrystallized ferrite increases, island-shaped hard structures are turned into shapes extended in the rolling direction, and further the degree of deflection of crystal also becomes large, and thereby the anisotropy of the delayed fracture resistance becomes large, the n value also becomes small, and the workability deteriorates.

Experimental example 52 is a comparative example where the ratio of the mixed gas in the preheating zone in the annealing step of the base steel sheet was too low, and in this case, oxides in the decarburized layer became coarse, and at the same time, the density thereof became too small, and thereby the delayed fracture resistance deteriorated.

Experimental example 56 is a comparative example where the waiting time (retention time) until start of the primary cooling after completion of the hot rolling in the hot rolling step of the base steel sheet was too short, and in this case, the degree of deflection of crystal orientations of the base steel sheet became large, and thereby the anisotropy of the delayed fracture resistance also became large.

Experimental example 60 is a comparative example where the bainite transformation process (retention process) was performed after the hot-dip galvanizing, and in this case, the delayed fracture resistance deteriorated.

Experimental example 64 is a comparative example where the above-described air ratio was too high, and in this case, the thickness of the decarburized layer became too large, and thereby strength insufficiency was caused and poor external appearance occurred.

Experimental example 68 is a comparative example where the maximum, heating temperature in the annealing step of the base steel sheet was too low, and in this case, reverse transformation to austenite did not occur sufficiently and ferrite remained excessively, so that the strength became insufficient, and further the workability also became poor.

Experimental example 72 is a comparative example where in the reduction zone of the annealing step of the base steel sheet, the value of the partial pressure ratio $P(H_2O)/P(H_2)$ of a water vapor partial pressure $P(H_2O)$ and a hydrogen partial pressure $P(H_2)$ was too large, and in this case, the decarburized layer was too thick, so that strength insufficiency was caused.

Experimental example 76 is a comparative example where the slab heating temperature at the time of manufacturing the base steel sheet was too low, and in this case, the anisotropy of the steel sheet structure became large, and thereby the delayed fracture resistance deteriorated, the anisotropy of the delayed fracture resistance also became large, and further the workability also became poor.

Experimental example 80 is a comparative example where the hot rolling condition of the base steel sheet was outside of the range prescribed in Expression 1 (an example where it exceeded the upper limit of Expression 1), and in this case, the aspect ratio of inclusions in the base steel sheet became large, and thereby the anisotropy of the delayed fracture resistance became large.

Experimental example 84 is a comparative example where the retention time in the secondary cooling in the hot rolling step of the base steel sheet was too short, and in this case, shapes of island-shaped hard structures in the base steel sheet were extended in the rolling direction and the degree of deflection of the entire steel structure also became large, and thereby the anisotropy of the delayed fracture resistance became large.

Experimental example 88 is a comparative example where the effective Al amount of the hot-dip galvanizing was too much, and in this case, poor external appearance was caused.

Experimental example 92 is a comparative example where the cooling rate of the primary cooling of the annealing step of the base steel sheet was too small, and in this case, the strength became insufficient.

Experimental example 36 is a comparative example where the waiting time (retention time) until start of the primary cooling after completion of the hot rolling in the hot rolling step of the base steel sheet was too short, and in this case, the aspect ratio of inclusions of the base steel sheet became large, and thereby the anisotropy of the delayed fracture resistance also became large.

Experimental example 100 is a comparative example where the time for the alloying treatment after the not-dip galvanizing was too long, and in this case, the peeling resistance of the plating layer deteriorated.

Experimental example 104 is a comparative example where the hot rolling condition of the base steel sheet was outside of the range prescribed in Expression 1 (an example where it was less than the lower limit value of Expression 1), and in this case, the degree of deflection of the structure of the base steel sheet became large and the anisotropy of the delayed fracture resistance became large.

Experimental example 108 is a comparative example where the effective Al amount of the hot-dip galvanizing was too small, and in this case, the peeling resistance of the plating layer became poor.

Experimental example 112 is a comparative example where the cooling stop temperature of the primary cooling in the hot rolling step of the base steel sheet was too low, and in this case, the degree of deflection of the steel sheet structure became large and island-shaped hard structures were extended in the rolling direction, and thereby the anisotropy of the delayed fracture resistance became large.

Experimental example 116 is a comparative example where the hot rolling condition of the base steel sheet was outside of the range prescribed in Expression 1 (an example where it was less than the lower limit value of Expression 1), and in this case, the degree of deflection of the steel sheet structure became large, and thereby the anisotropy of the delayed fracture resistance became large.

In Experimental example 120, the reduction ratio of the cold rolling in the process of manufacturing the base steel sheet was too large and the degree of deflection of the steel sheet structure became large, and thereby the anisotropy of the delayed fracture resistance also became large.

Experimental example 128 is an example where the above-described air ratio in the oxidation treatment zone was too large, and thus the density of oxides in the decarburized layer became high excessively and the plating adhesiveness deteriorated extremely, and thereby the tensile test and the evaluation test of the delayed fracture resistance were stopped.

INDUSTRIAL APPLICABILITY

The present invention can be suitably applied to members having been subjected to hot-dip galvanizing and having been subjected to working such as bending and further to be used in fields where a high load is added out of members required to have strength such as structure members and reinforcing members for automobiles·construction machines, and so on, for example, and can be applied to members that occurrence of delayed, fracture should be avoided, in particular. However, application forms of the present invention are not limited to these.

The invention claimed is:

1. A high-strength hot-dip galvanized steel sheet having excellent delayed fracture resistance, comprising:
   a base steel sheet made of steel containing:
   in mass %,
   C: 0.075 to 0.400%;
   Si: 0.01 to 2.00%;
   Mn: 0.80 to 3.50%;
   P: 0.0001 to 0.100%;
   S: 0.0001 to 0.0100%;
   Al: 0.001 to 2.00%;
   O: 0.0001 to 0.0100%;
   N: 0.0001 to 0.0100%; and
   a balance being composed of Fe and inevitable impurities; and a hot-dip galvanizing layer formed on the surface of said base steel sheet, wherein in a range of ⅛ thickness to ⅜ thickness with the position of ¼ thickness of the sheet thickness of said base steel sheet from the surface of said base steel sheet being the center, a structure of said base steel sheet is turned into a structure in which 40 to 90% in volume fraction of a ferrite phase is contained, a retained austenite phase is 5% or less in volume fraction, and further a ratio of non-recrystallized ferrite to the entire ferrite phase is 50% or less in volume fraction, a grain diameter ratio of crystal grains in the ferrite phase in said base steel sheet is 0.75 to 1.33, wherein said grain diameter ratio is defined as the ratio of an average grain diameter in the rolling direction divided by an average grain diameter in the sheet width direction of said phase, and a length ratio of hard structures dispersed in island shapes in the ferrite phase is 0.75 to 1.33, wherein said length ratio is defined as an average length in the rolling direction divided by an average length in the sheet width direction of said structures, and further an average aspect ratio of inclusions contained in said base steel sheet is 1.0 to 5.0, and a surface layer of said base steel sheet is turned into a decarburized layer having a thickness of 0.01 to 10.0 μm, and further an average grain diameter of oxides in the decarburized layer is 30 to 500 nm, and an average density of the oxides in the decarburized layer is in a range of $1.0\times10^{12}$ oxides/m$^2$ to $1.0\times10^{16}$ oxides/m$^2$.

2. The high-strength hot-dip galvanized steel sheet having excellent delayed fracture resistance according to claim 1, wherein said base steel sheet further contains, in mass %, one kind or two or more kinds selected from
Cr: 0.01 to 2.00%,
Ni: 0.01 to 2.00%,
Cu: 0.01 to 2.00%,
Mo: 0.01 to 2.00%,
B: 0.0001 to 0.0100%, and
W: 0.01 to 2.00%.

3. The high-strength hot-dip galvanized steel sheet having excellent delayed fracture resistance according to claim 1, wherein said base steel sheet further contains, in mass %, one kind or two or more kinds selected from
Ti: 0.001 to 0.150%,
Nb: 0.001 to 0.100%, and
V: 0.001 to 0.300%.

4. The high-strength hot-dip galvanized steel sheet having excellent delayed fracture resistance according to claim 1, wherein said base steel sheet further contains 0.0001 to 0.0100 mass % in total of one kind or two or more kinds selected from Ca, Ce, Mg, Zr, La, and REM.

5. The high-strength hot-dip galvanized steel sheet having excellent delayed fracture resistance according to claim 1, wherein in said base steel sheet, an average work hardening coefficient (n value) in a range where total elongation is 3 to 7% is 0.060 or more.

6. The high-strength hot-dip galvanized steel sheet having excellent delayed fracture resistance according to claim 1, wherein in said base steel sheet, a value of a limit diffusible hydrogen content in the rolling direction divided by a limit diffusible hydrogen content in the sheet width direction is in the 0.5 to 1.5 range.

7. The high-strength hot-dip galvanized steel sheet having excellent delayed fracture resistance according to claim 1, wherein in said base steel sheet, an X-ray random intensity ratio of BCC iron at the position of ¼ thickness from the surface is 4.0 or less.

8. The high-strength hot-dip galvanized steel sheet having excellent delayed fracture resistance according to claim 1, wherein said hot-dip galvanizing layer is one having been subjected to an alloying treatment.

9. A manufacturing method of the high-strength hot-dip galvanized steel sheet having excellent delayed fracture resistance according to claim 1, comprising:

a heat step in which a slab containing:

in mass %,

C: 0.075 to 0.400%;

Si: 0.01 to 2.00%;

Mn: 0.80 to 3.50%;

P: 0.0001 to 0.100%;

S: 0.0001 to 0.0100%;

Al: 0.001 to 2.00%;

O: 0.0001 to 0.0100%;

N: 0.0001 to 0.0100%; and a balance being composed of Fe and inevitable impurities is heated to 1080° C. or higher;

a hot rolling step wherein hot rolling is performed to the slab after said heat step in a range satisfying Expression A; the hot rolling step comprising a hot rolling finishing temperature of a base steel sheet in the range of 850 to 980° C.; and wherein in Expression A, N represents the total number of passes of the hot rolling step, $TP_i$ represents a rolling temperature(° C.) at the ith pass and $r_i$ represents a reduction ratio at the ith pass;

a primary cooling step in which an elapsed time from the finish of the hot rolling to start of cooling is set to 1.0 second or longer, the hot-rolled base steel sheet is primarily cooled at a cooling rate of not less than 5° C./second nor more than 50° C./second, and the primary cooling is stopped when the temperature of the base steel sheet is a temperature in the 500 to 650° C. range;

subsequently to said primary cooling step, a secondary cooling step in which the base steel sheet is slowly cooled in such a manner that an elapsed time until the temperature of the base steel sheet becomes 400° C. from the temperature at the time of the primary cooling being stopped becomes one hour or longer, and is secondarily cooled;

after the secondary cooling, a cold rolling step of cold rolling the base steel sheet by setting the total reduction ratio to 30 to 75%;

after the cold rolling, an annealing step in which the temperature is increased in such a manner that an average temperature increasing rate in the 600 to 750° C. range becomes 20° C./sec or less, the cold-rolled base steel sheet is heated to a temperature of 750° C. or higher, and subsequently the heated base steel sheet is cooled in such a manner that an average cooling rate in the 750 to 650° C. range becomes 1.0 to 15.0° C./second; and a plating step of performing hot-dip galvanizing on the surface of the base steel sheet obtained after said annealing step,

[Numerical expression 1]

$$0.10 \leq \sum_{i=1}^{N} 1.00 \times 10^{10} \times \exp\left\{-\frac{2.44 \times 10^4}{(TP_i + 273)}\right\} \times \left\{\frac{1}{(1543 - TP_i)} - 1.00 \times 10^{-3}\right\} \times r_i \leq 1.00. \quad \text{(Expression A)}$$

10. The manufacturing method of the high-strength hot-dip galvanized steel sheet having excellent delayed fracture resistance according to claim 9, wherein said annealing step and said plating step are continuously performed by a continuous annealing and plating line having a preheating zone, a reduction zone, and a plating zone, and further at least part of the preheating zone is set to an oxidation treatment zone where an air ratio being a value of the volume of air contained in a mixed gas per unit volume, being a mixed gas of air used for a burner for heating and combustion gas, divided by the volume of air theoretically required for completely combusting the combustion gas contained in the mixed gas per unit volume is 0.7 to 1.2, and in the oxidation treatment zone, oxides are generated in a surface layer portion of the base steel sheet obtained after the cold rolling, and next in the reduction zone where a partial pressure ratio $P(H_2O)/P(H_2)$ being a value of a water vapor partial pressure divided by a hydrogen partial pressure is 0.0001 to 2.0, the oxides are reduced, and then in the plating zone, the base steel sheet having passed through the reduction zone is immersed in a hot-dip galvanizing bath with a plating bath temperature set to 450 to 470° C. and an effective Al amount in the plating bath set to 0.01 to 0.18 mass %, under the condition that the temperature of the steel sheet at the time of entering the plating bath is 430 to 490° C., and thereby the hot-dip galvanizing is performed on the surface of the base steel sheet.

11. The manufacturing method of the high-strength hot-dip galvanized steel sheet having excellent delayed fracture resistance according to claim 9, further comprising:

after said plating step, an alloying treatment step for alloying a layer of the hot-dip galvanizing.

* * * * *